US011696633B1

(12) United States Patent
Parazynski et al.

(10) Patent No.: US 11,696,633 B1
(45) Date of Patent: Jul. 11, 2023

(54) SYSTEM AND METHODS FOR CONTROLLING MOTION OF A TARGET OBJECT AND PROVIDING DISCRETE, DIRECTIONAL TACTILE FEEDBACK

(71) Applicant: Fluidity Technologies Inc., Houston, TX (US)

(72) Inventors: Scott Edward Parazynski, Houston, TX (US); Douglas Wayne Stanley, Tomball, TX (US); Keven Dale Coates, Cypress, TX (US)

(73) Assignee: Fluidity Technologies Inc., Houston, TX (US)

( * ) Notice: Subject to any disclaimer, the term of this patent is extended or adjusted under 35 U.S.C. 154(b) by 0 days.

(21) Appl. No.: 17/729,888

(22) Filed: Apr. 26, 2022

(51) Int. Cl.
*A45F 5/00* (2006.01)
*G06F 3/01* (2006.01)
(Continued)

(52) U.S. Cl.
CPC ............... *A45F 5/00* (2013.01); *F16M 13/04* (2013.01); *G06F 3/011* (2013.01);
(Continued)

(58) Field of Classification Search
CPC ........ G05G 1/62; G05G 9/04; B64C 13/0421; Y10T 74/20012; Y10T 74/20396
See application file for complete search history.

(56) References Cited

U.S. PATENT DOCUMENTS 3,028,126 A * 4/1962 Holleman ................ G05G 1/62
244/236
3,260,826 A 7/1966 Johnson
(Continued)

FOREIGN PATENT DOCUMENTS

CN 1310366 A 8/2001
CN 102346498 A 2/2012
(Continued)

OTHER PUBLICATIONS

"CES 2018: TIE Develop World's First One-Hand Drone Controller System," Live at PC.com, Retrieved from the Internet: URL: https://liveatpc.com/ces-2018-tie-develops-worlds-first-one-hand-drone-controller-system/, Jan. 2018, 8 pages.
(Continued)

*Primary Examiner* — William Lu

(57) ABSTRACT

A controller includes a first control member movable with one or two degree(s) of freedom (DoF) a second control member coupled to the first control member and movable with three independent DoFs and a third control member coupled to the first and the second control members, the third control member movable with one DoF, which is being one of the three DoFs of the second control member in the set, and providing a third control input, wherein the first, the second, and the third control members are configured to be operated by a user's single hand. Further, a forearm brace for attaching to a forearm of a user and a controller is used to support the user's forearm when the user operates the controller. Additionally, the controller includes vibration haptic motors for provide haptic alerts to the user based on position data and/or orientation data associated with a target object.

32 Claims, 31 Drawing Sheets

(51) Int. Cl.
*F16M 13/04* (2006.01)
*G06F 3/0362* (2013.01)
*G06F 3/0338* (2013.01)

(52) U.S. Cl.
CPC ........ *A45F 2005/008* (2013.01); *G06F 3/016* (2013.01); *G06F 3/0338* (2013.01); *G06F 3/0362* (2013.01)

(56) References Cited

U.S. PATENT DOCUMENTS

| | | | |
|---|---|---|---|
| 3,394,611 A | 7/1968 | Beurrier | |
| 4,012,014 A | 3/1977 | Marshall | |
| 4,069,720 A * | 1/1978 | Thor | G05G 9/04 |
| | | | 244/225 |
| 4,176,840 A * | 12/1979 | Lanning | A63B 69/0046 |
| | | | 473/213 |
| 4,216,467 A | 8/1980 | Colston | |
| 4,306,208 A | 12/1981 | Coors | |
| 4,420,808 A | 12/1983 | Diamond et al. | |
| 4,533,899 A | 8/1985 | Isaksson | |
| 4,584,510 A | 4/1986 | Hollow | |
| 4,590,339 A | 5/1986 | Scott-Jackson et al. | |
| 4,619,447 A * | 10/1986 | Blake | B25B 5/103 |
| | | | 24/514 |
| 4,733,214 A | 3/1988 | Andresen | |
| 4,895,039 A * | 1/1990 | Hegg | G05G 9/04 |
| | | | 244/236 |
| 4,914,976 A * | 4/1990 | Wyllie | G05G 9/04 |
| | | | 416/114 |
| 5,042,314 A | 8/1991 | Rytter et al. | |
| 5,127,608 A | 7/1992 | Farineau et al. | |
| 5,128,671 A | 7/1992 | Thomas, Jr. | |
| 5,223,776 A | 6/1993 | Radke et al. | |
| 5,317,301 A | 5/1994 | DeVolpi | |
| 5,459,382 A | 10/1995 | Jacobus et al. | |
| 5,503,040 A | 4/1996 | Wright | |
| 5,532,929 A | 7/1996 | Hattori et al. | |
| 5,559,432 A | 9/1996 | Logue | |
| 5,565,891 A | 10/1996 | Armstrong | |
| D375,765 S | 11/1996 | Kawasaki | |
| 5,607,158 A | 3/1997 | Chan | |
| 5,617,515 A | 4/1997 | MacLaren et al. | |
| 5,643,087 A | 7/1997 | Marcus et al. | |
| 5,687,080 A | 11/1997 | Hoyt et al. | |
| 5,694,153 A | 12/1997 | Aoyagi et al. | |
| D389,198 S | 1/1998 | Hama | |
| 5,749,577 A | 5/1998 | Couch et al. | |
| 5,781,180 A | 7/1998 | Couch et al. | |
| 5,831,408 A | 11/1998 | Jacobus et al. | |
| 5,963,196 A | 10/1999 | Nishiumi et al. | |
| H1822 H | 12/1999 | Kelley et al. | |
| 6,024,576 A | 2/2000 | Bevirt et al. | |
| 6,068,554 A | 5/2000 | Tyler | |
| 6,198,471 B1 | 3/2001 | Cook | |
| 6,201,196 B1 | 3/2001 | Wergen | |
| 6,222,525 B1 | 4/2001 | Armstrong | |
| 6,353,430 B2 | 3/2002 | Cheng et al. | |
| 6,379,205 B1 * | 4/2002 | Wallasch | B63C 9/00 |
| | | | 440/90 |
| 6,429,849 B1 | 8/2002 | An et al. | |
| 6,459,420 B1 | 10/2002 | Harris | |
| 6,512,509 B1 | 1/2003 | McVicar | |
| 6,580,418 B1 | 6/2003 | Grome et al. | |
| 6,597,347 B1 | 7/2003 | Yasutake | |
| 6,613,997 B2 | 9/2003 | Oster et al. | |
| 6,614,420 B1 | 9/2003 | Han et al. | |
| 6,624,806 B2 | 9/2003 | Hsu | |
| 6,630,924 B1 * | 10/2003 | Peck | G06F 3/011 |
| | | | 345/169 |
| 6,644,141 B2 | 11/2003 | Oikarinen | |
| 6,664,946 B1 | 12/2003 | Stipes et al. | |
| 6,865,342 B2 | 3/2005 | Hirata et al. | |
| 6,989,497 B1 | 1/2006 | Lee | |
| 6,992,602 B2 | 1/2006 | Alexander et al. | |
| 7,019,732 B2 | 3/2006 | Furukawa | |
| 7,131,389 B1 | 11/2006 | Hawkes | |
| 7,170,420 B2 | 1/2007 | Phifer | |
| 7,320,263 B2 | 1/2008 | Gustafsson | |
| 7,548,697 B2 | 6/2009 | Hudson et al. | |
| 7,575,491 B1 | 8/2009 | Martin | |
| 7,793,890 B2 * | 9/2010 | Scherer | A63H 30/04 |
| | | | 244/190 |
| 7,823,685 B2 | 11/2010 | Blind et al. | |
| 7,931,239 B2 | 4/2011 | Pedersen et al. | |
| 8,089,225 B2 | 1/2012 | Goossen | |
| 8,100,218 B2 | 1/2012 | Case et al. | |
| 8,212,770 B2 | 7/2012 | Obourn et al. | |
| 8,258,917 B2 | 9/2012 | Cai et al. | |
| 8,273,043 B2 * | 9/2012 | Bonutti | A61F 5/013 |
| | | | 602/26 |
| 8,276,476 B2 | 10/2012 | Diccion | |
| 8,300,012 B2 | 10/2012 | Yamamoto | |
| 8,344,914 B2 | 1/2013 | Yeh | |
| 8,345,004 B1 | 1/2013 | Kass et al. | |
| 8,371,187 B2 | 2/2013 | Payandeh et al. | |
| 8,380,402 B2 | 2/2013 | Hobenshield | |
| D678,281 S | 3/2013 | Yung | |
| 8,471,815 B2 | 6/2013 | Jaouen | |
| 8,576,168 B2 | 11/2013 | Kabasawa et al. | |
| 8,579,837 B1 | 11/2013 | Makower et al. | |
| 8,716,973 B1 | 5/2014 | Lammertse | |
| 8,770,055 B2 * | 7/2014 | Peterson | B64C 13/0421 |
| | | | 74/471 XY |
| 8,829,894 B2 | 9/2014 | Banerjee et al. | |
| 8,866,597 B2 | 10/2014 | Brendel | |
| 8,881,616 B2 | 11/2014 | Dize et al. | |
| 8,887,597 B2 | 11/2014 | Black | |
| 9,201,514 B1 | 12/2015 | Brandt | |
| 9,501,084 B1 * | 11/2016 | Bannister | G05G 9/047 |
| 9,504,912 B2 | 11/2016 | Ikeda et al. | |
| 9,547,380 B2 | 1/2017 | Parazynski | |
| 9,727,076 B2 | 8/2017 | Smith et al. | |
| 9,931,701 B1 * | 4/2018 | Klein | B25F 5/026 |
| 10,073,488 B2 | 9/2018 | Conro et al. | |
| 10,133,271 B2 | 11/2018 | Hutson | |
| 10,152,853 B2 | 12/2018 | Provancher et al. | |
| 10,198,086 B2 | 2/2019 | Parazynski et al. | |
| 10,222,794 B2 * | 3/2019 | Deng | F16M 13/02 |
| 10,324,487 B2 | 6/2019 | Parazynski et al. | |
| 10,324,540 B1 | 6/2019 | Parazynski | |
| 10,331,232 B2 | 6/2019 | Parazynski et al. | |
| 10,331,233 B2 | 6/2019 | Parazynski et al. | |
| 10,481,704 B2 | 11/2019 | Parazynski | |
| 10,520,973 B2 | 12/2019 | Parazynski et al. | |
| 10,610,438 B1 * | 4/2020 | Dines | B25J 9/0006 |
| 10,664,002 B2 | 5/2020 | Parazynski et al. | |
| 10,768,658 B2 | 9/2020 | Asano | |
| 10,921,904 B2 | 2/2021 | Parazynski et al. | |
| 11,194,358 B2 | 12/2021 | Parazynski et al. | |
| 11,194,407 B2 | 12/2021 | Parazynski et al. | |
| 11,199,914 B2 | 12/2021 | Parazynski et al. | |
| 11,281,308 B2 | 3/2022 | Parazynski | |
| 11,407,098 B2 | 8/2022 | Bianco et al. | |
| 11,490,981 B2 | 11/2022 | Denlinger et al. | |
| 11,500,475 B2 | 11/2022 | Parazynski et al. | |
| 2001/0002127 A1 | 5/2001 | Cheng et al. | |
| 2002/0080112 A1 | 6/2002 | Braun et al. | |
| 2002/0128064 A1 | 9/2002 | Sobota | |
| 2002/0148715 A1 | 10/2002 | Oster et al. | |
| 2002/0190948 A1 | 12/2002 | Coutant et al. | |
| 2003/0006956 A1 | 1/2003 | Wu et al. | |
| 2003/0038783 A1 * | 2/2003 | Baughman | G06F 3/03549 |
| | | | 345/163 |
| 2003/0058219 A1 | 3/2003 | Shaw | |
| 2003/0214484 A1 | 11/2003 | Haywood | |
| 2004/0082885 A1 * | 4/2004 | Culhane | A61H 1/0277 |
| | | | 601/5 |
| 2004/0083940 A1 | 5/2004 | Shelton et al. | |
| 2005/0104742 A1 | 5/2005 | Phifer | |
| 2005/0159850 A1 | 7/2005 | Melman | |
| 2005/0236536 A1 * | 10/2005 | Fan | F16M 11/041 |
| | | | 248/176.3 |
| 2005/0277470 A1 | 12/2005 | Watanachote | |

(56) References Cited

U.S. PATENT DOCUMENTS

| | | | |
|---|---|---|---|
| 2006/0137931 A1 | 6/2006 | Berg et al. | |
| 2006/0156848 A1* | 7/2006 | Gosselin | G06F 3/016 74/471 XY |
| 2006/0164383 A1 | 7/2006 | Machin et al. | |
| 2006/0224280 A1 | 10/2006 | Flanigan et al. | |
| 2006/0262000 A1 | 11/2006 | Strong | |
| 2007/0080934 A1 | 4/2007 | Chen et al. | |
| 2007/0144279 A1* | 6/2007 | Wu | H02K 7/06 74/22 A |
| 2007/0156286 A1 | 7/2007 | Yamauchi | |
| 2007/0262959 A1 | 11/2007 | Gu | |
| 2008/0063400 A1 | 3/2008 | Hudson et al. | |
| 2008/0132334 A1 | 6/2008 | Nonaka et al. | |
| 2008/0174550 A1 | 7/2008 | Laurila et al. | |
| 2008/0217147 A1 | 9/2008 | Martin | |
| 2008/0278448 A1 | 11/2008 | Nilsagard et al. | |
| 2008/0282507 A1* | 11/2008 | Chiasson | B25B 27/10 16/440 |
| 2009/0030353 A1* | 1/2009 | Bonutti | A61H 1/0274 601/5 |
| 2009/0043310 A1* | 2/2009 | Rasmussen | A61B 17/1764 606/88 |
| 2009/0084214 A1 | 4/2009 | Sakai et al. | |
| 2009/0152782 A1 | 6/2009 | Larson et al. | |
| 2009/0179869 A1 | 7/2009 | Slotznick | |
| 2009/0213073 A1 | 8/2009 | Obermeyer et al. | |
| 2009/0248220 A1 | 10/2009 | Ecton et al. | |
| 2009/0267035 A1* | 10/2009 | Wood | B66F 3/08 254/98 |
| 2009/0295724 A1 | 12/2009 | Cheng et al. | |
| 2010/0097309 A1 | 4/2010 | Nishida et al. | |
| 2010/0302017 A1 | 12/2010 | Guglielmo | |
| 2011/0088961 A1 | 4/2011 | Case et al. | |
| 2011/0148667 A1 | 6/2011 | Yeh | |
| 2011/0213384 A1 | 9/2011 | Jeong | |
| 2011/0219899 A1* | 9/2011 | Dize | G05G 9/047 74/471 XY |
| 2012/0012677 A1* | 1/2012 | Crossley, III | B05B 15/62 239/526 |
| 2012/0071752 A1 | 3/2012 | Sewell et al. | |
| 2012/0152052 A1 | 6/2012 | Suzuki | |
| 2012/0187238 A1 | 7/2012 | Lam | |
| 2012/0249455 A1 | 10/2012 | Nagata et al. | |
| 2012/0294696 A1 | 11/2012 | Summer et al. | |
| 2012/0295501 A1 | 11/2012 | Guglielmo | |
| 2013/0020105 A1* | 1/2013 | Cook | B23B 45/001 173/170 |
| 2013/0081256 A1* | 4/2013 | Richiuso | F16J 13/065 74/89.17 |
| 2013/0147611 A1 | 6/2013 | Brendel | |
| 2013/0148273 A1* | 6/2013 | Tsai | F16M 11/041 361/679.01 |
| 2013/0178293 A1 | 7/2013 | Nakayama et al. | |
| 2013/0293362 A1 | 11/2013 | Parazynski | |
| 2013/0296757 A1* | 11/2013 | Kaphingst | A61F 5/013 602/20 |
| 2013/0317395 A1* | 11/2013 | Laflin | A61H 1/0277 601/5 |
| 2014/0083225 A1 | 3/2014 | Downs et al. | |
| 2014/0247119 A1 | 9/2014 | Robbins et al. | |
| 2014/0249695 A1 | 9/2014 | Gettings et al. | |
| 2014/0249944 A1* | 9/2014 | Hicks | G07G 1/0081 235/383 |
| 2014/0311009 A1* | 10/2014 | Anglin | F42B 39/02 42/90 |
| 2015/0173992 A1* | 6/2015 | Wang | A61H 1/0277 601/5 |
| 2015/0174737 A1* | 6/2015 | Chen | B25B 5/085 269/216 |
| 2015/0253801 A1 | 9/2015 | Wuisan et al. | |
| 2016/0068267 A1 | 3/2016 | Liu et al. | |
| 2016/0077589 A1 | 3/2016 | Chataignier et al. | |
| 2016/0195939 A1 | 7/2016 | Parazynski | |
| 2016/0241767 A1 | 8/2016 | Cho et al. | |
| 2017/0121000 A1 | 5/2017 | Forslund et al. | |
| 2017/0133175 A1 | 5/2017 | Lin et al. | |
| 2017/0175884 A1 | 6/2017 | Watanabe | |
| 2017/0233983 A1 | 8/2017 | Wright | |
| 2017/0246533 A1 | 8/2017 | LaChappelle et al. | |
| 2017/0269587 A1 | 9/2017 | Hong | |
| 2017/0277176 A1 | 9/2017 | Hutson | |
| 2018/0055591 A1* | 3/2018 | Bonny | A61B 90/57 |
| 2018/0081387 A1 | 3/2018 | Hisada et al. | |
| 2018/0085277 A1* | 3/2018 | Julin | A61H 1/0262 |
| 2018/0161190 A1* | 6/2018 | Heiter | A61F 5/012 |
| 2018/0164799 A1 | 6/2018 | Hong | |
| 2018/0271447 A1* | 9/2018 | Zhou | E03D 9/08 |
| 2018/0356907 A1* | 12/2018 | Parazynski | A61B 34/74 |
| 2019/0025869 A1 | 1/2019 | Parazynski | |
| 2019/0033987 A1 | 1/2019 | Parazynski | |
| 2019/0041891 A1 | 2/2019 | Parazynski | |
| 2019/0041894 A1 | 2/2019 | Parazynski et al. | |
| 2019/0042003 A1 | 2/2019 | Parazynski et al. | |
| 2019/0042004 A1 | 2/2019 | Parazynski et al. | |
| 2019/0071167 A1 | 3/2019 | Selwa et al. | |
| 2019/0243468 A1 | 8/2019 | Parazynski et al. | |
| 2019/0292751 A1 | 9/2019 | Kassen et al. | |
| 2020/0053995 A1* | 2/2020 | Andrews | A01K 77/00 |
| 2020/0056741 A1* | 2/2020 | MacArthur | F16M 11/10 |
| 2020/0163787 A1* | 5/2020 | Goldfarb | A61F 5/013 |
| 2020/0285326 A1 | 9/2020 | Parazynski | |
| 2020/0289217 A1* | 9/2020 | Denlinger | A61B 34/74 |
| 2020/0385956 A1 | 12/2020 | Krivenkov et al. | |
| 2020/0387238 A1 | 12/2020 | Parazynski et al. | |
| 2020/0387239 A1 | 12/2020 | Parazynski et al. | |
| 2020/0393865 A1 | 12/2020 | Parazynski et al. | |
| 2021/0011561 A1 | 1/2021 | Parazynski et al. | |
| 2021/0173391 A1 | 6/2021 | Parazynski et al. | |
| 2021/0286431 A1 | 9/2021 | Eck et al. | |
| 2021/0325977 A1 | 10/2021 | Parazynski et al. | |
| 2022/0164040 A1 | 5/2022 | Parazynski | |
| 2022/0269300 A1 | 8/2022 | Parazynski et al. | |
| 2022/0291708 A1 | 9/2022 | Parazynski et al. | |

FOREIGN PATENT DOCUMENTS

| | | |
|---|---|---|
| CN | 102824746 A | 12/2012 |
| CN | 108885452 A | 11/2018 |
| DE | 102015102317 A1 | 8/2016 |
| EP | 1621954 B1 | 7/2011 |
| GB | 2091423 A | 7/1982 |
| JP | H11154031 A | 6/1999 |
| KR | 20200090786 A | 7/2020 |
| WO | WO-2007055606 A1 | 5/2007 |
| WO | WO-2019084504 A1 | 5/2019 |
| WO | WO-2019122926 A1 | 6/2019 |

OTHER PUBLICATIONS

Dent, S., "'Feel Your Drone With Motion Pilot's Haptic Joystick," Engadget, [Online], Retrieved from the Internet:< url:< a= href= >https://www.engadget.com/2018-01-19-motionpilot-haptic-drone-joystick.html, dated Jan. 19, 2018, 1 page.</url:>.

Extended European Search Report for European Application No. 17865929.8, dated Nov. 13, 2020, 9 pages.

Extended European Search Report for European Application No. 18870040.5, dated Jun. 25, 2021, 9 pages.

Extended European Search Report for European Application No. 18870577.6, dated Jul. 23, 2021, 8 pages.

Extended European Search Report for European Application No. 18871150.1, dated Aug. 19, 2021, 10 pages.

Extended European Search Report for European Application No. 18871801.9, dated Aug. 27, 2021, 13 pages.

First Office Action for Chinese Application No. 201780080619.X, dated Mar. 16, 2020, 15 pages.

First Office Action for Chinese Application No. 201880083427.9, dated Jun. 28, 2021, 24 pages.

"H.E.A.R.T.—Hall Effect Accurate Technology: A Unique 3D Technological Innovation Built Into the New Thrustmaster Joystick,"

(56) References Cited

OTHER PUBLICATIONS

Thrustmaster, [Online], Retrieved from the Internet: http://www.thrustmaster.com/press/heart-hall-effect-accurate-technology-unique-3d-technological-innovation-built-new-thrustmaste, Jan. 7, 2009, 1 page.
International Search Report and Written Opinion for International Application No. PCT/US2017/058905, dated Feb. 23, 2018, 5 pages.
International Search Report and Written Opinion for International Application No. PCT/US2018/057862, dated Jan. 11, 2019, 15 pages.
International Search Report and Written Opinion for International Application No. PCT/US2018/057864, dated Feb. 26, 2019, 14 pages.
International Search Report and Written Opinion for International Application No. PCT/US2018/057865, dated Jan. 4, 2019, 10 pages.
International Search Report and Written Opinion for International Application No. PCT/US2018/057874, dated Jan. 10, 2019, 10 pages.
International Search Report and Written Opinion for International Application No. PCT/US2020/063577, dated Apr. 14, 2021, 9 pages.
International Search Report and Written Opinion for International Application No. PCT/US2022/016963, dated Jun. 3, 2022, 15 pages.
"Learn How to Pilot in Less Than 2 Minutes," Wepulsit, http://www.wepulsit.com/, 2017, 3 pages.
"InnovRC Firmware v1.2," InnovRC, [Online], Retrieved from the Internet: http://www.innovrc.de/ivrcwiki/index.php?title=Hauptseite, Mar. 2013, 2 pages.
Office Action for U.S. Appl. No. 17/679,471, dated Apr. 29, 2022, 11 pages.
Office Action for U.S. Appl. No. 13/797,184, dated Mar. 2, 2015, 16 pages.
Office Action for U.S. Appl. No. 13/797,184, dated Oct. 16, 2015, 15 pages.
Office Action for U.S. Appl. No. 15/071,624, dated May 17, 2016, 20 pages.
Office Action for U.S. Appl. No. 15/394,490, dated Nov. 21, 2018, 10 pages.
Office Action for U.S. Appl. No. 15/796,744, dated Aug. 7, 2019, 21 pages.
Office Action for U.S. Appl. No. 15/796,744, dated Dec. 21, 2018, 8 pages.
Office Action for U.S. Appl. No. 15/964,064, dated Mar. 18, 2019, 11 pages.
Office Action for U.S. Appl. No. 16/163,561, dated Dec. 11, 2018, 13 pages.
Office Action for U.S. Appl. No. 16/163,563, dated Dec. 12, 2018, 22 pages.
Office Action for U.S. Appl. No. 16/163,565, dated Dec. 19, 2018, 39 pages.
Office Action for U.S. Appl. No. 16/682,509, dated Jul. 20, 2020, 11 pages.
Office Action for U.S. Appl. No. 16/682,509, dated Mar. 16, 2021, 26 pages.
Office Action for U.S. Appl. No. 16/858,202, dated Dec. 30, 2020, 7 pages.
Office Action for U.S. Appl. No. 16/858,212, dated Jan. 29, 2021, 7 pages.
Office Action for U.S. Appl. No. 16/858,217, dated Feb. 3, 2021, 7 pages.
Office Action for U.S. Appl. No. 17/110,576, dated Apr. 1, 2022, 24 pages.
Office Action for U.S. Appl. No. 17/110,576, dated Aug. 10, 2021, 27 pages.
Office Action for U.S. Appl. No. 17/110,576, dated Jan. 29, 2021, 25 pages.
Office Action for U.S. Appl. No. 17/155,946, dated Aug. 2, 2021, 7 pages.
Office Action for U.S. Appl. No. 17/155,946, dated Feb. 16, 2022, 8 pages.
Pamplona, V. F. et al., "The image-based data glove," Proceedings of the 10th Symposium on Virtual and Augmented Reality, (SVR'2008), Joao Pessoa, Brazil, 2008, pp. 204-211.
Partial Supplementary European Search Report for European Application No. 18871801.9, dated May 27, 2021, 15 pages.
Valentak, Z., "[Review] JJRC H37 Baby Elfie: Is it a Worthy Successor?," DronesGlobe, [Online], Retrieved from the Internet: http://www.dronesglobe.com/review/baby-elfie/, Oct. 7, 2017, 5 pages.
Wilbert, J. et al., "Semi-robotic 6 degree of freedom positioning for intracranial high precision radiotherapy; first phantom and clinical results," Radiation Oncology, vol. 5, No. 42, 11 pages, May 2010.
Zhai, X., "Human performance in six degree of freedom input control," Doctoral Dissertation University of Toronto, Graduate Department of Industrial Engineering, 179 pages, 1995.
Office Action for European Application No. 17865929.8, dated Nov. 11, 2022, 7 pages.
Office Action for U.S. Appl. No. 17/669,580, dated Nov. 23, 2022, 16 pages.
Office Action for U.S. Appl. No. 17/679,471, dated Dec. 14, 2022, 13 pages.
Office Action for U.S. Appl. No. 17/679,471, dated Sep. 6, 2022, 13 pages.
Office Action for U.S. Appl. No. 17/729,924, dated Aug. 4, 2022, 14 pages.
Office Action for U.S. Appl. No. 17/729,924, dated Nov. 17, 2022, 7 pages.

* cited by examiner

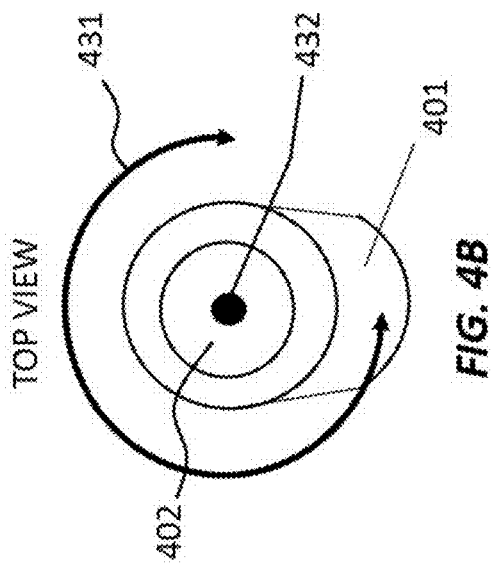
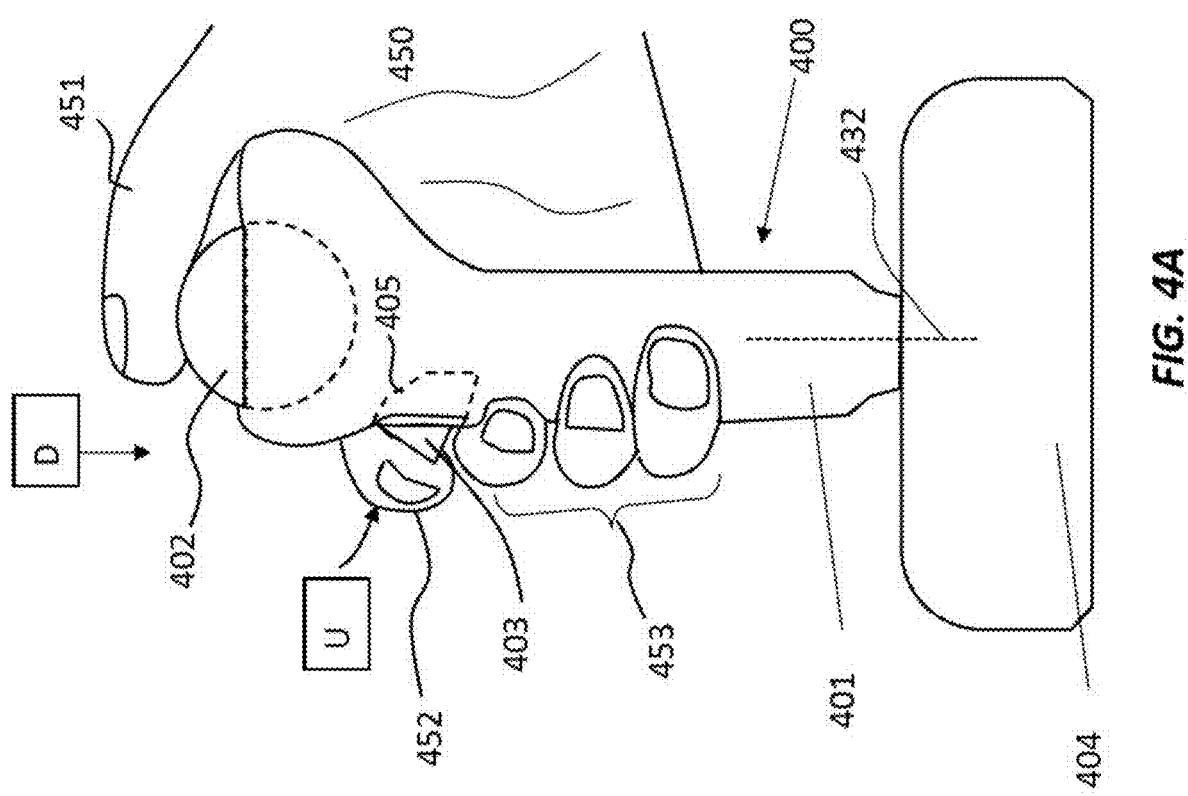
FIG. 4B
FIG. 4A

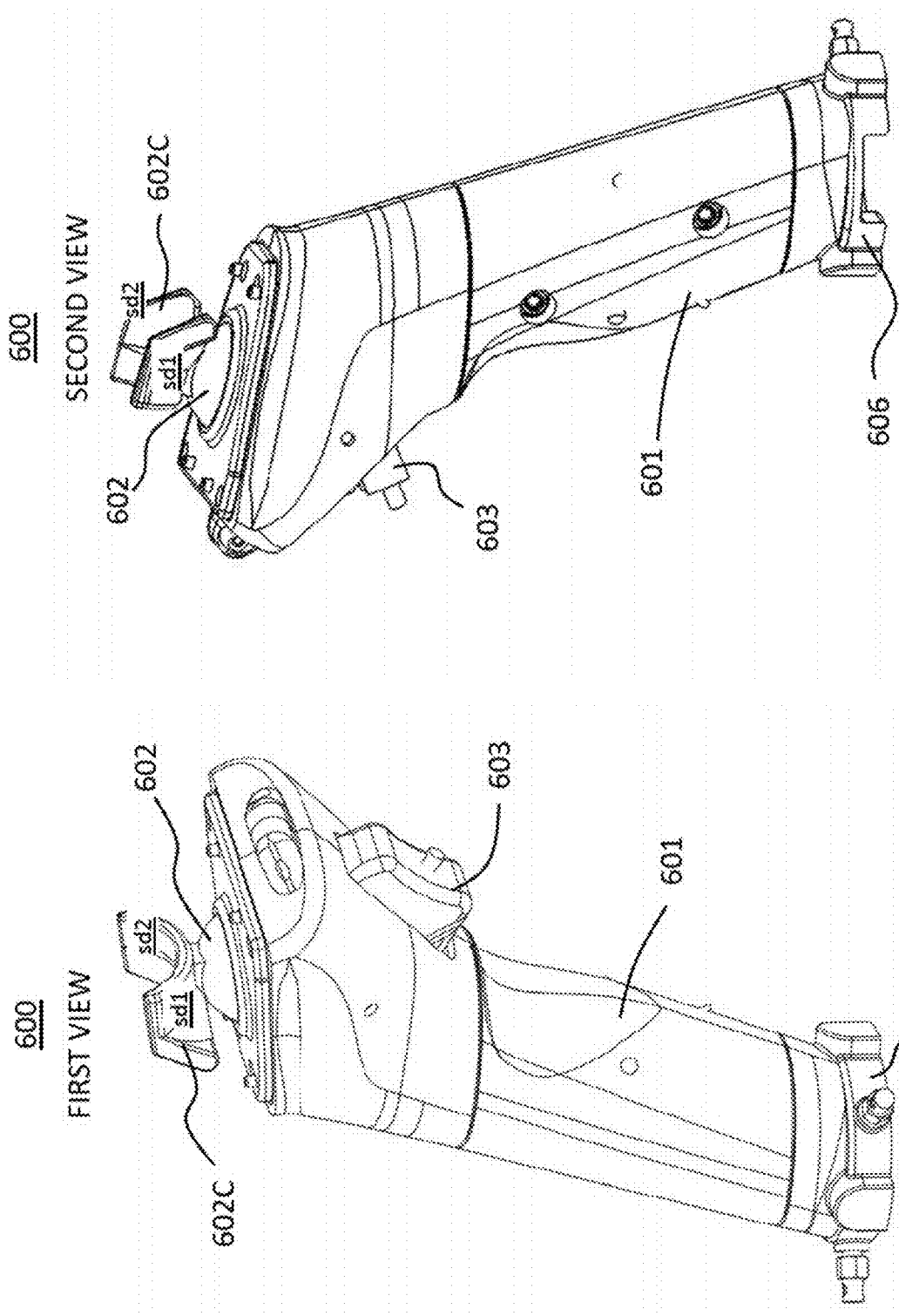

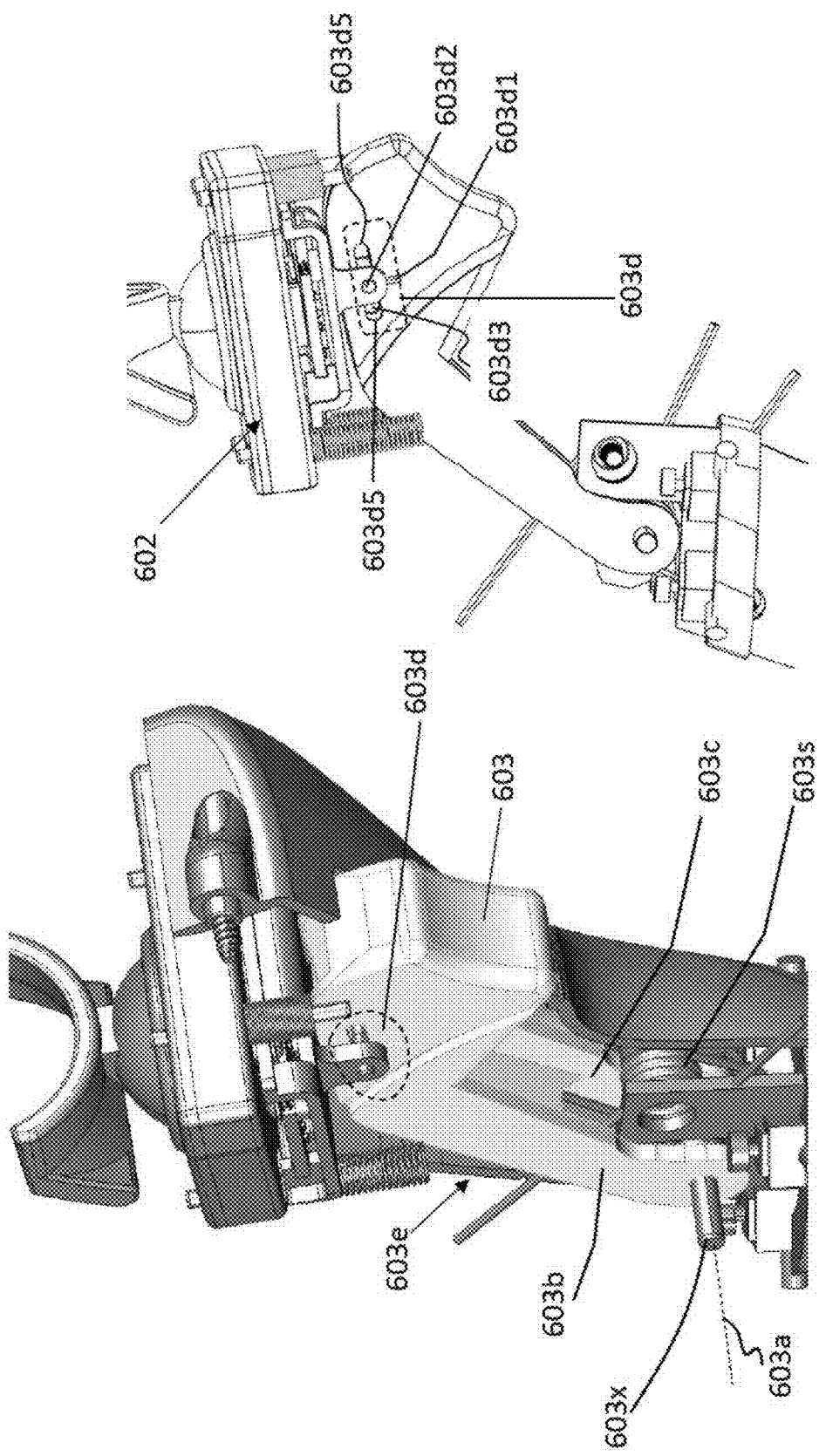

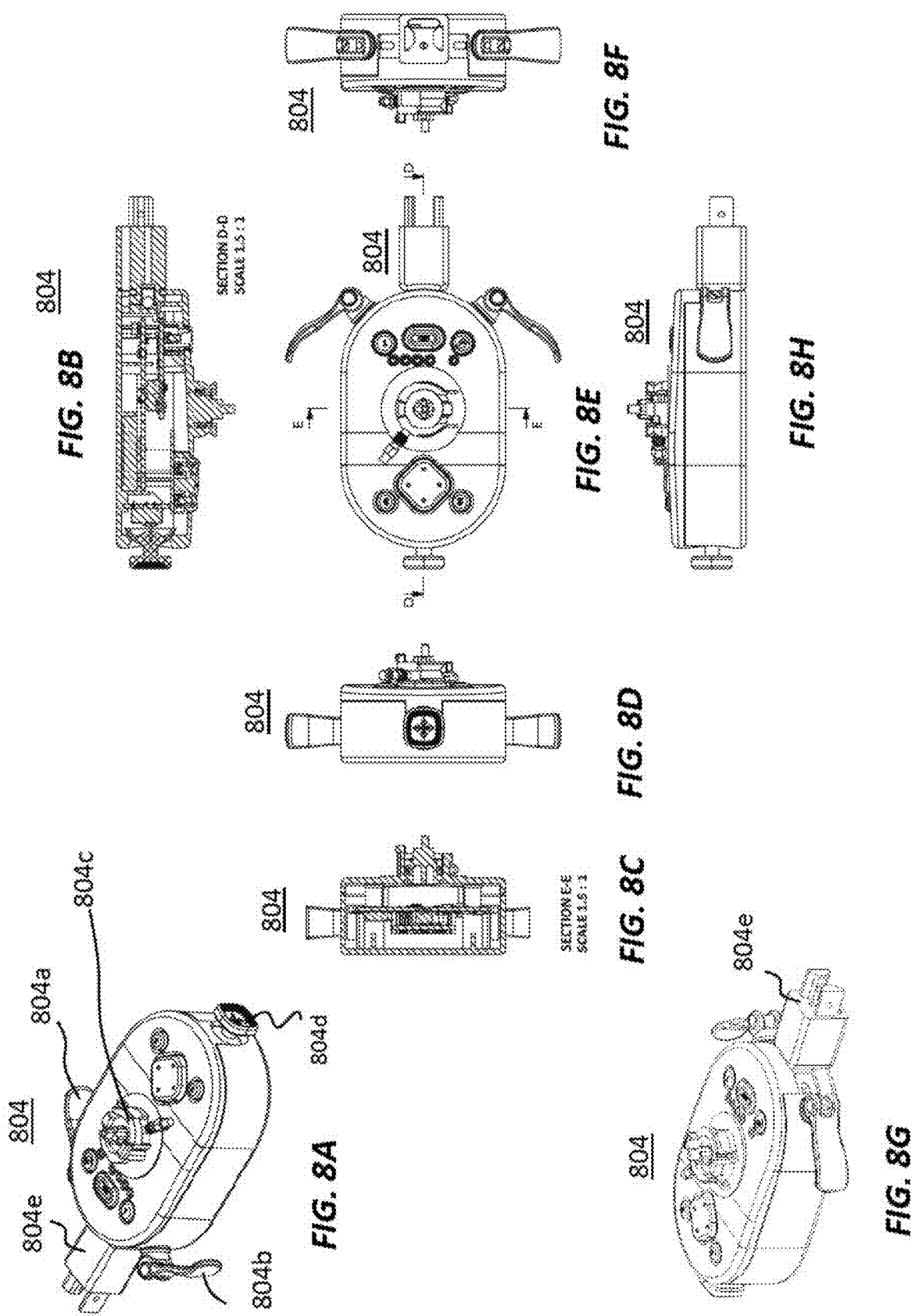

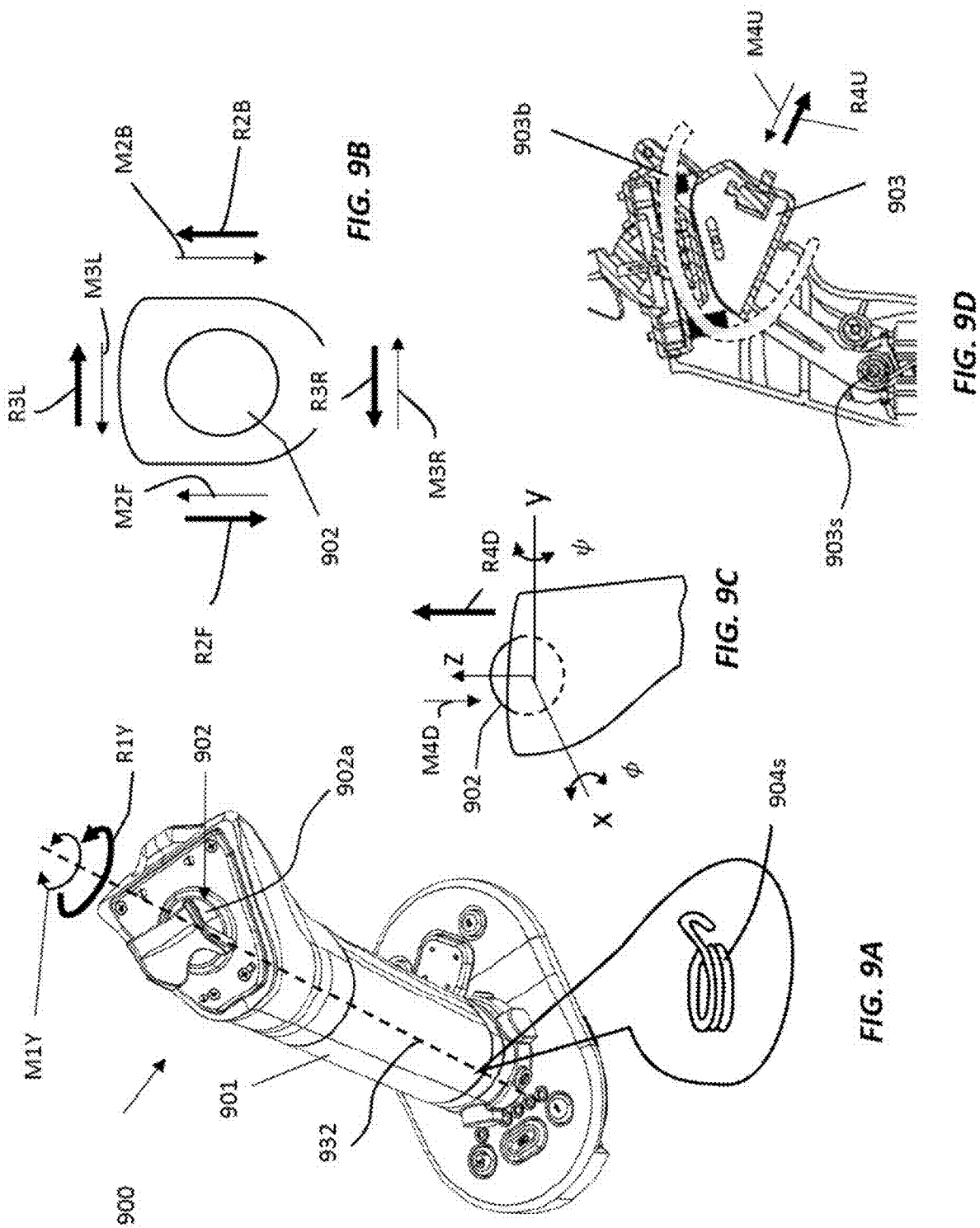

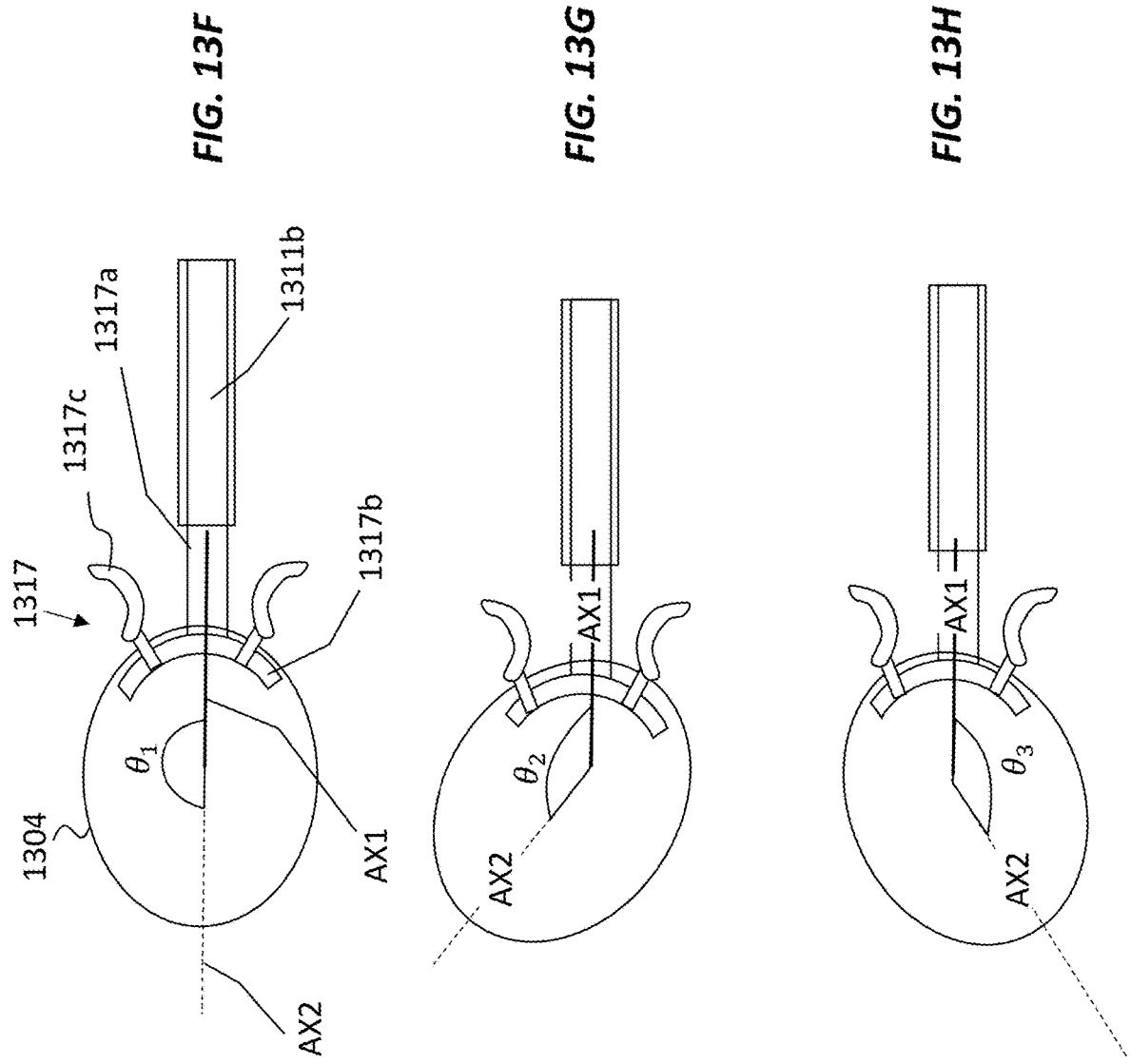

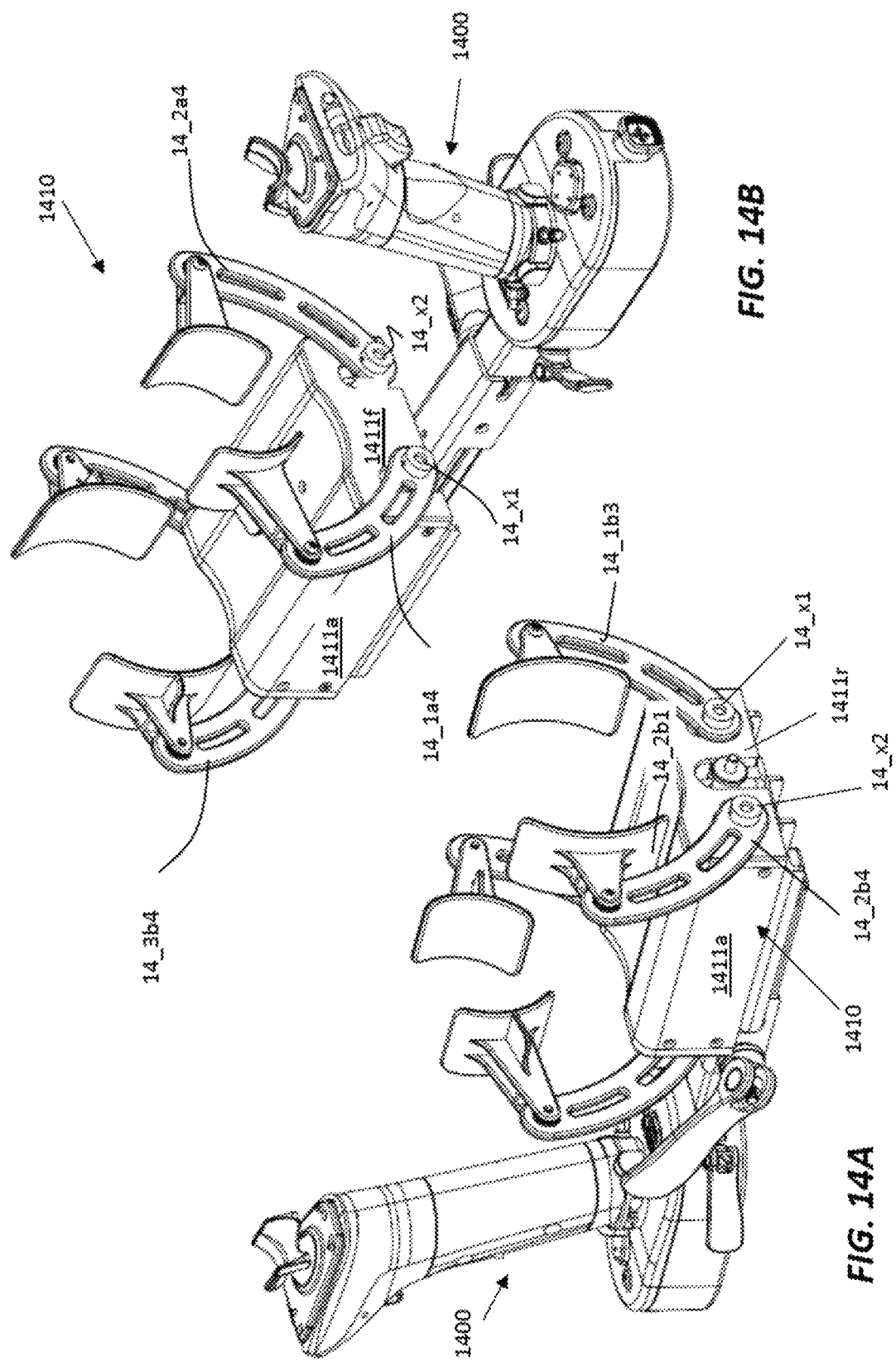

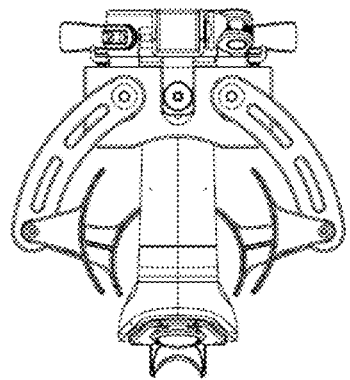
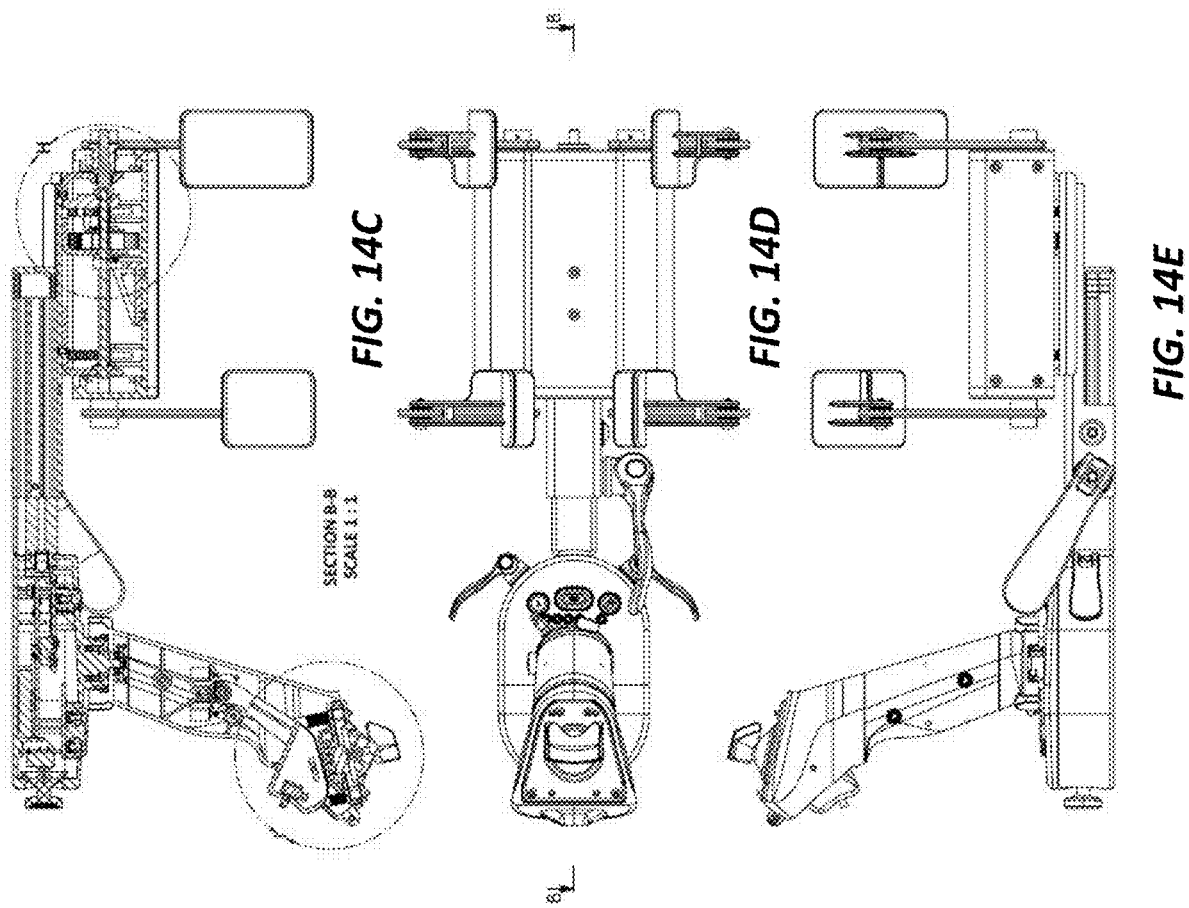
*FIG. 14F*
*FIG. 14C*
*FIG. 14D*
*FIG. 14E*

SYSTEM AND METHODS FOR CONTROLLING MOTION OF A TARGET OBJECT AND PROVIDING DISCRETE, DIRECTIONAL TACTILE FEEDBACK

TECHNICAL FIELD

The present disclosure relates generally to control systems and more particularly to a modular hand controller that provides a user with the ability to send navigation signals using a controller that is operable with a single hand as an extension of the user's body. The present disclosure also relates to a forearm brace that can be used to attach to a controller, such as the hand controller described herein.

BACKGROUND

Conventionally, multiple discrete controllers are utilized to allow a user to control the motion of a target object having more than three degrees of freedom. For example, a set of independent controllers (e.g., joysticks, control columns, cyclic sticks, foot pedals, and/or other independent controllers) are used to control the motion of a target object (e.g., an aircraft, a submersible vehicle, a spacecraft, a robotic arm, a target object in a real or virtual environment, and/or a variety of other control target objects). The set of independent controllers is configured to control navigational parameters related to the motion of the target object. Such navigational parameters include a position of the target object in a three-dimensional (3D) space (e.g., the position may include an altitude of the target object), translations (e.g., x-, y-, and z-axis movement) in a three-dimensional (3D) space, orientations (e.g., pitch, yaw, and roll), velocity, acceleration, and/or a variety of other navigational parameters. In many cases, to control the multitude of the navigational parameters for the motion of the target object, a user may require both hands, which results in possibility of errors due to failure in hand coordination. Accordingly, there is a need for a novel control system to alleviate these errors and to further simplify controlling the motion of the target object.

SUMMARY

The present disclosure describes a hand controller configured to control a multitude of navigational parameters associated with the motion of a target object using a single hand. The present disclosure also describes a forearm brace with a quick-release mechanism that permits the forearm brace to quickly attach to or release from a forearm of a user.

In some embodiments, a controller for controlling a target object is provided. The controller includes a first control member movable with one or two independent degrees of freedom (DoFs) and providing in response thereto a set of first control inputs, and a second control member coupled to the first control member, the second control member movable with three independent DoFs independently of the first control member and providing in response thereto a set of three independent second control inputs, where the second control inputs are independent of the first control input. Further the controller includes a third control member coupled to the first control member and the second control member, the third control member movable with one DoF, the one DoF being one of the three DoFs in the set, and providing in response thereto a third control input, wherein the first, the second, and the third control members are configured to be operated by a user's single hand.

In some embodiments, a controller for controlling a target object is provided. The controller includes a first control member movable with only one independent degree of freedom (DoF) and providing in response thereto a first control input, and a second control member coupled to the first control member, the second control member movable with three independent DoFs independently of the first control member and providing in response thereto a set of three independent second control inputs, where the second control inputs are independent of the first control input. Further, the controller includes a third control member coupled to the first control member and the second control member, the third control member movable with one DoF, the one DoF being one of the three DoFs in the set, and providing in response thereto a third control input, and wherein a motion of the third control member causes a motion of a second control member.

In some embodiments, a controller for controlling a target object is provided. The controller includes a first control member movable with only one independent degree of freedom (DoF) and providing in response thereto a first control input, and a second control member coupled to the first control member, the second control member movable with three independent DoFs independently of the first control member and providing in response thereto a set of three independent second control inputs, where the second control inputs are independent of the first control input. Further, the controller includes a third control member coupled to the first control member and the second control member, the third control member movable with only one DoF and providing in response thereto a third control input, wherein the first control member includes at least one vibration haptic motor configured to provide haptic alerts to the user based on at least one of position data or orientation data associated with the target object, and wherein the first, the second, and the third control members are configured to be operated by a user's single hand.

In some embodiments, a forearm brace for attaching to a forearm of a user and a controller is provided. The forearm brace includes a platform having an arm supporting section, the arm supporting section configured to be in contact with the forearm of the user, a securing mechanism for securing the platform to the forearm, and a quick-release mechanism coupled to the securing mechanism and configured to: (a) upon a first user input, engage the securing mechanism to secure the platform to the forearm, and (b) upon a second user input, release the platform from the forearm; and a coupling mechanism for coupling the platform to the controller.

In some embodiments, a system for supporting a controller is provided. The system includes a platform having an arm supporting section, the arm supporting section configured to be in contact with a forearm of a user, a securing mechanism for securing the platform to the forearm, and a quick-release mechanism coupled to the securing mechanism and configured to: (a) upon a first user input, engage the securing mechanism to secure the platform to the forearm, and (b) upon a second user input, release the platform from the forearm; a first coupling mechanism for coupling to the controller; and a second coupling mechanism for coupling the platform to the first coupling mechanism.

In some embodiments, a forearm brace for attaching to a forearm of a user is provided. The forearm brace includes a platform having an arm supporting section, the arm supporting section configured to be in contact with the forearm of the user, a securing mechanism for securing the platform to the forearm, and a quick-release mechanism coupled to the securing mechanism and configured to: (a) upon a first user input, engage the securing mechanism to secure the platform to the forearm; and (b) upon a second user input, release the platform from the forearm.

The foregoing general description and the following detailed description are exemplary and explanatory only and are not restrictive of the claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 4A is an example controller configured to be operated by a user's single hand according to an embodiment.

FIGS. 4B and 4C are schematics showing that an elongated member of a controller is configured to be rotated about a central axis according to an embodiment.

FIGS. 6A-6F are various views of a controller according to an embodiment.

FIG. 6H is an isometric view of a third control member of a controller according to an embodiment.

FIG. 6I is a side view of a controller depicting further details of a third control member according to an embodiment.

FIGS. 8A-8H are side and cross-sectional views of a base of a controller according to an embodiment.

FIGS. 9A-9D are side views and cross-sectional views of a controller with various movements and counter torques (counter forces) indicated, according to an embodiment.

FIG. 13F-13H are various views of a coupling mechanism coupled to a controller according to an embodiment.

FIGS. 14A and 14B show respective back and front isometric views of a forearm brace coupled to a controller according to an embodiment.

FIGS. 14C-14F show various side views and a cross-sectional view of a forearm brace coupled to a controller according to an embodiment.

DETAILED DESCRIPTION

Figure 1:
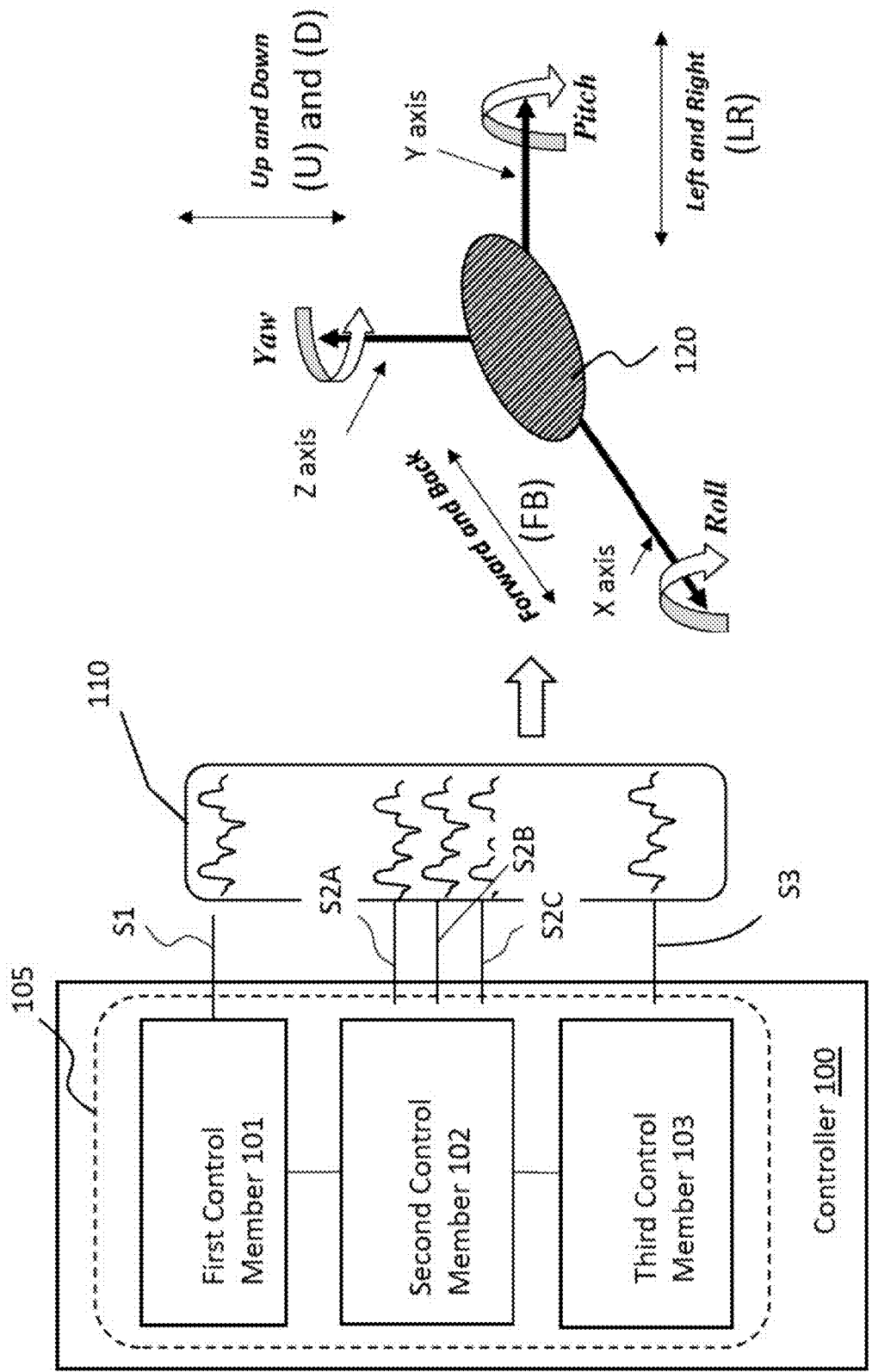
FIG. 1 is an example controller for controlling a motion of a target object according to an embodiment.

Aspects of the present disclosure are related to systems and methods for providing a user with the ability to send navigation signals using a hand controller that may be operable with a single hand, as an extension of the user's body. The hand controller includes several control members that may be operated by a user via user's motion of a wrist and/or fingers.

Specific embodiments are described in detail and are shown in the drawings, with the understanding that the present disclosure is to be considered an exemplification of the principles of the invention and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following description of illustrative embodiments of the invention, and by referring to the drawings that accompany the specification.

The present disclosure describes several embodiments of a control system that allows a user to control movements of a target object using a single controller. In one embodiment, a hand controller may include a first control member for receiving a set of one or two independent first inputs from a user, a second control member that is coupled to the first control member and is configured to receive a set of one, two or three additional inputs from the user, and a third control member that can receive a third input from the user. The user inputs are generated by the user moving, rotating, or pushing first control members in up to two DoFs, the second control member in up to three DoFs, and the third control member in one DoF. In combination, the first control member, the second control member, and the third control member may control four DoFs. In some cases, the combination of the first control member, the second control member, and the third control member may control more than four DoFs (e.g., five or six DoFs). Further, when the target object includes multiple components, each of which may have associated degrees of freedom (e.g., the target object may be a robotic arm having multiple components, or an aerial vehicle having a camera attached to a gimbal system), the combination of the first control member, the second control member, and the third control member may control more than six DoFs (e.g., five DoFs for the motions of an aerial vehicle, and yaw and pitch of a camera coupled to the aerial vehicle). Also, for the camera of the aerial vehicle, a camera zoom can also be classified as a DoF (e.g., the camera zoom may be achieved by a motion of a lens within a lens system associated with the camera).

Further, in addition to controlling various DoFs, the first control member, the second control member, and/or the third control member may also control various operational parameters of the target object, such as a rate of change of a position, orientation, motion, and/or rotation of the target object, or any other additional operational parameters. The additional operational parameters may be associated with control parameters for various sensors and actuators of the target object. The actuators of the target object may include lights emitted by the target object (e.g., laser beams emitted by lasers associated with the target object), audio signals emitted by the audio devices associated with the target object (including, for example, ultrasound generators), devices associated with a camera of the target object (e.g., lens system, lens cleaning devices, gimbals for orienting the camera, and the like), mechanical actuators configured to manipulate objects in an environment of the target object, and the like. The sensors of the target object may include proximity sensors, audio sensors (e.g., ultrasound sensors), one or more visible, infrared, and ultraviolet cameras, one or more haptic sensors, and the like.

The controller is configured to map user inputs to preselected outputs (herein also referred to as motion commands or control inputs) that are used to control a target object. The control members (i.e., the first control member, the second control member, and the third control member) of the controller may be actuated (e.g., moved or rotated) by a user's single hand.

The controller with any one or combination of various features described herein can be used in applications such as flight simulation, computer aided design (CAD), drone flight, aircraft flight, aircraft landing and take-off, fixed wing and rotary wing flight, computer gaming, virtual and augmented reality navigation, aerial refueling, control of medical devices, control of surgical tools (e.g., surgical robotics), control of military equipment, control of yard tools, terrestrial and marine robotic control, control of industrial robots, and many others.

FIG. 1 is a schematic view of an example controller 100 having a first control member 101, a second control member 102, and a third control member 103, herein collectively referred to as control members 105. In an example implementation, the first control member 101 is movable with one or two independent DoFs and providing in response thereto a first control input S1 or a set of first control inputs S1, as indicated in FIG. 1. Further, the second control member 102 is coupled to the first control member 101 and is movable with three independent DoFs independently of the first control member 101. The second control member 102 provides in response to its motion, a set of three independent second control inputs S2A, S2B, and S2C (as shown in FIG. 1), where the second control inputs are independent of the first control input(s) S1. Additionally, the controller 100 includes a third control member 103 coupled to the first control member 101 and the second control member 102, the third control member movable with one DoF. In response to its motion, the third control member provides a third control input S3, as also indicated in FIG. 1. In one embodiment, the third control input S3 is the same as one of the three independent second control inputs S2A, S2B, and S2C.

The control inputs S1, S2A-S2C, and S3 (herein, also referred to as signals) may combined into signal data 110 which is transmitted through a suitable transmitter to a receiver of a target object 120. The target object 120 may be any suitable object capable of motion (e.g., the target object 120 may be a drone, a robotic arm, an aircraft, a submersible vehicle, a spacecraft, a robot, an object in a virtual environment, an autonomous vehicle, such as a car, or any other suitable object capable of motion). It should be noted, that in some implementation (not shown in FIG. 1), the control inputs S1, S2A-S2C, and/or S3 may be transmitted separately to the receiver of the target object 120. Herein, transmitted separately may include transmission at different times, at different transmission radio frequencies, and the like. In some cases, S1 and S3 may be combined into combined signal data, while the signals S2A-S2C may be transmitted separately. Alternatively, the signals S1, S2A-S2C, and S3 may be combined in any other suitable combination.

Upon receiving the signal data 110, the receiver is configured to activate actuators (e.g., various motors, or any suitable motion inducing elements, such as springs under compression or extension, elements actuated by compressed air, and the like) to cause the target object 120 to move. In the implementation, as shown in FIG. 1, the target object 120 can perform at least some of the six DoF motions based on the signal data 110 received from the controller 100. In some cases, the target object 120 is capable of executing six DoFs. Such six DoF motions include three rotation about axis of a coordinate system (X axis, Y axis, and Z axis, as shown in FIG. 1) associated with the target object 120 (e.g., roll, pitch, and yaw rotations) as well as three translational motions such as forward and back (FB) motions (e.g., translations along X axis), left and right (LR) motions (e.g., translations along Y axis) and up (U) and down (D) motions (e.g., translations along Z axis). Further, when the target object 120 includes a system of several coupled objects, with each one of the coupled objects capable of executing at least one DoF, the DoFs of such a system of coupled objects may be controlled. In some cases, the system of several coupled objects may have more than six degrees of freedom, and these DoFs may be controlled by the controller 100.

It should be appreciated, that the controller 100 may, in some cases, control more than one target object when these target objects are moving synchronously (e.g., execute the same translational or rotational motions). For example, the controller 100 may be configured to control an array of drones performing the same functions synchronously. In such case, the control inputs S1, S2A-S2C, and S3 may be transmitted to all of the target objects that are being controlled by the controller 100. Further, in some other embodiments (not shown in FIG. 1), the controller 100 may have an additional switch allowing a user to select a particular target object that needs to be controlled via the controller 100. For example, the user may control a first target object, and then switch to a second target object. In various implementation of the controller 100, the first control member 101, the second control member 102, and the third control member 103 are configured to be operated by a user's single hand and one or more digits thereof.

In some embodiments, the second control member 102 and the third control member 103 are in a dynamic balance. In one dynamic balance configuration, the third control member 103 is coupled to the second control member 102 (e.g., through a linkage) to displace the second control member 102 when the third control member 103 is displaced inwardly by the user squeezing or pulling the third control member 103 with one or more fingers. Pushing down the second control member 102 may, if desired, also push outwardly from the controller 100 the third control member 103, allowing user's thumb or index finger to be dynamically balanced by the user's other digits. Dynamic balance in a controller is disclosed in PCT/US2018/57862, the contents of which are incorporated herein by reference.

Figure 2:
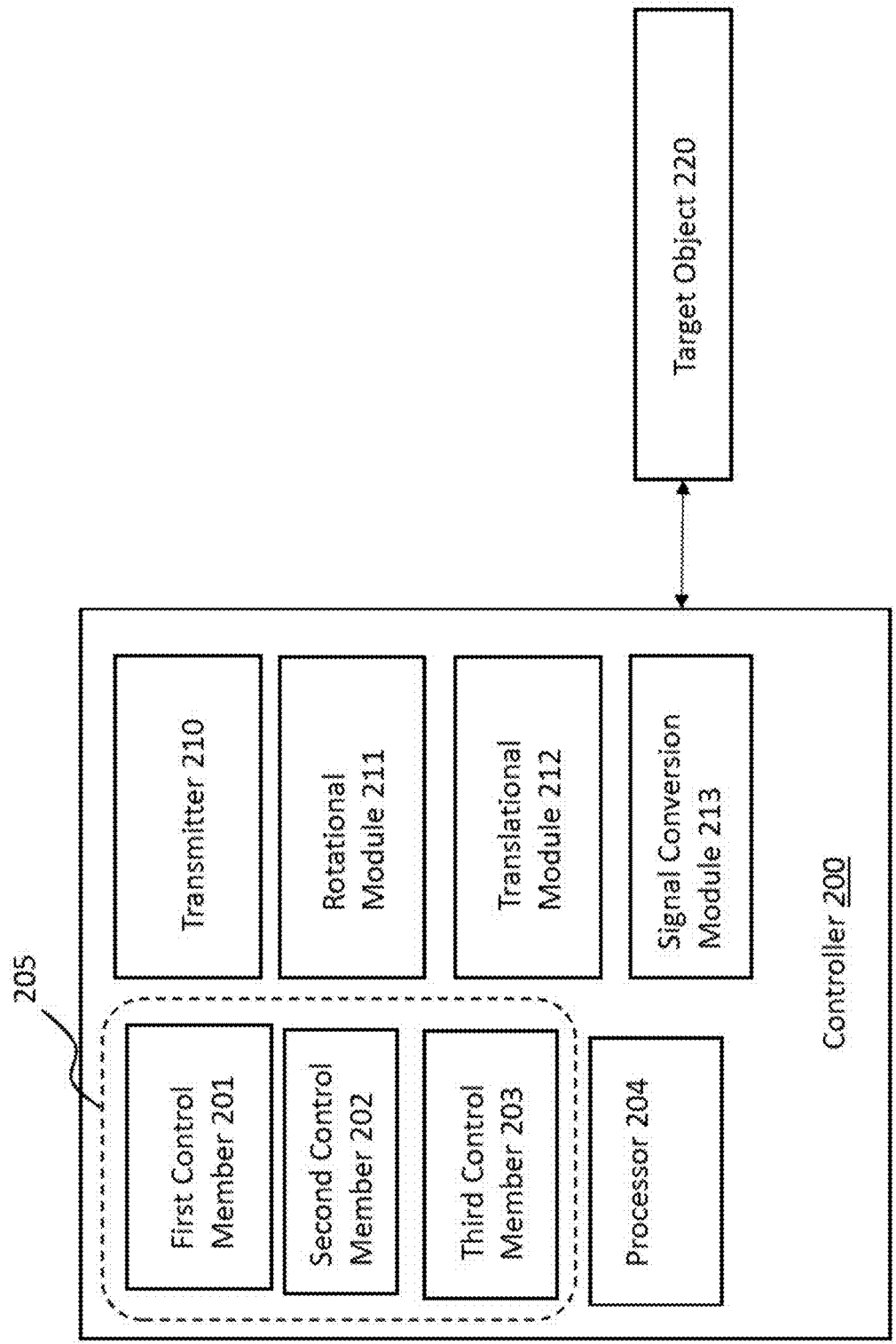
FIG. 2 is an example implementation of the controller according to an embodiment.

FIG. 2 shows an embodiment of a controller 200. The controller 200 can include components that are structurally and/or functionally the same or similar to components of other controllers described herein, including, for example, the controller 100. The controller 200 includes a first control member 201, a second control member 202, and the third control member 203 (herein collectively referred to as control members 205) that are structurally and functionally similar to respective other control members 105 as described herein. The controller 200 further includes a processor 204 coupled to each one of the control members 205. The processor 204 may be a central processing unit, a programmable logic controller, and/or a variety of other processors as may be known by one or more of ordinary skill in the art. The processor 204 is also coupled to a transmitter 210, a rotational module 211, and a translational module 212. While not illustrated or described in any further detail, other connections and coupling may exist between the control members 205, the transmitter 210, the rotational module 211, and the translational module 212, while remaining within the scope of the present disclosure. Furthermore, components of the controller may be combined or substituted with other components as may be known by one or more of ordinary skill in the art while remaining with the scope of the present disclosure.

In an embodiment, the controller 200 is configured to receive input from a user through the control members. For instance, the user may move (e.g., translate or rotate) the control members 205 and these movements of the control members 205 may be processed by a rotational module 211, a translational module 212 and converted into signals for a target object 220 via a signal conversion module 213. The converted signals then may be transmitted to the target object 220 to activate actuators of the target object 220 causing the target object 220 to move.

As shown in FIG. 2, the rotational inputs for the controller 200 (obtained by a user moving his/her wrist and/or his/her fingers) are detected and/or measured using the rotational module 211. For example, the rotational module 211 may include detectors (e.g., sensors) for detecting the rotation of the control members 205 from an equilibrium position (herein, also referred as a null position). In some implementations, the detectors for detecting a rotation of the control members 205 may include photo-detectors for detecting light beams, rotary and/or linear potentiometers, inductively coupled coils, physical actuators, gyroscopes, switches, transducers, Hall effect sensors, optical encoders, load cells, or any other device that can measure angular movement, and/or a variety of other related detectors. In some embodiments, the rotational module 211 may include accelerometers for detecting the movements of the control member 205 from an equilibrium position. For example, the accelerometers may each measure the proper acceleration of the second control member 202 with respect to an inertial frame of reference.

Further, various motions of the control members 205 may be detected and/or measured using breakout switches, transducers, and/or direct switches for each of the three ranges of motion (e.g., rotation or translational movements of control members 205). For example, breakout switches may be used to detect when the one of the control members 205 is initially moved (e.g., rotated by a few degrees) from an equilibrium position. For each range of motion (e.g., rotation or any other motion), transducers may provide a signal that is proportional to the amount of the motion. The breakout switches and direct switches may also allow for acceleration of the control members 205 to be detected. In an embodiment, redundant detectors and/or switches may be provided as components of the controller 200 to ensure that the controller 200 is fault tolerant.

Translational inputs are detected and/or measured using the translational module 212. For example, the translational module 212 may include translational detectors for detecting the displacement one of the control members 205 from a null position characterized by coordinates $\{x_0,y_0,z_0\}=\{0,0,0\}$ to another position characterized by coordinates $\{x,y,z\}$. Translational detectors may include physical actuators, translational accelerometers, and/or a variety of other translation detectors as may be known by one or more of ordinary skill in the art (e.g., many of the detectors and switches discussed above for detecting and/or measuring rotational input may be repurposed for detecting and/or measuring translation input.)

The processor 204 of the controller 200 is configured to generate control inputs (herein also referred to as a control signal) based on one or more rotational inputs detected and/or measured by the rotational module 211 and/or one or more translational inputs detected and/or measured by the translational module 212. Those control signals generated by the controller processor 204 may include parameters defining movement output signals for one or more of six degrees of freedom (6-DOF) (i.e., pitch, yaw, roll, movement along an x-axis, movement along a y-axis, movement along a z-axis). In several embodiments, discrete control inputs (e.g., yaw control input, pitch control input, roll control input, x-axis movement control input, y-axis movement control input, and z-axis movement control input) are produced for discrete predefined movements of the control members 205. A set of first control inputs defining a first set of DoFs for the target object 220 may be generated due to a movement of the first control member 201, a set of second control inputs defining a second set of DoFs for the target object 220 may be generated due to a movement of the second control member 202, and a set of third control inputs defining a third set of DoFs for the target object 220 may be generated due to a movement of the third control member 203.

In some implementations, the set of first control inputs includes one control input, and the set of first DoFs includes one DoF. Additionally, or alternatively, the set of third control inputs includes one control input, and the set of third DoFs includes one DoF.

Beyond 6-DoF control, discrete features such as ON/OFF, trim, onboard camera pan and tilt, and other multi-function commands may be transmitted to the target object 220. Conversely, data or feedback from the target object 220 may be received by the controller 200 (e.g., an indicator such as an LED may be illuminated green to indicate the controller 200 is on. Any other feedback from the target object 220 may be transmitted to the processor 204 and/or to any auxiliary devices that can be configured to analyze and/or visualize the feedback. For example, an auxiliary device may include an electronic device containing a display (e.g., a smartphone, tablet, head-mounted display or laptop) that may visualize the feedback received from the target object

220. For example, the display of the auxiliary device may show parameters related to movements of the target object 220. Such parameters may include coordinates of the target object 220, velocity vector of the target object 220, acceleration vector of the target object 220, amount of power (e.g., amount of a fuel, remaining of a battery power, and the like) left to power the target object 220, performance of various components of the target object 220, temperature of various components of the target object 220, or any other parameters for the target object 220 affecting the performance of the target object 220. In some cases, the feedback from the target object 220 may indicate that the operations of the target object 220 need to be stopped or that the intensity at which the target object 220 operates needs to be reduced. Alternatively, in some cases, the feedback from the target object 220 may indicate that the intensity at which the target object 220 operates needs to be increased.

The control signals generated by the processor 204 may be processed by a signal conversion module 213. For example, the signal conversion module 213 may include an associated processor (or use the processor 204) coupled to a computer-readable medium including instructions that, when executed by the processor, cause the processor to provide a control program that is configured to convert the control signals into control inputs (herein, also referred to as motion commands). In an embodiment, the processor may convert the control signal into motion commands for a virtual three-dimensional (3D) environment (e.g., a virtual representation of surgical patient, a video game, a simulator, and/or a variety of other virtual 3D environments as may be known by one or more of ordinary skill in the art). Thus, the target object 220 may exist in a virtual space, and the user may be provided a point of view or a virtual representation of the virtual environment from a point of view inside the target object 220 (e.g., the control system 200 may include a display that provides the user a point of view from the target object 220 in the virtual environment). In another example, as previously discussed, the target object 220 may be a physical device such as a robot, an end effector, a surgical tool, a lifting system, etc., and/or a variety of steerable mechanical devices, including, without limitation, vehicles such as unmanned or remotely-piloted vehicles (e.g., drones); manned, unmanned, or remotely-piloted vehicles and land-craft; manned, unmanned, or remotely-piloted aircraft; manned, unmanned, or remotely-piloted watercraft; manned, unmanned, or remotely-piloted submersibles; as well as manned, unmanned, or remotely-piloted space vehicles, rocketry, satellites, and such like.

Further, the signal conversion module 213 includes operating parameters when generating motion commands using the signals from the controller 200. Operating parameters may include, but are not limited to, gains (i.e., sensitivity), rates of onset (i.e., lag), deadbands (i.e., neutral), limits (i.e., maximum angular displacement), and/or a variety of other operating parameters as may be known by one or more of ordinary skill in the art. In some implementations, the gains of control members 205 may be independently defined by a user.

In an embodiment, operating parameters may also define how signals sent from the controller 200 in response to the different movements of the control members 205 are translated into motion commands that are sent to the target object 220. In an example implementation, the operating parameters may define which motion commands are sent to the target object 220 in response to movements and resulting movement output signals from the control members 205. Thus, operating parameters, allow one to "program" the operation of the controller 200.

In some cases, the operating parameters may be received from an external computing device (not shown) operated by the user. For example, the external computing device may be preconfigured with software for interfacing with the controller 200. In other embodiments, the operating parameters may be input directly by a user using a suitable display screen (e.g., a display screen associated with an auxiliary electronic device such as a smartphone) coupled with the controller 200.

In an embodiment, the motion commands generated by the signal conversion module 213 may be transmitted by the transmitter 210 to a receiver of the target object 220. The transmitter 210 of the controller 200 is configured to transmit the control signal through a wired or wireless connection. For example, the control signal may be one or more of a radio frequency ("RF") signal, an infrared ("IR") signal, a visible light signal, and/or a variety of other control signals as may be known by one or more of ordinary skill in the art. In some embodiments, the transmitter 210 may be a Bluetooth transmitter configured to transmit the control signal as an RF signal according to one of the known Bluetooth protocols.

In some embodiments, a feedback signal from target object 220 may be received by the transmitter 210. The received feedback signal may allow the user of the controller 200 to adjust the movement of the target object 220 to, for example, avoid a collision with a designated region (e.g., target objects in a real or virtual environment, critical regions of a real or virtual patient, etc.). The feedback signal may be presented to the user visually (e.g., lights that light up on the controller 200), or, when a display is available for the user, via the display. In some cases, the feedback signal may be presented as a haptic signal (e.g., vibration of the control members 205), or increased resistance to motion for the control members 205.

Figure 3:
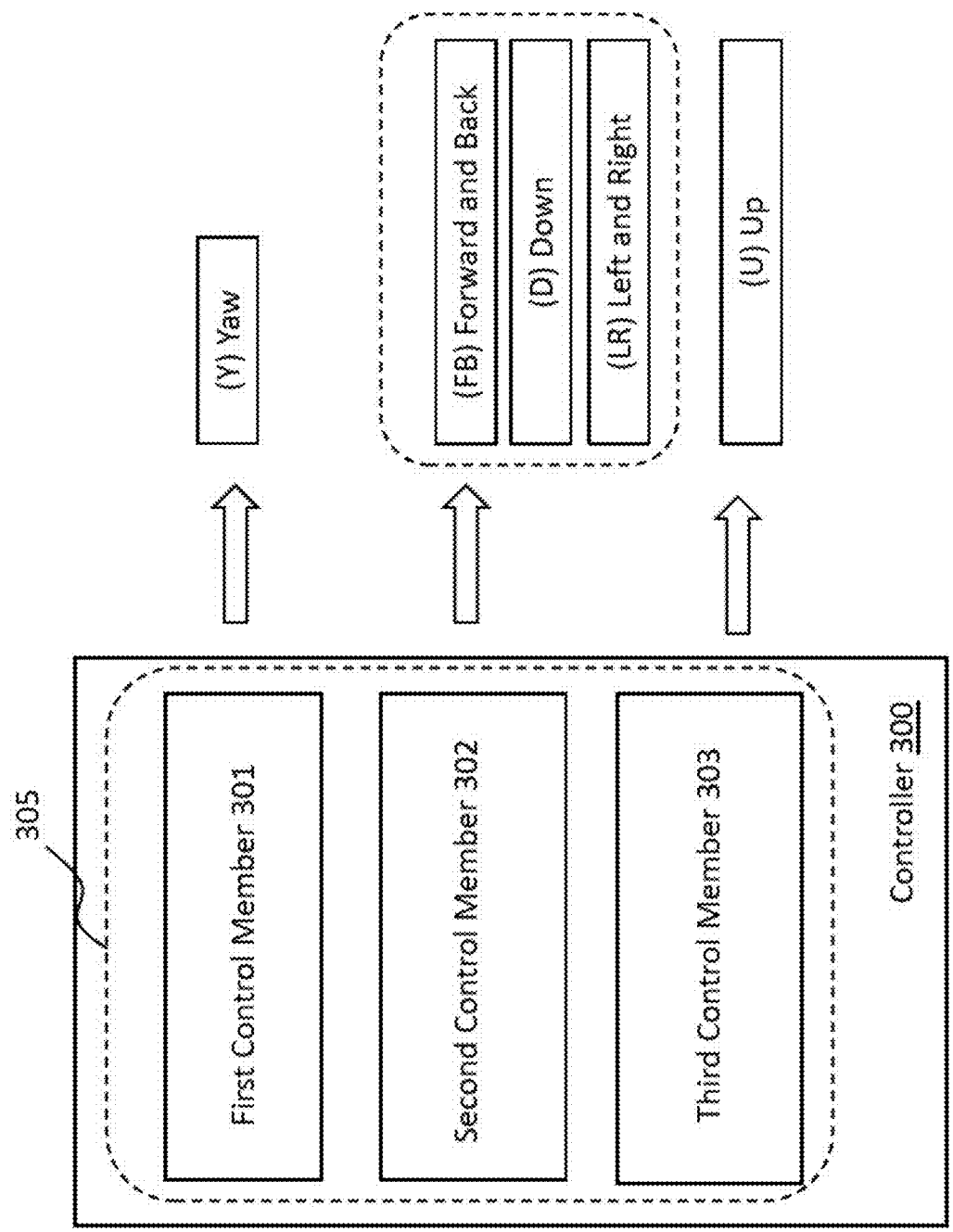
FIG. 3 is a diagram that relates motion commands for a target object to movements of control members of a controller according to an embodiment.

FIG. 3 shows an example embodiment of a controller 300 which can include components that are structurally and/or functionally the same or similar to components of other controllers described herein, including, for example, the controller 100 or the controller 200. For example, the controller 300 includes a first control member 301, a second control member 302, and a third control member 303 (herein collectively referred to as the control members 305), which are structurally and/or functionally the same respectively as the control members 105 or 205. In the example embodiment as shown in FIG. 3, the first control member 301 is configured to control a yaw (Y) rotation of a target object, and the second control member 302 is configured to provide a set of three independent second control inputs, where the second control inputs are independent of the first control input. In some cases, the first controller 301 may have an additional DoF (e.g., besides being twisted it might move, for example forward and back). Such additional DoF may correspond to controlling a DoF of the target object (e.g., forward and back motion of the first control member 301 may control a pitch of the target object). Additionally, in some cases, the first control member 301 may have other DoFs. For example, the first control member 301 may be configured to move up and/or down along the axis of the first control member 301 and relative to the base of the first control member 301 upon forces exerted by a wrist of the user. In some cases, downward pressure from the user's wrist onto the first control member 301 (e.g., a pressure force towards a base that supports the first control member 301) may lead to the downward motion of the first control member 301. Such a downward motion of the first control member 301 may result in the controller 300 transmitting a signal to the target object that causes a downward motion of the target object. Further, the first control member 301 may be configured to move upward upon a pulling force exerted by a wrist of the user. The upward motion of the first control member 301 may result in a transmitted signal to the target object that causes an upward motion of the target object. In various embodiments, a biasing member (e.g., a spring) may be used to return the first control member 301 into a neutral position after completion of the upward or downward motion of the first control member 301.

Further, controller 300 may include one or more sensors for detecting one or more forces that are exerted by a user on the first control member 301. For example, a user may exert a downward pressure, a leftward side pressure, a rightward side pressure, a forward side pressure, a backward side pressure, an upward pull force, or combination thereof on the first control member 301 and a suitable sensor (e.g., a pressure sensor such as a piezoelectric sensor, or any other pressure sensor) may be configured to detect the forces exerted by a user's wrist. In response to an amplitude and a direction of the exerted force, the controller 300 may be configured to control the motion of the target object. For example, the downward pressure force onto the first control member 301 (e.g., pressure onto the first control member 301 towards the base supporting the first control member 301) may result in a transmitted signal to the target object that causes the target object to move downwards, while the upward pull force onto the first control member 301 may result in a transmitted signal to the target object that causes the target object to move upward. Similarly, other pressure forces (e.g., leftward, rightward, forward, and backward side pressure forces) may result in a transmitted signal to the target object that causes the target object to move respectively leftward, rightward, forward, or backward. In some cases, the amplitude of the exerted force in a particular direction (e.g., the downward pressure exerted onto the first control member 301) may determine a speed and/or acceleration with which the target object is moving in that direction (e.g., the speed and/or acceleration with which the target object is moving downwards). In some cases, the amplitude of the exerted force in a particular direction determines a speed of the target object, and a change in the amplitude of the exerted force in a particular direction determines an acceleration of the target object in that particular direction. For instance, when a user reduces the amplitude of the downward pressure exerted onto the first control member 301, the target object decreases its speed when moving downwards.

In an example implementation, the set of three independent control inputs provided by the second control member corresponds to three translational movements. For example, various movements of the second control member 302 may correspond to translational motion along X axis of the coordinate system associated with the target object (e.g., FB motion), translational motion along Y axis of the coordinate system associated with the target object (e.g., LR motion), and translational motion along Z axis of the coordinate system associated with the target object (e.g., D motion of the target object), as further described below in relation to FIGS. 4A-4E. Further, the third control member 303 may also be configured to control translational motion along Z axis of the coordinate system associated with the target object (e.g., U motion of the target object). It should be appreciated that the embodiment shown in FIG. 3 is only one possible way of implementing a controller such as the controller 100 or the controller 200. In another implementation, the second control member, for example, may be configured to control FB, LR, U, and D movements of the target object, in combination with the third control member controlling U motion of the target object. Further, other implementations are possible as well (e.g., the second control member may control roll of the target object, and/or the first controller may control FB motion of the target object).

FIGS. 4A-4E show an example embodiment of a controller 400 which can include components that are structurally and/or functionally the same or similar to components of other controllers described herein, including, for example, the controllers 100-300. The controller 400 includes a first control member 401 in a form of an elongated member having a central axis 432. The elongated member may be similar to a joystick. The first control member 401 is coupled to a base 404 and is configured to be gripped by a user's single hand 450. In the example embodiment shown in FIG. 4B, the first control member 401 is configured to rotate about the central axis 432 according to an arrow 431 (e.g., the first control member 401 is configured to rotate in a clockwise and counterclockwise direction about the central axis 432). The rotation of the first control member 401 of the controller 400 is further shown in FIG. 4C via arrows 431 about the central axis 432. Such rotations are translated into a motion command (e.g., a command to execute a yaw motion) for a target object.

It should be appreciated that the controller 400 may be programmable. For example, the rotation of the first control member 401 about the central axis 432 may be programmed to correspond to a yaw rotation of the target object. In one example implementation, programming the controller 400 may include uploading firmware via a wireless (e.g., WiFi, Bluetooth, and the like), or wired connection from an auxiliary electronic device (e.g., a smartphone, a laptop, a desktop, a USB drive, a smartcard, and the like), or connecting the controller to an auxiliary electronic device and configuring the controller through a suitable interface (e.g., an application for the controller) residing on that auxiliary electronic device.

In some instances, the controller 400 may be updated without resorting to the use of auxiliary electronic device. For example, the controller 400 may include buttons, screen, and/or a touch screen and the like, that can be used to update parameters of the controller 400. For instance, the screen of the controller 400 may include options that can be selected using suitable one or more buttons of the controller 400. In some cases, when the controller 400 includes the touch screen, parameters on the touch screen may be selected. Further, a combination of buttons may be used to update certain features of the controller 400. Additionally, or alternatively, buttons may be configured to be pressed for a specific period of time to cause certain updates of the controller 400. In various cases, various button actions (e.g., actions of pressing buttons) may be combined to cause updates of the controller 400.

Figure 4C:
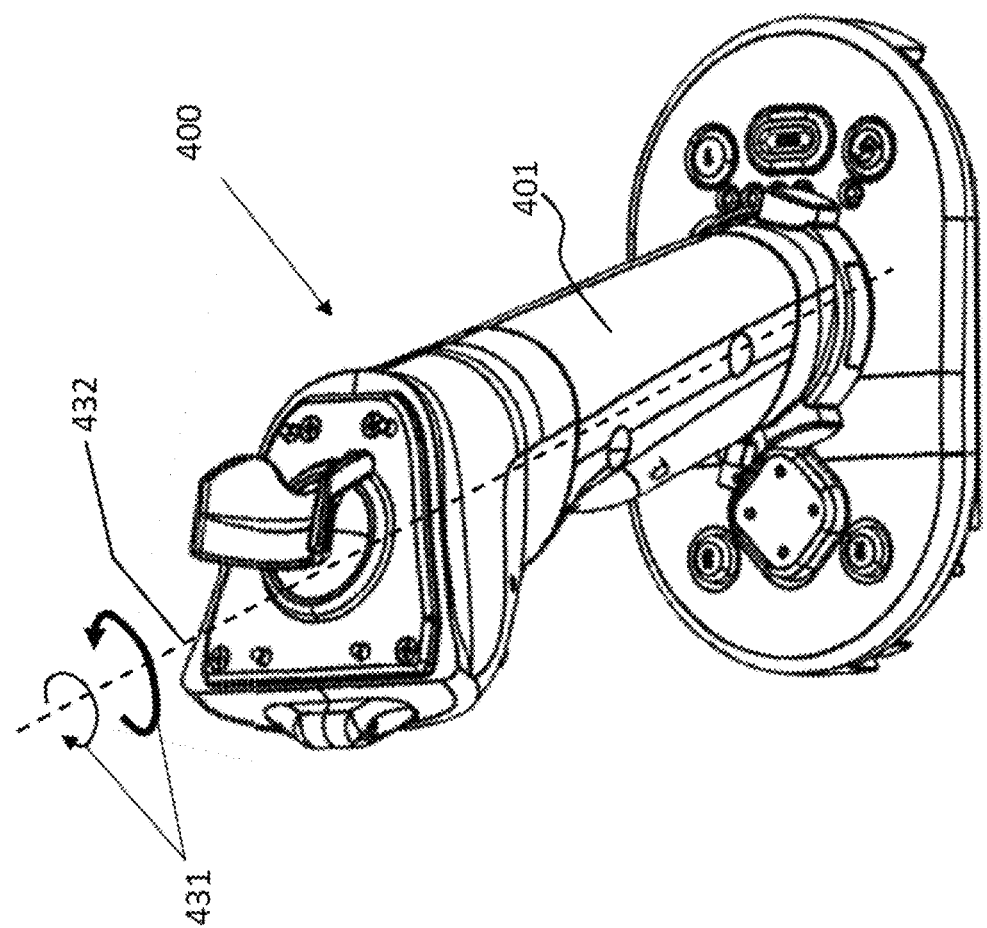
Figure 4E:
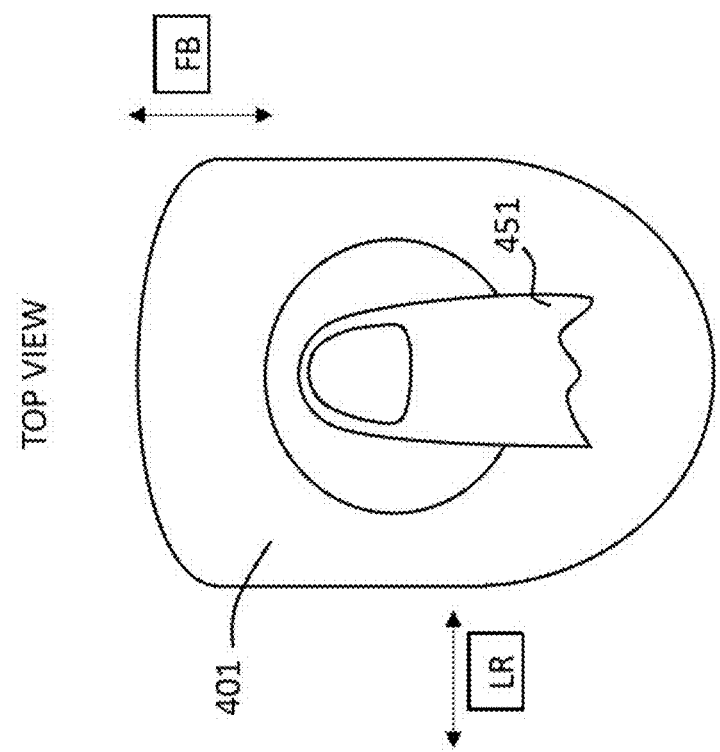
FIGS. 4D and 4E show respectively a side view and a top view of a controller according to an embodiment.
Figure 4D:
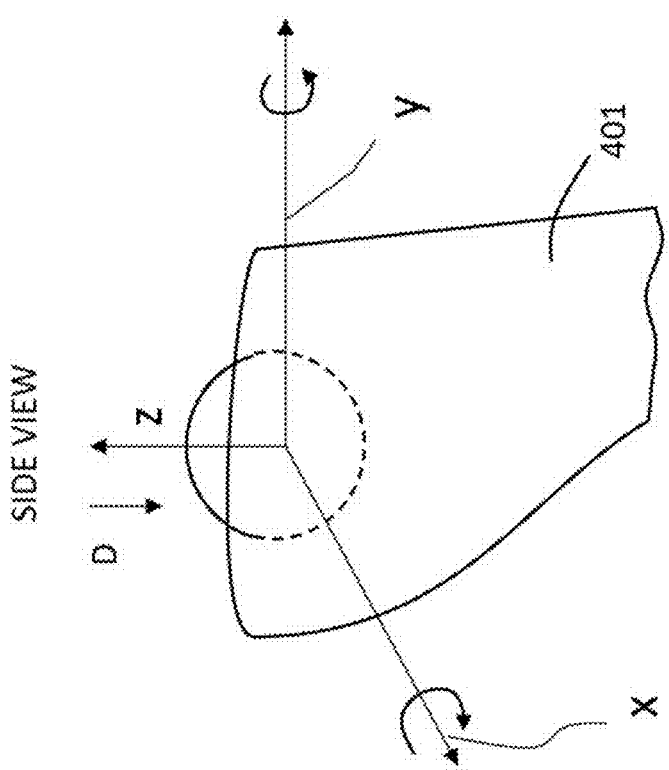

As shown in FIG. 4A, the second control member 402 may have a shape of a portion of a sphere and be located at a top of the first control member 401. The second control member 402 is configured to be manipulated by a thumb 451 of the user's hand 450. In one implementation, shown in FIGS. 4A-4E, the movement of the second control member 402 allows the user to provide translational inputs to the target object. As shown in FIG. 4D, inputs from the user's thumb 451 include rotations about x axis of a coordinate system associated with the second control member 402, and y axis of the coordinate system associated with the second control member 402. Such rotations can be mapped into motion commands of the target object. For example, rotations about x axis may be mapped into FB translational motions of the target object while rotations about y axis may be mapped into LR translational motions of the target object, as indicated by a top view of the second control member 402, as shown in FIG. 4E. Further, as shown in FIG. 4D, a downward motion (e.g., a push of the thumb 451 onto the second control member 402) along z axis of the coordinate system associated with the second control member 402 may be mapped into a D translational motion for the target object.

It should be appreciated that a second control member (similar to the second control member 402) may be implemented not only as a spherical/hemispherical object but in any other suitable way that can be actuated by a thumb of the user. For example, in some embodiments, the second control member may be implemented also as a small, elongated member capable of tilting front and back, tilting side-to-side, and moving up and down. For example, the second control member may be a small joystick operatable by a thumb of the user. In such implementation, tilting the second control member forward and backward may provide the FB translational motion for a target object, tilting the second control member side to side may provide the LR translational motion for the target object, and moving the second control member down may provide the D translational motion for the target object.

Further, similar to the first control member (e.g., the control member 401), the second control member (e.g., the control member 402) may be programmed in any suitable way. For example, instead of mapping rotations about x axis of the second control member 402 to FB translational motions of the target object, such rotations may be mapped into pitch rotations of the target object. Similarly, rotations about y axis of the second control member 402 may be mapped into roll rotations for the target object (instead of being mapped into LR translational motion of the target object). Any other mapping may be used, and the controller 400 may be updated via an auxiliary electronic device, as described above.

In various embodiments discussed herein, a second control member (e.g., the second control member 402) is configured to be moved solely by a thumb of the user (e.g., thumb 451, as shown in FIG. 4A) while the user is gripping the first control member (e.g., the first control member 401) with a hand (e.g., the hand 450).

As discussed above, a suitable module is configured to detect and/or measure signals from a second control member (e.g., the second control member 402). For example, a rotational module such as the rotational module 311 is configured to detect rotation of the second control member 402 about x and y axis. Further, a translational module such as translational module 312 is configured to measure translational movements of the second control member 402 about the z axis. For example, the rotational or the translational module includes detectors for detecting the rotations or displacement of the second control member 402 from a null position due to actuations by a thumb of the user. As discussed above, translation and rotation detectors may include physical actuators, accelerometers, and/or a variety of other detectors as may be known by one or more of ordinary skill in the art (e.g., many of the detectors and switches discussed above for detecting and/or measuring rotational or translational input.

Further, the third control member 403 can be reached and manipulated by a user's finger (e.g., by an index finger 452, as shown in FIG. 4A). Other user's fingers 453 may wrap around the first control member 401. In the example implementation, as shown in FIG. 4A, the third control member 403 may be implemented as a trigger element configured to move in and out of a socket 405 within the first control element 401. In some other implementations, the third control member 403 may be implemented as a button, as a spherical/hemispherical element, and the like.

In an example implementation, a motion command corresponding to the movement of the third control member 403 may be for a DoF motion of the target object that is also the degree of freedom for the target object controlled by the second control member 402. For example, the second control member 402 may control the D motion of the target object and the third control member 403 may control the U motion of the target object, where the D and U motions correspond to a single degree of freedom (e.g., translation along Z axis, as shown in FIG. 1). In some implementations, when the second control member 402 is pressed downwards (e.g., toward a base 404 of the controller 400) by thumb 451 of the user, as shown in FIG. 451, the third control member 403 is configured to be pushed out of the socket 405 of the first control member 401. Alternatively, when the third control member 403 is pushed into the socket 405, the second control member 402 may be configured to be pushed upwards (e.g., away from the base 404 of the controller 400).

Figure 5:
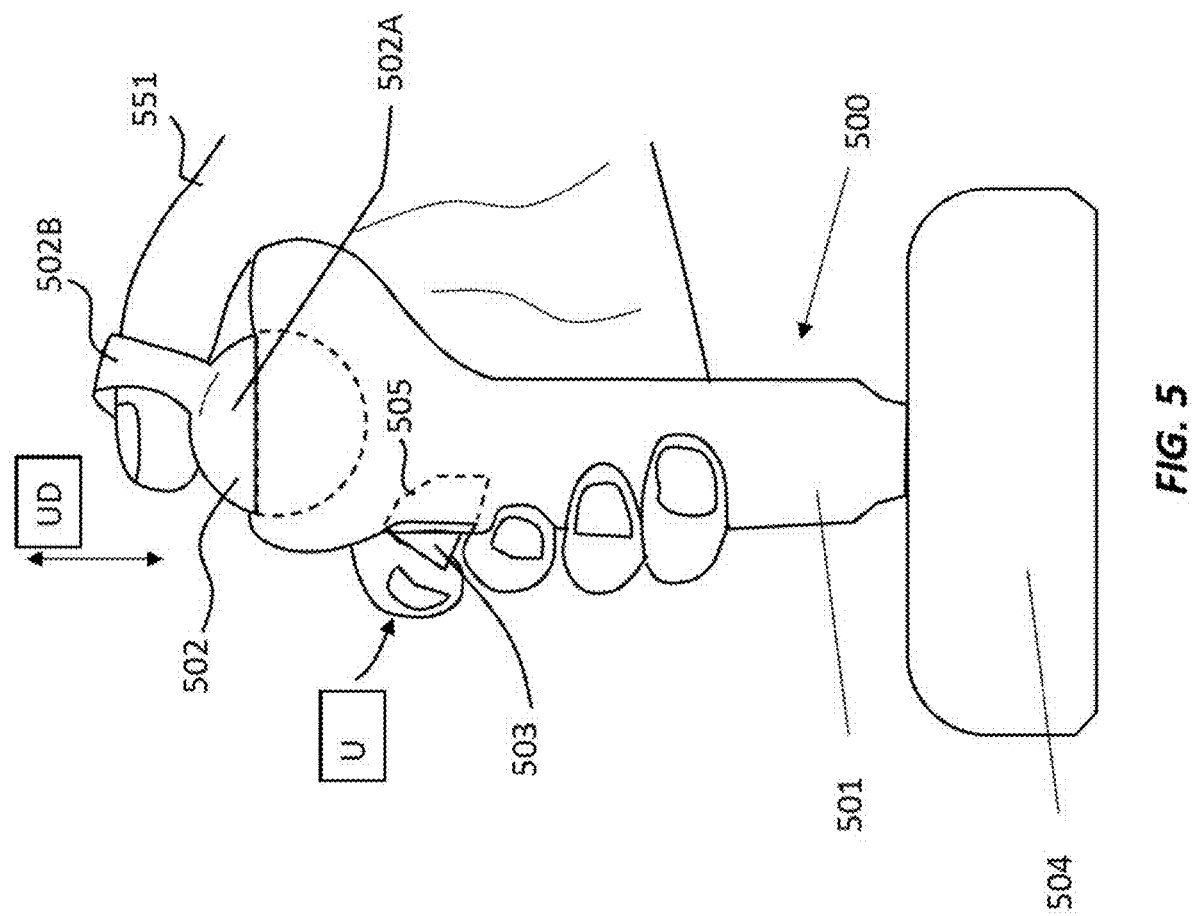
FIG. 5 is an embodiment of a controller with a ring element according to an embodiment.

FIG. 5 shows another embodiment of a controller 500. Controller 500 may be similar in form and in function to controllers 100-400, as described herein, and include a first control member 501, a second control member 502 and a third control member 503. In the example embodiment, as shown in FIG. 5, controller 500 is different from controller 400 in that the second control member includes a ring element 502B coupled to a gimbal 502A. In the example embodiment, the user can insert a thumb 451 into an opening of the ring element 502B. Having the thumb 451 in the opening of the ring element 502B allows the user to move thumb 451 in an upward direction, thereby pulling the gimbal 502A upwards. Further, the user's thumb 451 may be moved downwards, thereby pushing the gimbal 502A downwards. Motion of the gimbal 502A in an upward or downward direction is translated by a signal conversion module into motion commands for a target object to move respectively in an up or down direction. Further, similar to the embodiment associated with FIGS. 4A-4E, when the second control member 502 is pressed downwards (e.g., toward a base 504 of the controller 500) by a thumb 551 of a user, as shown in FIG. 5, the third control member 503 is configured to be pushed out of the socket 505 of the first control member 501. Alternatively, when the third control member 503 is pushed into the socket 505, the second control member 502 may be configured to be pushed upwards (e.g., away from the base 504 of the controller 500). Further, when the second control member 502 is pulled up by the thumb 551 of the user, the third control member 503 may be configured to be pulled into the socket 505.

Figure 6D:
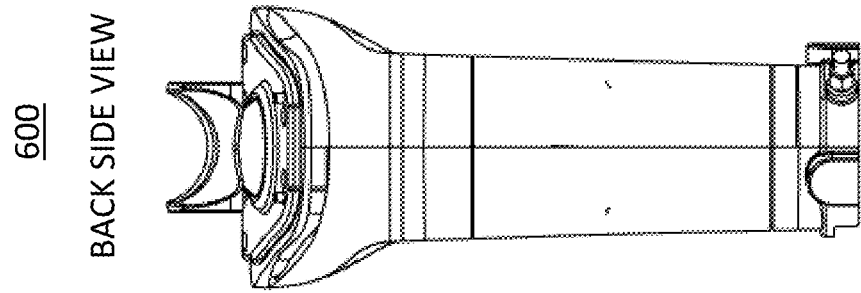

FIGS. 6A-6G shows various views of a controller 600 which can include components that are structurally and/or functionally the same or similar to components of other controllers described herein, including, for example, the controllers 100-500. FIG. 6A shows a first view of the controller 600 including a first control member 601, a second control member 602 coupled to the first control member 601 at a top portion of the first control member 601, and a third control member 603 coupled to a side part of the first control member 601. FIG. 6B shows a second view of the controller 600 (the second view is a view from a perspective different from the first view). Note that in the embodiment shown in FIGS. 6A-6B, the second control member 602 includes a thumb engaging element 602C coupled to a gimbal (e.g., the gimbal may be similar to the gimbal 502A of FIG. 5) of the second control member 602 and configured to receive and at least partially surround a thumb of the user. As shown in FIGS. 6A-6B, the thumb engaging element 602C includes sides sd1 and sd2 that prevent a user's thumb from slipping from the second control member 602, when the user moves the thumb to actuate (e.g., to move) the second control member 602. Further, the gimbal of the second control member 602 is partially surrounded by the first control member 601.

Figure 6C:
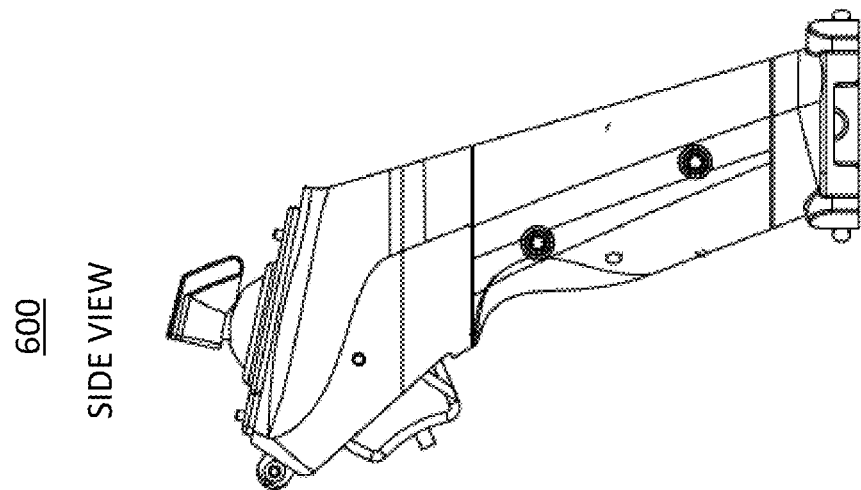

Further, as shown in FIGS. 6A and 6B, the first control member 601 has a coupling element 606 that is configured to couple to a base of the controller 600 (as further shown in subsequent figures). FIG. 6C shows a side view of the controller 600, FIG. 6D shows the view of the controller 600 from a back side, FIG. 6E shows a top side view of the controller 600, having the first control member 601 and the second control member 602, and FIG. 6F shows the bottom side view of the controller 600 having the first control member 601 and the coupling element 606.

Figure 6E:
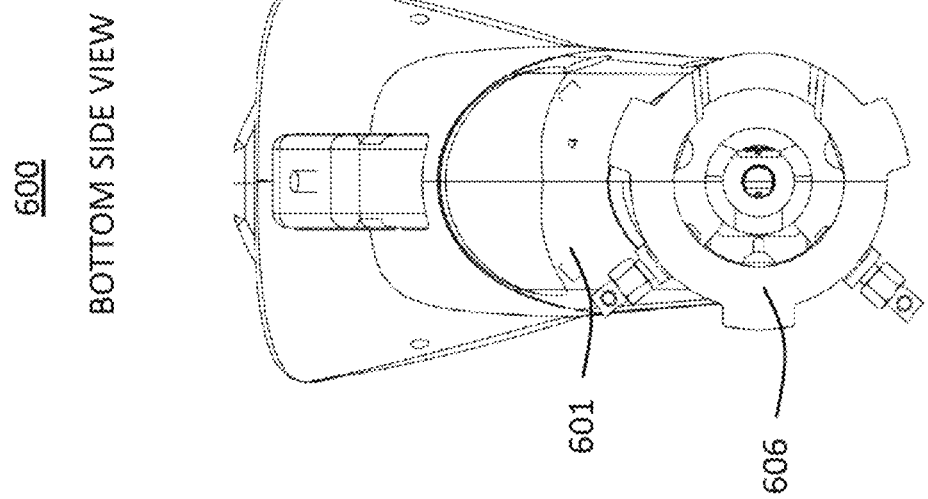
Figure 6F:
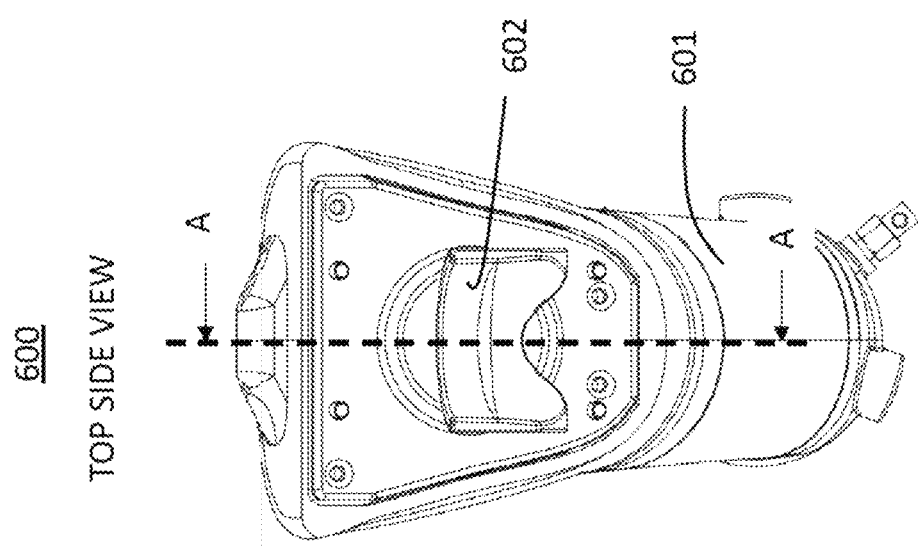
Figure 6G:
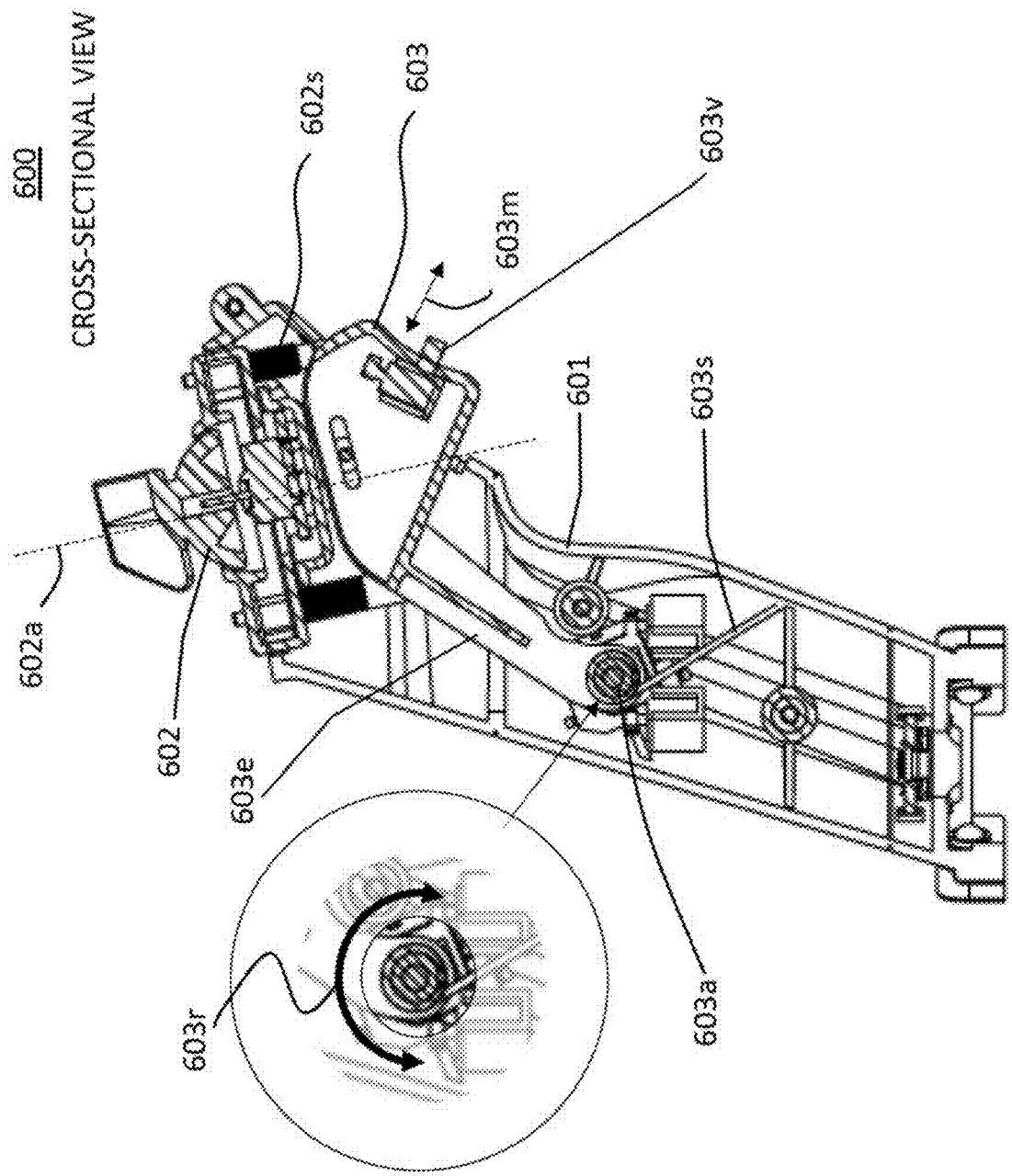
FIG. 6G is a cross-sectional view of a controller according to an embodiment.

FIG. 6G shows a cross-sectional area of the controller 600 along a plane section A-A, as shown in FIG. 6E. The controller 600 includes the first control member 601, the second control member 602, and the third control member 603. The second control member is supported by spring elements 602s. These spring elements allow for the second control member 602 to move up and down along to axial direction 602a. Further, the third control member 603 is configured to move in a direction indicated by arrow 603m, which is achieved by rotating an extension arm 603e of the third control member 603 about axis 603a as indicated by arrow 603r. The rotational motion may be actuated by an index finger of a user pressing onto the third control member 603. Further, the rotation may be counterbalanced by a spring 603s, as shown in FIG. 6G, such that the third control member 603 returns into a null position when there is no pressure from the index finger. As shown in FIG. 6G, the third control member 603 includes a vibration haptic motor 603v that is configured to provide a vibrational alert to an index finger of a user. The vibrational alert may be issued when a target object controlled by the controller 600 is on a collision course with another object in an environment of the target object. For example, the vibrational alert of the vibration haptic motor 603v may be issued when by moving the target object upwards (e.g., when pressing the third control member 603 with the index finger) the target object is likely to collide with another object. The collision of the target object with other objects in the environment of the target object may be determined by various systems associated with the target object. For instance, the target object may include a radiolocation system configured to determine distances from the target object to other objects in the environment of the target object. Further, the target object may include a transceiver configured to transmit data about proximity of objects to the target object to a processor associated with the controller 600 via a transmitter/receiver of the controller 600 (the processor associated with the controller 600 may be similar in form or in function to the processor 204 of the controller 200, and the transmitter/receiver of the controller 600 may be similar in form or in function to the transmitter 210 of the controller 200, as shown in FIG. 2).

The third control member 603 is illustrated in further detail in FIGS. 6H and 6I. In the example implementation, an axial member 603x is configured to pass through openings in sides 603b and 603c of the extension arm 603e of the third control member 603, such that the third control member 603 is configured to rotate about 603a passing through a center of the axial member 603x. Further, as shown in FIGS. 6H and 6I, the third control member 603 includes a detent 603d1 designed to provide a tactile response to the user when the third control member 603 leaves or returns to a null position. The detent includes a groove 603d1 that is configured to couple to a cylindrical element 603d2 (e.g., the cylindrical element 603d2 partially enters the groove 603d1), when the third control member 603 is in the null position. When the user applies pressure onto the third control member 603, the cylindrical element 603d2 exits the groove 603d1 and is configured to move within an opening 603d3 towards an inside end 603d4. Further, when the user applies pressure onto the second control member 602, the second control member 602 is configured to move downwards, thereby pushing the cylindrical element 603d2 out of the groove 603d1 and towards an outside end 603d5 of the opening 603d3. Note that detent 603d allows the user to sense whether the third control member 603 is moved away from the null position. Further, the second control member 602 and the third control member 603 are said to be in a dynamic balance, as the pressure from the index finger onto the third control member 603 causes the third control member 603 to move inwards (i.e., into a socket located in the first control member 601), and further causes the second control member 602 to move upwards (away from the base of the controller). Further, the pressure from the thumb of the user onto the second control member 602 causes the second control member 602 to move downwards (towards the base of the controller), thereby causing the third control member 603 to move outwards (i.e., out of the socket located in the first control member 601), and further causes the third control member 603 to apply pressure onto the index finger of the user.

It should be noted that the first control member 601 and the second control member 602 may include similar detent structures (e.g., depressions) configured to provide a tactile feedback to the user that the first control member 601 is in a null position and/or the second control member 602 is in a null position. In one embodiment, the first control member 601 may include a spring-loaded ball within a bottom side of the first control member 601 and a hemispherical socket within a base of the controller 600, such that the spring-loaded ball is configured to partially couple (e.g., enter) the hemispherical socket of the base when the first control member 601 is in the null position. The spring-loaded ball is configured to leave the hemispherical socket when the first control member 601 is twisted away from the null position, thereby provide a tactile sensation to the user's hand. Further, the second control member 602 may be configured to provide shear forces onto a thumb of a user, when the second control member 602 is away from the null position (e.g., the shear forces may be caused by forces due to springs attached to the second control member 602 and configured to restore the second control member 602 into the null position. Additionally, or alternatively, suitable devices associated with the second control member 602 may be also used to provide the tactile feedback to the user's thumb when the second control member 602 is in the null position (e.g., such device may include one or more spring-loaded elements coupled to suitable sockets when the second control member 602 is in the null position, and these spring-loaded elements may be configured to exit the associated sockets when the second control member 602 is away from the null position).

Figure 7A:
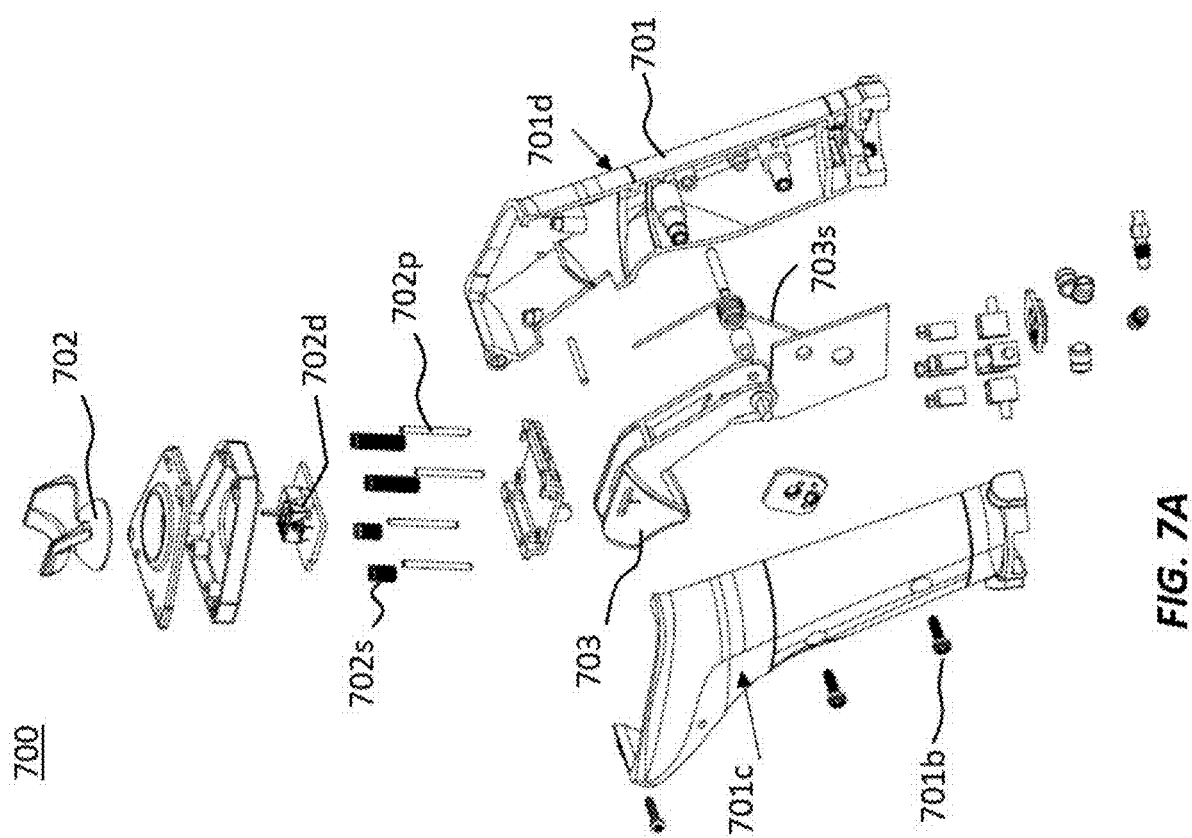
FIG. 7A is an exploded view of a controller according to an embodiment.

FIG. 7A shows an exploded view of a controller 700. The controller 700 includes components that are structurally and/or functionally the same or similar to components of other controllers described herein, including, for example, the controllers 100-600. In the example embodiment, as shown in FIG. 7A, the controller 700 includes a first control member 701, a second control member 702, a third control member 703, a plurality of elongated elements 702$p$, a plurality of supporting springs 702$s$ (each one of elongated elements 702$p$ is placed inside coils formed by respective each one of springs 702$s$). Further, the controller 700 includes a sensor 702$d$ (or a set of sensors 702$d$) for detecting motions of the second control member 702. The sensor 702$d$ may be any suitable sensor or a combination thereof. For example, the sensor 702$d$ may include a motion sensor (e.g., an optical sensor), a rotational sensor (e.g., an inductive sensor), a pressure sensor (e.g., a piezoelectric sensor), a potentiometer, a Hall effect sensor and the like for detecting a degree of rotation or translation of the second control member. In some cases, the sensor 702$d$ is configured to measure accelerations due to a motion of a user's thumb.

Figure 7B:
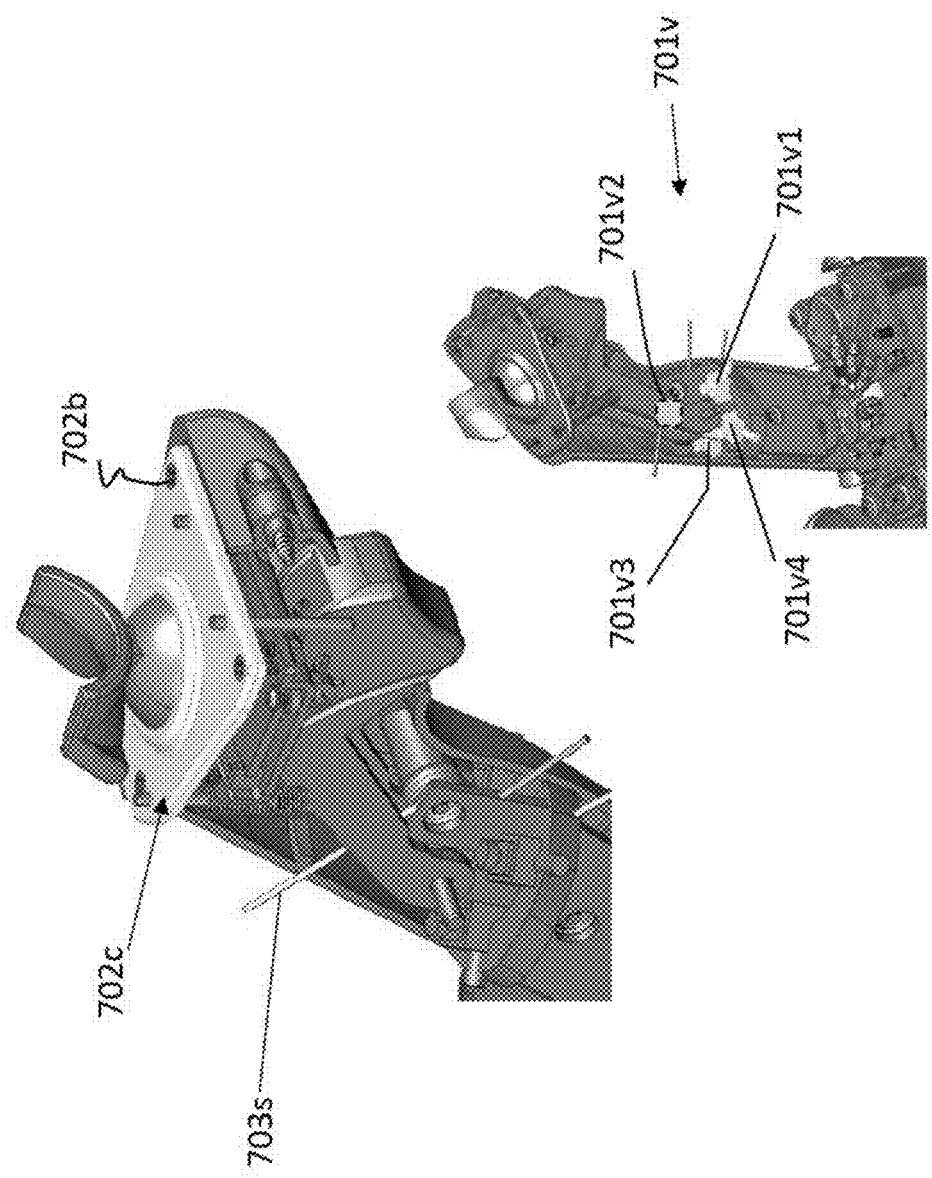
FIG. 7B is an isometric view of a controller according to an embodiment.

The second control member 702 includes a platform element 702$c$ that is coupled to the first control member 701 via suitable bolts 702$b$, as shown in FIG. 7B. As shown in FIG. 7A, the first control element 701 may have a first side 701$c$ and a second side 701$d$ which may be bolted together via bolts 701$b$.

FIG. 7B further shows that the first control member 701 includes vibration haptic motors 701$v$ allowing for vibration cues to be sent to a user in relation to collision threats. The vibration haptic motors 701$v$ may be triggered by an independent sensing system, indicating a potential collision threat. They are placed to give regional cues to the hand, suggesting a potential threat from a left (L) side, right (R) side, front (F) side, or back (B) side relative to the point of reference (e.g., a center) of a target object. As shown in FIG. 7B, the first control member 701 may have four vibration haptic motors 701$v$ each one for each L, R, F, or B side. Each vibration haptic motor 701$v$1-701$v$4, as shown in FIG. 7B, is configured to deliver vibrationally isolated haptic feedback to different parts of the hand of the user. For instance, the vibration haptic motor 701$v$1 corresponding to the F side may induce haptic feedback to the fingers of the user (e.g., fingers 453, as shown in FIG. 4A), a vibration haptic motor 701$v$3 corresponding to the B side may induce haptic feedback to the lower palm region (e.g., the palm region in the proximity of a wrist), and a vibration haptic motor 701$v$2 or a vibration haptic motor 701$v$4 corresponding respectively to the L or R side may induce haptic feedback to the middle palm region (e.g., the region located between the lower palm and the fingers of the hand). The vibrational haptic motors 701$v$1-701$v$4 may be positioned at any suitable locations around the first control member 701. In one implementation, the vibrational haptic motor 701$v$1 is positioned at a front side of the first control member 701, the vibrational haptic motor 701$v$2 is positioned at a left side of the first control member 701, the vibrational haptic motor 701$v$3 is positioned at a back side of the first control member 701, and the vibrational haptic motor 701$v$4 is positioned at a right side of the first control member 701. Further, in an example implementation, the vibrational haptic motors 701$v$1-701$v$4 are positioned in about the same plane as shown in FIG. 7B.

It should be noted that the second control member 702 and/or the third control member 703 may also include vibration haptic motors. For instance, one or more vibration haptic motors within the second control member 702 may indicate a potential threat from a downward (D) side or an upward (U) side from the target object. These vibration haptic motors may provide a haptic feedback to a thumb of the user. Further, one or more vibration haptic motors within the third control member 703 may indicate a potential thread from a U or D side from the target object. These vibration haptic motors may provide a haptic feedback to an index finger of the user. Various vibration haptic motors are configured to provide haptic alerts to the user based on position data and/or orientation data associated with the target object. In one implementation, the position data and/or orientation data for the target object is received by a transmitter/receiver of the controller 700. For example, a transmitter associated with the target object may be configured to transmit the position data and/or the orientation data to the transmitter/receiver of the controller 700. In an example embodiment, the transmitter/receiver may be similar in form or in function to the transmitter 210 (e.g., the transmitter/receiver of controller 700 is configured to receive a feedback signal from the target object). The position data and/or orientation data may indicate the proximity of the target object with other objects in an environment of the target object. In some cases, the position data and/or the orientation data includes a velocity of the target object, an acceleration of the target object, an angular velocity of the target object, an angular acceleration of the target object, or combination thereof, and various vibration haptic motors are configured to provide haptic alerts when the position data and/or the orientation data indicates a possibility of collision of the target object with other objects in an environment of the target object.

Further, the vibration haptic motors include a first vibration haptic motor configured to provide a vibrational alert when a possible collision is indicated by moving the target object forward, a second vibration haptic motor configured to provide a vibrational alert when a possible collision is indicated by moving the target object backward, a third vibration haptic motor configured to provide a vibrational alert when a possible collision is indicated by moving the target object right, and a fourth vibration haptic motor configured to provide a vibrational alert when a possible collision is indicated by moving the target object left. The first, the second, the third, and the fourth vibration haptic motors may be included in the first control member. In an example implementation, the first vibration haptic motor may be the vibration haptic motor 701$v$1, the second vibration haptic motor may be the vibration haptic motor 702$v$2, the third vibration haptic motor may be the vibration haptic motor 701$v$3, and the fourth vibration haptic motor may be the vibration haptic motor 701$v$4. The first vibration haptic motor provides the vibrational alert to at least some of fingers of the user adjacent to a front side of the first control member, the second vibration haptic motor provides the vibrational alert to a portion of a palm of the user adjacent to a back side of the first control member, the third vibration haptic motor provides the vibrational alert to a portion of a palm of the user adjacent to a right side of the first control member, and the fourth vibration haptic motor provides the vibrational alert to at least some of fingers of the user adjacent to a left side of the first control member. Additionally, the vibration haptic motors further include a fifth vibration haptic motor configured to provide a vibrational alert when a possible collision is indicated by moving the target object downwards, and a sixth vibration haptic motor configured to provide a vibrational alert when a possible collision is indicated by moving the target object upwards.

The fifth vibration haptic motor is included within the second control member and the sixth vibration haptic motor is included within the third control member. Further, the fifth vibration haptic motor provides the vibrational alert to a thumb of the user adjacent to the second control member and the sixth vibration haptic motor provides the vibrational alert to an index finger of the user adjacent to the second control member.

In various embodiments, each one of vibration haptic motors described herein may deliver vibrations to surfaces that are in vibrational isolation from vibrations of any other vibration haptic motors. The vibrational isolation may be achieved by each vibration haptic motor being compartmentalized within a control member such that each compartment containing the vibration haptic motor is vibrationally isolated from other components/surfaces of the control member. For example, the control member may be configured to transmit vibrations from a vibration haptic motor to a subset of surfaces located in proximity of the vibration haptic motor, while preventing transmission of the vibrations to other surfaces of the control member. In an example embodiment, the vibrational isolation for the vibration haptic motor may be achieved by separating a compartment containing the vibration haptic motor from other parts of the control member using a material suitable for vibration damping or absorption (e.g., a soft material, elastomer, polymer, rubber, plastic, foam, such as acoustic foam, and/or the like). The vibrational isolation allows for localization of vibrations, such that, for example, the vibrations from the vibration haptic motor $701v1$ are sensed by user fingers are not sensed by a palm of the user, and the vibrations from the vibration haptic motor $701v3$ are sensed by user's palm are not sensed by the fingers of the user. In one example, a first set of surfaces of the first control member (e.g., surfaces at a front side of the first control member) may be vibrated due to vibration of the vibration haptic motor $701v1$ (i.e., the vibration haptic motor located in proximity of these surfaces but may not be vibrated due to vibrations of other vibration haptic motors (e.g., vibration haptic motors $701v2$-$701v4$). Similarly, a second set of surfaces (e.g., surfaces at a back side of the first control member), a third set of surfaces (e.g., surfaces at a left side of the first control member), and a fourth set of surfaces (e.g., surfaces at a right side of the first control member) are configured to vibrate when the corresponding vibration haptic motor $701v2$-$701v4$ is vibrating. These surfaces may not be configured to vibrate when the corresponding vibration haptic motor $701v2$-$701v4$ is not vibrating. It should be noted that other vibration haptic motors besides $701v1$-$701v4$ may be present (e.g., as described above, a fifth vibration haptic motor may provide vibrations to a thumb of the user and another sixth vibration haptic motor may provide vibrations to an index finger of the user). The vibration from these motors may also be isolated from vibrations of vibration haptic motors besides $701v1$-$701v4$. For instance, the surfaces of a second control member adjacent to the fifth vibration haptic motor may vibrate when the fifth vibration haptic motor is vibrating, but may not vibrate otherwise (e.g., when other vibration haptic motors are vibrating). Similarly, the surfaces of a third control member adjacent to the sixth vibration haptic motor may vibrate when the sixth vibration haptic motor is vibrating, but may not vibrate otherwise (e.g., when other vibration haptic motors are vibrating). In this manner, in use, a vibration can be localized to represent and alert to the user a specific area or region associated with a collision threat, thereby providing a quick and immediately apparent clue for the user as to a potential threat.

FIGS. 8A-8H shows various views and cross-sectional views of a base 804 of a controller that may be structurally and/or functionally the same or similar to controllers 100-700. In the example implementation, as shown in FIG. 8A, the base 804 includes a connection element 804*c* for connecting a first control member (not shown) to the base. In various implementations the connection element 804*c* allows for the first control member to execute rotations about the central axis (as shown for example in FIG. 4C). Any suitable mechanism may be used for executing such rotations. For example, ball bearings may be used, and the like. In some cases, the rotation of the first control member about the central axis may be limited to a range of degrees clockwise and counterclockwise rotation (e.g., a few degrees such as about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, and the like), the range of rotation may be as much as ±180 degrees or even more. Further, the range of rotation may be between 5-180 degrees with all the values and ranges in between.

In various embodiments, the first control member is moveably coupled to the base 804 and is operable to produce a first control input in response to movement of the first control member relative to the base 804. For example, the first control member is configured to rotate about a central axis and produce the first control input corresponding to a yaw command for the target object.

Further, the base 804 includes clamps 804*a* and 804*b* configured to clamp the base 804 to a forearm brace (the forearm brace is further described below). In an example implementation, the forearm brace includes a forearm brace connection bracket 804*e* placed between the base 804 and the clamps 804*a* and 804*b*, which can be quickly secured to the base by moving levers of the clamps 804*a* and 804*b* into a closed position. Further, by moving levers of clamps 804*a* and 804*b* into an open position, the forearm brace connection bracket 804*e* may be quickly released. The clamps 804*a* and 804*b* allow for adjusting the forearm brace angle relative to the base 804. For example, tor a typical user, a natural "null" position for grasping the first control member is biased inwards, thus, the clamps 804*a* and 804*b* may be positioned relative to the base 804 such that a wrist of the user forms a suitable angle with a forearm of the user, such that the controller associated with the base 804 may be comfortably used. In some cases, the clamps 804*a* and 804*b* may be positioned relative to the base 804, so that the controller may be used ambidextrously (i.e., operated by either a left or a right hand of a user).

Additionally, the base includes a pan/tilt control 804*d* for an onboard camera, which can be operated by a hand (e.g., the second hand that does not operate the first control member, the second control member, and the third control member) of the user. The pan/tilt control 804*d* is a 2-DoF controller mounted on the front of the base 804.

FIGS. 8A and 8G show the isometric views of the base 804, and FIGS. 8D-8F and FIG. 8H show various side views of the base 804. For example, FIG. 8D shows a front view of the base 804, FIG. 8E shows a top view of the base 804, FIG. 8F shows the back view of the base 804, and FIG. 8H shows a side view of the base 804. Also, FIG. 8C shows a cross-sectional view of the base 804 along a plane section E-E (as shown in FIG. 8E), and FIG. 8B shows a cross-sectional view of the base 804 along a plane section D-D (as shown in FIG. 8E).

Figure 8I:
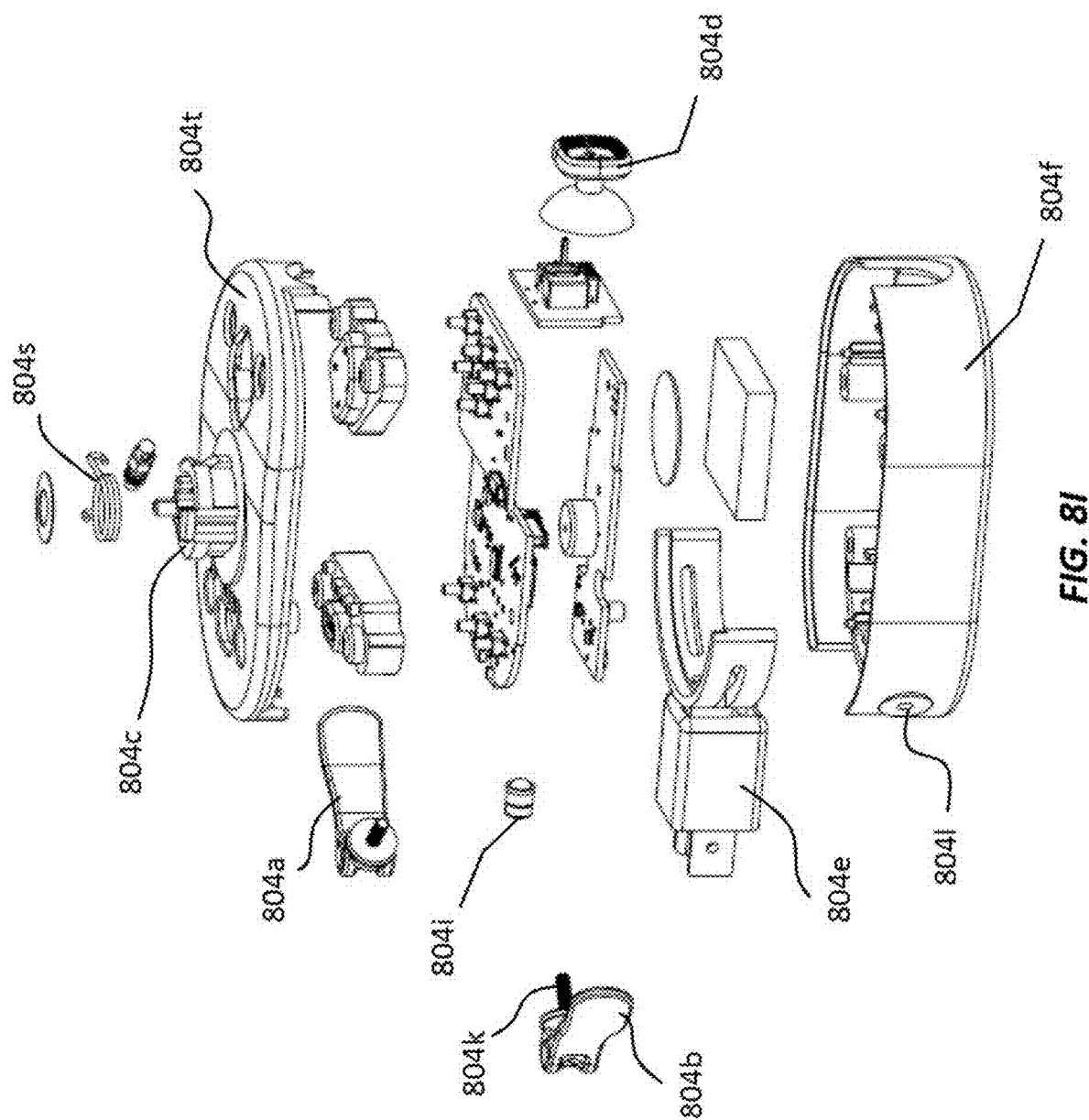
FIG. 8I is an exploded view of the base of the controller according to the embodiment shown in FIGS. 8A-8H.

FIG. 8I shows an exploded view of the base 804 including a top cover 804t, a bottom cover 804f, a spring restoring element 804s configured to return the first control member into a null position (as further described below), clamps 804a and 804b, a connection element 804c, a port 804d, as described above, an electronic sensor 804h for determining the amount of rotation of a first control member about a central axis of the first control member, as well as forearm brace connection bracket 804e. In an example implementation, the forearm brace connection bracket 804 is secured to the bottom cover 804f via clamps 804a and 804b which have threaded bolts 804k that can be inserted into openings 804l and secured via suitable nuts (not shown) within the bottom cover 804f.

In various embodiments, a controller includes a first control member that further includes a first control biasing member coupled to the body of the elongated member, the first control biasing member being configured to generate a counter torque for the first control member (counter torque $\tau_{C1}$) being a counterclockwise or clockwise torque in response to the elongated member rotating respectively in a clockwise or counterclockwise direction about the central axis, and wherein the counter torque $\tau_{C1}$ is generated until the elongated member returns to a default orientation.

FIG. 9A shows an example controller 900 that may be structurally and/or functionally the same or similar to controllers 100-800. The controller 900 includes a first control member 901 and a first control biasing member 904s configured to generate the counter torque $\tau_{C1}$ that is a counterclockwise or clockwise torque in response to the elongated member of the first control member 901 rotating respectively in a clockwise or counterclockwise direction as indicated by arrow M1Y about a central axis 932. In the embodiment, rotation in a clockwise or counterclockwise direction of the first control member 901 (e.g., motion characterized by M1Y) produces a signal to a target object to perform a Yaw movement, as described above. Further, as described above, M1Y rotation may be limited to a range of degrees in either clockwise or counterclockwise rotation.

In response to motion M1Y, the counter (e.g., restoring) torque $\tau_{C1}$, represented by an arrow R1Y, is configured to rotate the first control member 901 back into an equilibrium (i.e., default or null) position once the user releases the first control member 901. This is also called a recentering mechanism.

The first control biasing member 904s may be implemented in any suitable way (e.g., a spring, a pressurized chamber, an electrical motor, a configuration of one or more magnets, or any other suitable elements of devices for causing the counter torque $\tau_{C1}$. In some implementations, the magnitude of the counter torque $\tau_{C1}$ depends on the amount of rotation of the first control member 901 about the axis 932. For example, in one implementation, first control biasing member 904s of the controller 900 is configured such that magnitude of the counter torque $\tau_{C1}$ is proportional to a rotational angle of the elongated member corresponding to the first control member 901 as measured from the default (i.e., null) position. Alternatively, any other dependencies of the counter torque $\tau_{C1}$ on the rotational angle may be used (e.g., the counter torque $\tau_{C1}$ may be constant, may depend on a square of the rotational angle, may be any suitable non-linear function of the rotational angle, and the like). In some cases, the magnitude of the counter torque $\tau_{C1}$ as a function of the rotational angle may be programmable. For example, a function of the counter torque $\tau_{C1}$ as a function of the rotational angle $\gamma$ may be determined by a function $\tau_{C1}(\gamma)$ that can be input by the user.

FIGS. 9B-9C show views of a second control member 902 configured to be manipulated by a thumb of a user. The second control member 902 includes a gimbal configured to rotate about a first axis of rotation (X axis) and a second axis (Y axis) of rotation that is perpendicular to the first axis of rotation, as shown in FIG. 9C. The rotation about the X axis correspond to user moving a thumb as indicated by arrows M2F and M2B, as shown in FIG. 9B. In an example implementation, motion M2F corresponds to a target object moving forward and motion M2B corresponds to the target object moving backward. Further, the rotation about the Y axis corresponds to the user moving a thumb as indicated by arrows M3L and M3R. The motion of the thumb of the user's single hand may be substantially lateral. In an example implementation, motion M3L corresponds to a target object moving left and motion M3R corresponds to the target object moving right. FIG. 9C shows that the gimbal of the second control member 902 is further configured to move along a third axis (Z axis) perpendicular to the first and the second axes. The motion along the Z axis is configured to be controlled by a vertical movement of a thumb of the user's single hand.

In the example embodiment of FIGS. 9A-9C, the second control member 902 includes a second control biasing member (not shown in FIGS. 9A-9C) coupled to a gimbal 902a (or a set of second control biasing members), the second control biasing member being configured to generate a counter torque $\tau_{C2}$ for the second control member in response to the gimbal 902a rotating about the first or the second axis of rotation, and wherein the counter torque $\tau_{C2}$ is generated until the gimbal 902a returns to a default (null) position. FIG. 9B shows that for each motion M2F, M2B, M3L, and M3R (M2F-M3R), there are corresponding counter torques R2F, R2B, R3L, and R3R (R2F-R3R) for returning the gimbal 902a to the null position.

Similar to the counter torque $\tau_{C1}$ for the first control member, the counter torque $\tau_{C2}$ for the second control member may depend on the amount of rotation corresponding to motions M2F-M3R (e.g., be proportional to the rotations corresponding to motions M2F-M3R). Alternatively, any other dependencies of the counter torque $\tau_{C2}$ on the rotational angle may be used (e.g., the counter torque $\tau_{C2}$ may be constant, may depend on a square of the rotational angle, may be any suitable nonlinear function of the rotational angle, and the like). In some cases, the magnitude of the counter torque $\tau_{C2}$ as a function of the rotational angle may be programmable. For example, a function of the counter torque $\tau_{C2}$ as a function of the rotational angle $\phi$ or $\psi$ (the rotational angles $\phi$ and $\psi$ are shown in FIG. 9C and correspond respectively to motions M2F-M2B, and M3L-M3R) may be determined by a function $\tau_{C2}(\phi,\psi)$ that can be input by the user.

FIG. 9D shows the third control member 903 disposed on a front side of the first control member 901 away from the user. The third control member 903 is configured to move in and out of a socket 903b of the first control member 901. Further, the third control member 903 may include a third control biasing member (e.g., a spring 903s, which may be structurally or functionally similar or the same as spring 603s, as shown in FIG. 6G), being configured to generate a counter force $f_{C3}$ for the third control member 903 in response to the third control member 903 moving into the socket 903b, as shown in FIG. 9D, of the first control member 901.

FIG. 9C shows that in response to a downward force M4D due to pressure from a user's thumb, a counter force R4D is generated. In some implementations the counter force R4D may at least partially be related to the amount of pressure from the user's thumb. For example, the second control member 902 may be supported by spring elements (e.g., the spring elements may be similar to the spring elements 602s, as shown in FIG. 6G) which result in at least partial counter force R4D.

Additionally, in some implementations consistent with the implementation shown in FIG. 9D, the pressure from the user's thumb is configured to apply a force onto the third control member 903 which results in the third control member being pushed out of the socket 903b of the first control element 901 with a total force R4U, as shown in FIG. 9D. The force R4U is related to the force $f_t$ from the user's thumb. In an example implementation, force $R4U=f_t+f_{C3}$. Such a force R4U results in a force applied to an index finger (when the user's index finger is adjacent to the third control member 903), thereby establishing a balance of forces between the force exerted by the thumb of the user ($f_t$), the counter force $f_{C3}$, and a force exerted by the user's index finger M4U. Accordingly, the user's thumb and index finger can work cooperatively to control the vertical movement (i.e., along the Z-axis) of the control target.

In the example implementation of FIGS. 9A-9D, by pushing the third control member 903 into the socket 903b of the elongated member of the first control member 901, the gimbal 902a of the second control member 902 is configured to move up along the third axis (Z axis); and by pushing the second control member 902 down along the third axis, the third control member 903 is configured to move out of the socket 903b of the first control member 901.

As described above, the controllers discussed herein (e.g., the controllers 100-900) include a processor and a transmitter configured to transmit the first control input from a first control member, a set of second control inputs from the second control member, and a third control input from the third control member to the target object in a form of motion commands for the target object. The target object may reside in a real or virtual environment.

In various embodiments, to operate the controllers discussed herein (e.g., the controllers 100-900), a user may need to secure a controller in place. For example, the controller may be attached to a flat surface (a table), a tripod, a vehicle, an aircraft, a wall, and the like. In some cases, the controller may be hard-mounted on a console or mounted on a base configured to be placed on a surface, such as, for example, a flat surface (e.g., on a table). Alternatively, a user may hold the base of the controller with one hand while controlling the controller with another hand. To allow the user to operate the controller with a single hand, in some instances, a forearm brace may be utilized. The forearm brace can be configured to be attached to a user's forearm at a first end and to the controller at a second end (e.g., at an end of the forearm brace distal to the first side).

Figure 10:
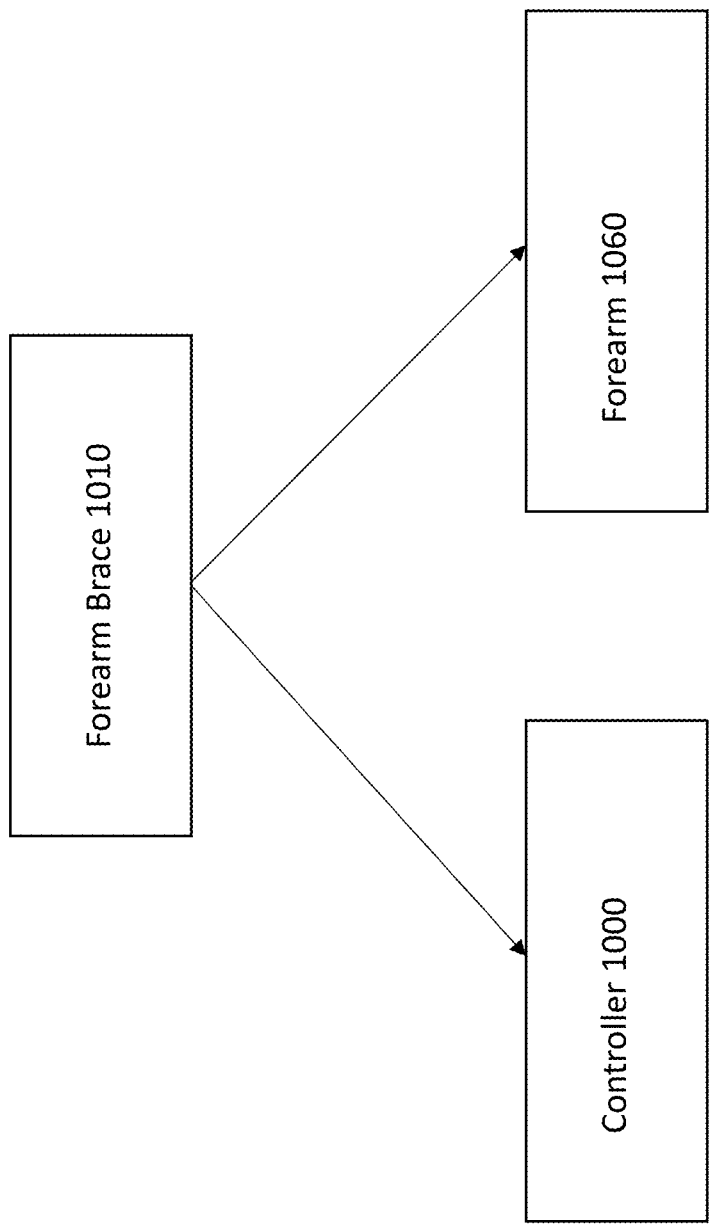
FIG. 10 is a schematic of a forearm brace coupled to a controller and a forearm of a user according to an embodiment.

FIG. 10 shows an example diagram of a forearm brace 1010 that is configured to couple to a controller 1000 and to a forearm 1060 of a user. In an example embodiment, the forearm brace 1010 is an elongated mechanical device having a first end for coupling to the controller, a second end for coupling to the forearm 1060, and a section extending along the length of the forearm brace 1010 from the first end to the second end. In the example implementation, when coupled to the forearm 1060, a wrist and fingers of the user are configured to reach the controller 1000 for manipulating various control members (e.g., the first, the second, and the third control members) of the controller 1000.

Figure 11:
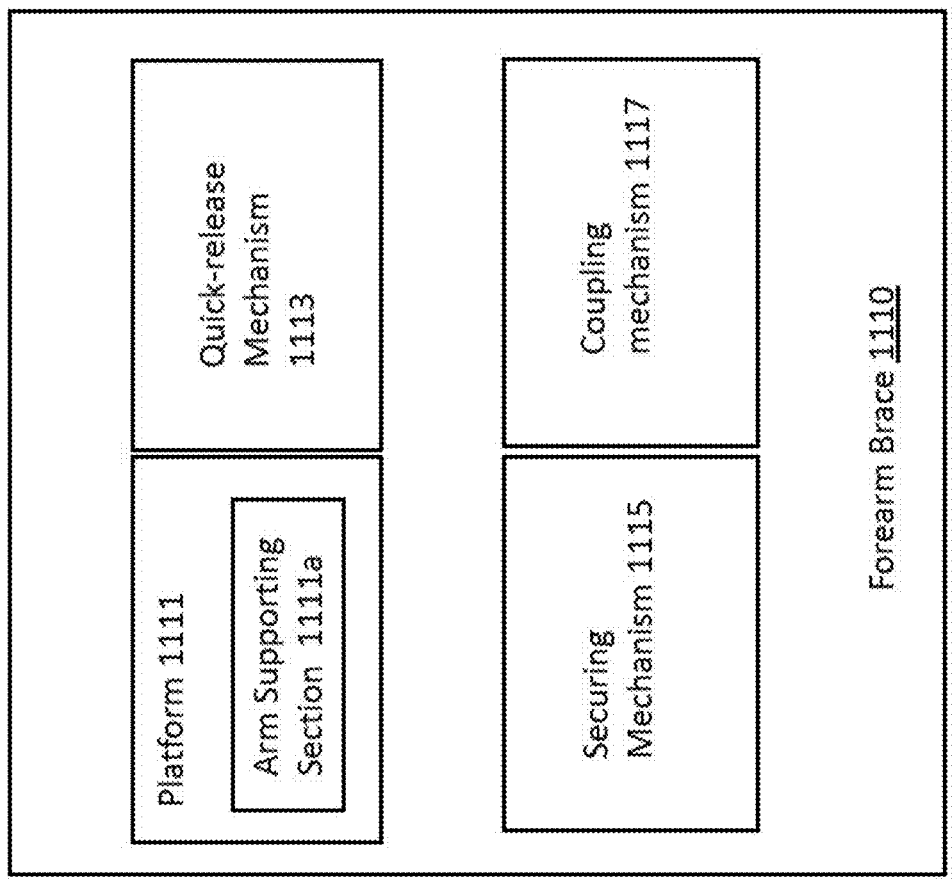
FIG. 11 is a schematic of a forearm brace according to an embodiment.

FIG. 11 shows an example diagram of different components of the forearm brace 1110 for attaching to a forearm of a user and a controller. The forearm brace 1110 includes a platform 1111 having an arm supporting section 1111a, the arm supporting section 1111a configured to be in contact with the forearm of the user, a securing mechanism 1115 for securing the platform 1111 to the forearm, and a quick-release mechanism 1113 coupled to the securing mechanism 1115. Additionally, the forearm brace 1110 includes a coupling mechanism 1117 for coupling the platform 1111 to a controller.

The quick-release mechanism 1113 is configured to receive a user's input (e.g., a first or second user input). Upon receiving the first user input, the quick-release mechanism 1113 is configured to engage the platform 1111 with the forearm of the user by moving the securing mechanism 1115, thereby engaging the securing mechanism 1115 with the forearm of the user. Further, upon receiving the second user input, the quick-release mechanism 1113 is configured to release the platform 111 from the forearm of the user by moving the securing mechanism 1115 away from the forearm of the user.

Figure 12:
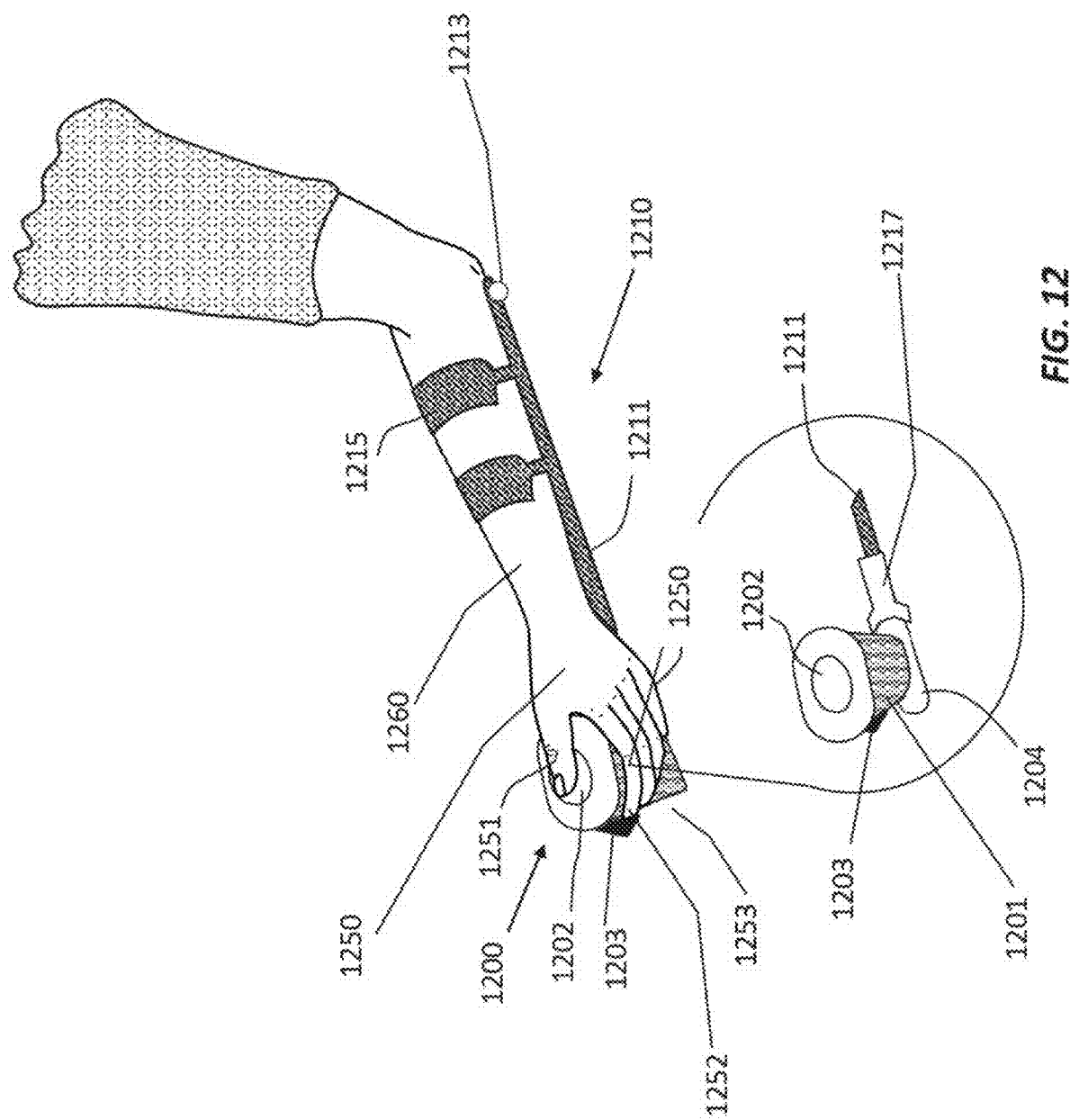
FIG. 12 shows a user's forearm adjacent to a forearm brace according to an embodiment.

The arm supporting section 1111a is configured to receive a forearm of the user, such that a wrist of the user is in a position for reaching a controller coupled to the forearm brace 1110 via the coupling mechanism 1117. The arm supporting section 1111a may form a shape configured to partially adhere to a portion of the forearm of the user. Upon placing the forearm onto the arm supporting section 1111a, some the user fingers are configured to wrap around the controller, as shown in FIG. 12. Further embodiments of a platform of a forearm brace 1110 are illustrated in FIGS. 13A-13J, 14A-14F, and 15.

The securing mechanism 1115 includes suitable elements of the securing mechanism 1115 configured to move adjacent to a forearm of a user to secure the platform 1111 relative to the forearm of the user. In an example embodiment, the securing mechanism 1115 includes an arm clamping element (or several arm clamping elements) configured to engage with the forearm by moving towards the forearm and disengage with the forearm by moving away from the forearm. Further details of arm clamping elements are discussed in connection with FIG. 13A.

The quick-release mechanism 1113 may be any suitable mechanical or electrical mechanism for releasing the securing mechanism 1115 from the forearm. The quick-release mechanism 1113 may include an interface (e.g., a button, a set of buttons, a touch panel controller, and the like) that may be located at any suitable location of the forearm brace 1110. As discussed above, the quick-release mechanism 1113 may be activated via a user's input (herein referred to as the first or second user input).

In one embodiment, the first user input may be the same as the second user input and may correspond to pressing a button of the quick-release mechanism 1113. Thus, for example, by pressing the button when the securing mechanism 1115 is engaged with the forearm (e.g., connected from the forearm), the securing mechanism 1115 is configured to disengage from the forearm of the user. Similarly, in some implementations, when the securing mechanism 1115 is disengaged from the forearm of the user, by pressing the button of the quick-release mechanism 1113, the securing mechanism 1115 may be configured to engage with the forearm of the user. Further embodiments of the quick-release mechanism 1113 are discussed below in connection with FIGS. 13A-13F.

In some configurations, a first interface of the quick-release mechanism 1113 (e.g., a button, a movable arm supporting section, and the like) may be used for engaging the securing mechanism 1115 with the forearm, and another second interface of the quick-release mechanism 1113 (e.g., a button) may be used to disengage the securing mechanism 1115 from the forearm. For example, the suitable first interface may be a button, such that when pressed, the securing mechanism 1115 is configured to engage with the forearm. In some cases, the first interface of the quick-release mechanism 1113 may also work also as the second interface of the quick-release mechanism 1113. For instance, when a user presses a button of the quick-release mechanism 1113 once, the quick-release mechanism 1113 engages the securing mechanism 1115 with the forearm, and when the user presses the button the second time, the quick-release mechanism 1113 disengages with the forearm.

Alternatively, the first interface may be any other suitable device (a button, a touch panel controller, an optical sensor, and the like). In some cases, the first interface may be embedded in one of the components of the forearm brace 1110. For example, the first interface may be part of the platform 1111. For instance, when the forearm is pressed into a top surface of the platform 1111, the pressure from the forearm activates the quick-release mechanism 1113 causing the securing mechanism 1115 to move and engage the forearm.

In some configurations, a suitable sensor (e.g., an optical sensor, a pressure sensor, and the like) may be configured to detect that the forearm is adjacent to a surface of the platform 111, and, when the sensor detects the presence of the forearm, the securing mechanism 1115 is configured to engage with the forearm.

The coupling mechanism 1117 is configured to couple the forearm brace 1110 to a controller. The coupling mechanism 1117 can include a connection member and a forearm brace bracket (further shown in FIG. 13E, for example) for connecting the forearm brace 1110 to the controller. In some embodiments, the coupling mechanism 1117 is length adjustable so that the forearm brace can fit different users in spite of different forearm lengths. In various embodiments, the forearm brace 1110 is configured to be connected to a base (e.g., the base may be similar to the base 804 shown in FIGS. 8A-8H). In some cases, the forearm brace bracket is designed to fit a particular size and/or shape of the base of the controller, and in other cases, the forearm brace bracket is configured to be adjustable to fit various controllers having different size and shape bases. Further, in some implementations, the coupling mechanism 1117 may be attached to the base of the controller by means other than the forearm brace bracket. For example, the coupling mechanism 1117 may include an extension element configured to be inserted and secured in a socket of the base of the controller. Alternatively, the coupling mechanism 1117 may include a socket capable of receiving an extension element of the controller. Further, the coupling mechanism 1117 may include a securing element (e.g., a clamp, a threaded portion, and the like) for securing the extension element within the socket. Further implementations of the coupling mechanism 1117 are discussed below in connection with FIG. 13E.

FIG. 12 shows an example embodiment of a forearm brace 1210 having a platform 1211 attached to a forearm 1260 of a user via a securing mechanism 1215. A wrist 1250 of the user is configured to manipulate a controller 1200. Similar to discussion above (e.g., in reference to FIG. 4A), the controller 1200 is configured such that a thumb 1251 of the user engages with a second control member 1202, an index finger 1252 engages with a third control member 1203, and fingers 1253 are gripping the first control member 1201. Further, the forearm brace 1210 is attached to a base 1204 of the controller 1200 via a coupling mechanism 1217.

Figure 13A:
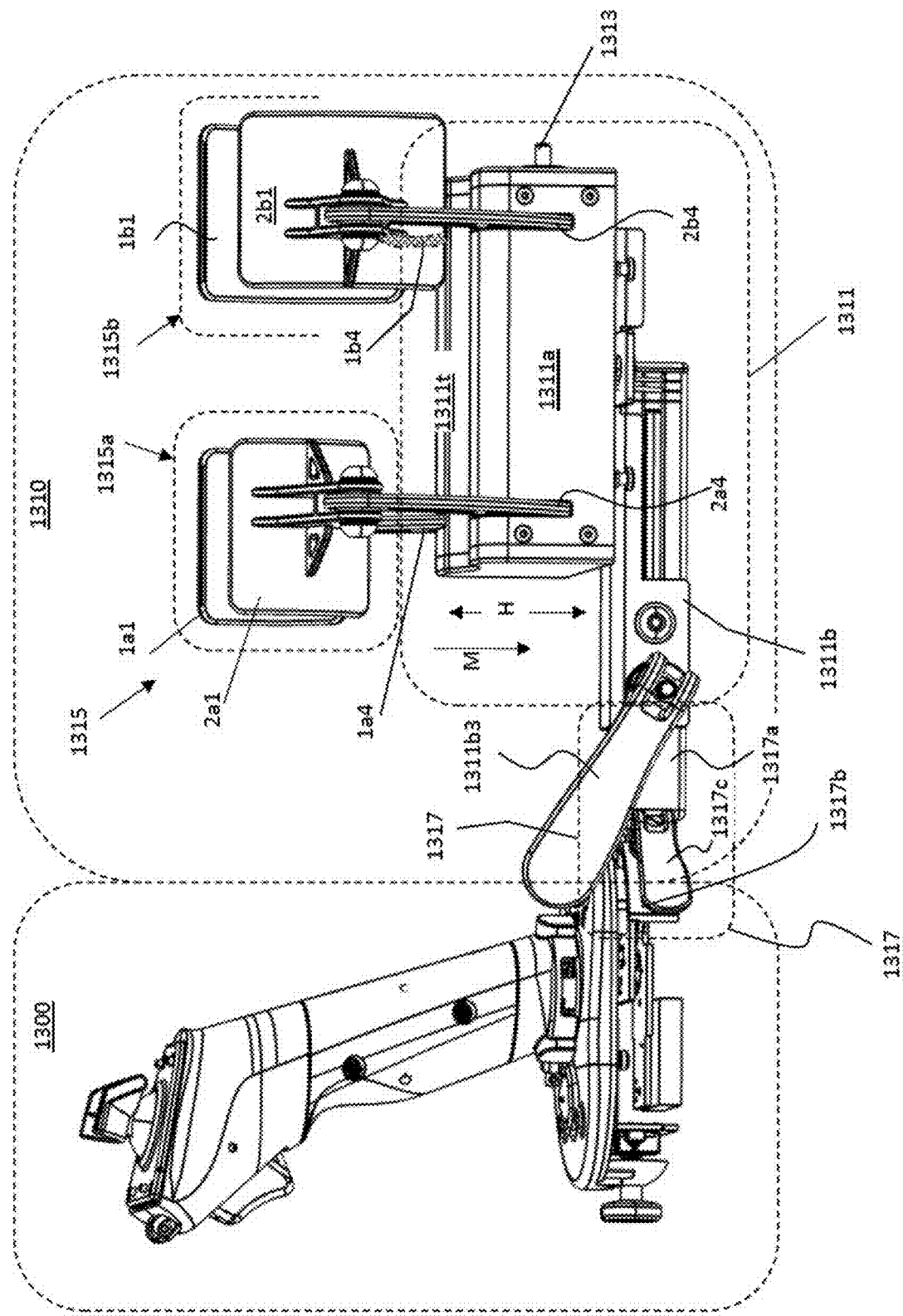
FIG. 13A is a side view of a forearm brace coupled to a controller according to an embodiment.

FIG. 13A shows an example embodiment of the forearm brace 1310 coupled to the controller 1300. The controller 1300 can include components that are structurally and/or functionally the same as or similar to components of other controllers described herein, including, for example, the controller 100-900. Further, the forearm brace 1310 includes components that are structurally and/or functionally the same as or similar to components of other forearm braces described herein, including, for example, the forearm braces 1100-1200. In particular, the forearm brace 1310 includes a platform 1311 having an arm supporting section 1311a with an arm supporting top surface 1311t for receiving a forearm of a user. Further, the forearm brace 1310 includes a securing mechanism 1315 having a first arm clamping element 1315a and a second arm clamping element 1315b.

Figure 13B:
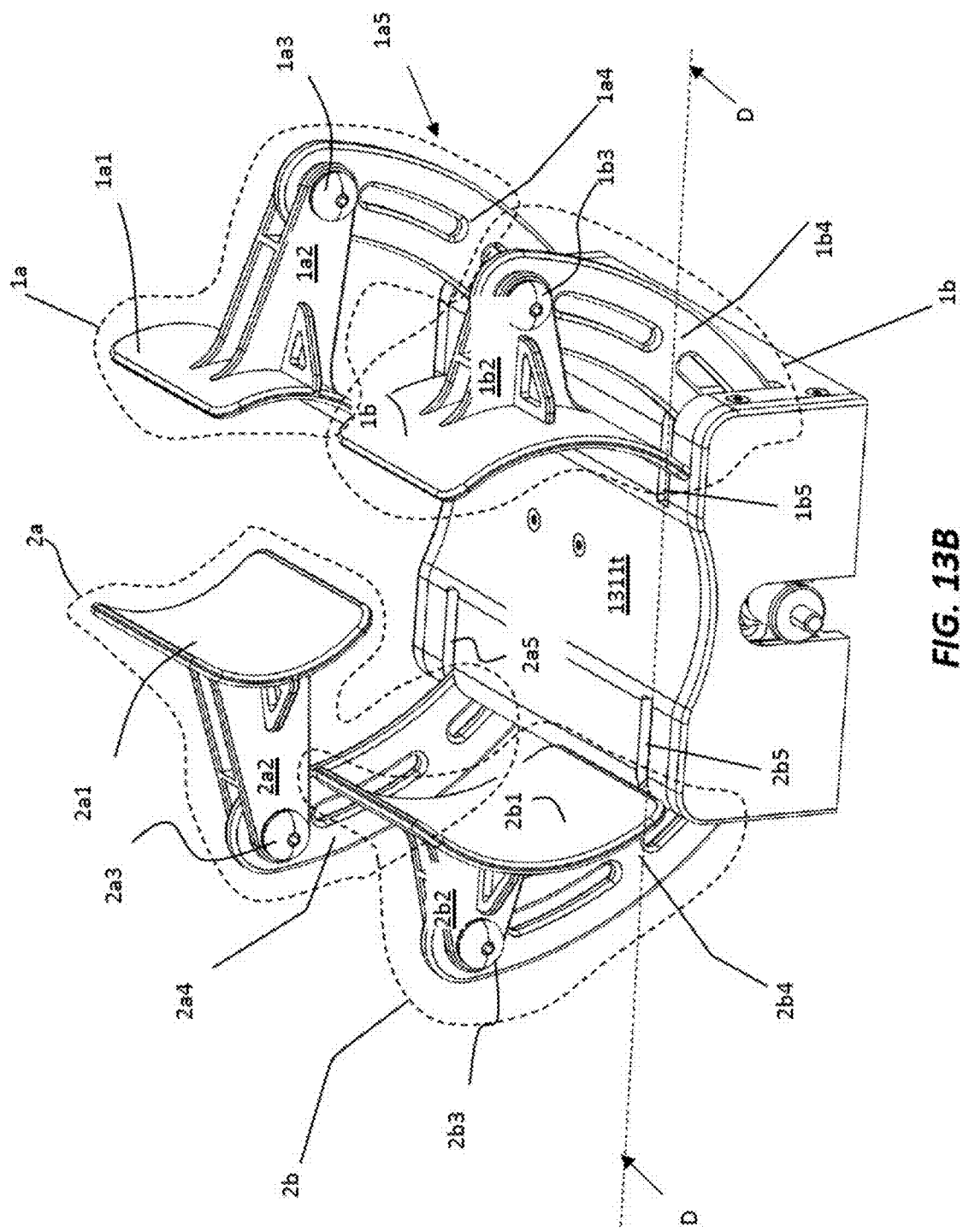
FIG. 13B is an isometric view of a forearm brace according to an embodiment.

FIG. 13B shows that the first arm clamping elements 1315a includes a right front clamping member 1a, a left front clamping member 2a, a right back clamping member 1b and a left back clamping member 2b. Each clamping member includes several parts which are similar for all four clamping members. For example, the right front clamping member 1a includes clamping member plate 1a1, while left front clamping member 2a includes clamping member plate 2a1. Similarly, clamping member 1b includes clamping member plate 1b1, and clamping member 2b includes clamping member plate 2b1. The clamping member plates (i.e., clamping member plates 1a1, 2a1, 1b1, and 2b1) may be made from any suitable material (e.g., plastic, metal, ceramics, and the like). In some cases, the clamping member plates 1a1-2b1 may be formed from a mesh to reduce the weight of these members. Further, the clamping member plates 1a1-2b1 may include rubber, plastic, or fabric layers. For example, such layers may be used as cushioning layers between surfaces of the clamping member plates 1a1-2b1 and a surface of the forearm of the user. Thus, to summarize, in the example implementation of FIG. 13A, each one of clamping elements 1315a and 1315b has a left arm clamping member and a right arm clamping member. The left arm clamping member is configured to engage with a left side of the forearm, and the right arm clamping member is configured to engage with a right side of the forearm.

The clamping member plates 1a1-2b1 may be configured to have a shape that generally conforms to a portion of a forearm of a user. For example, the clamping member plates 1a1 and 2a1 may have a shape that generally conforms to a left side of the forearm, and the clamping member plates 1b1 and 2b1 may have a shape that generally conforms to a right side of the forearm.

In some cases, the shapes of clamping member plates 1a1-2b1 are configured based on left handedness or right handedness of the user. For example, one set of clamping member plates 1a1-2b1 may be designed for a left-handed person, thereby resulting in a left-handed forearm brace, while another set of clamping member plates 1a1-2b1 may be designed for a right-handed person, thereby resulting in a right-handed forearm brace.

Further, in some implementations, the securing mechanisms of a forearm brace are configured to be adjustable based on the user's preferences. For example, in one implementation, the clamping element 1315a and/or 1315b is configured to be movable along a length of the platform. For example, the clamping element 1315a (or 1315b) may be movable towards (or away) to the clamping element 1315b (or 1315a).

Further, the distance between the clamping member plates of the same clamping element (herein, referred to as coupled clamping member plates, such as arm clamping member plates $1a1$ and $2a1$) may be adjustable to account for narrow and wide forearms. For example, for users with narrow forearms, the distance between the coupled clamping member plates may be reduced when the coupled clamping member plates are configured to engage the forearm of the user. Alternatively, for users with wide forearms, the distance between the coupled clamping member plates may be increased when the coupled clamping member plates are configured to engage the forearm of the user.

In some cases, the specific parameters such as dimensions and weight of a forearm brace may be adjusted or selected based on a height, age, gender, and the like of the user. For example, an extra small sized forearm brace may be selected for a child and an extra large sized forearm brace may be selected for a seven-foot-tall basketball player.

It should be noted that the securing mechanism $1315$ as shown in FIG. $13A$ is only one possible embodiment, and various other securing mechanisms may be used for securing the forearm brace $1311$ to a forearm of a user. For example, alternative securing mechanism may include only a single arm clamping element, which may be similar to the arm clamping element $1315a$. In some cases, the single arm clamping element may extend over a larger length of the forearm of the user than the arm clamping element $1315a$ (e.g., the single arm clamping element may extend over a quarter of the length of the forearm, over one third of the length of the forearm, over one half of the length of the forearm, over two thirds of the length of the forearm, over three quarters of the length of the forearm, substantially over the length of the forearm, and the like). Additionally, a single arm clamping element and/or an arm supporting section of a forearm brace may be built to match a forearm of a user (e.g., the forearm of the user may be volumetrically scanned, and the single arm clamping element and/or the arm supporting section may be molded based on scan data to match the three-dimensional shape of the user's forearm).

Additionally, or alternatively, a forearm brace may include multiple arm clamping elements controlled by associated mechanical systems, such that a particular (e.g., more equal) distribution of pressure exerted by the arm clamping elements over a forearm of a user may be achieved.

Further, in one implementation, a forearm brace may include an opening mechanism configured to be activated when an arm clamping element (or multiple arm clamping elements) is (are) closed and configured to open the arm clamping element (or multiple arm clamping elements) when a user interacts with a suitable interface of the forearm brace. For instance, the opening mechanism may include a spring maintained under compression, which is configured to open the arm clamping element once the user interacts with the interface (e.g., presses a button that releases the spring of the opening mechanism). The arm clamping element may then be closed via a suitable lever arm that may be included in the base of the forearm brace, thereby activating the opening mechanism. In some instances, the opening mechanism may be configured to open the arm clamping element sufficiently slowly to ensure that the arm clamping element does not injure the user while it is being opened.

Alternatively, an arm clamping element may have a fixed (unmovable) first clamping member and a movable second clamping member. In such an embodiment, a forearm of a user may be placed next to the fixed first clamping member, and the second clamping member is moved to exert pressure on the forearm of the user and to clamp the forearm of the user between the first and the second clamping member.

Further, instead of (or in addition to) using arm clamping elements, a securing mechanism of a forearm brace may include flexible elements (e.g., belts, ribbons, and the like) configured to wrap over a forearm of a user (or partially cover the forearm of the user) and secure the forearm of the user to a platform of the forearm brace. Further, in some implementations, the securing mechanism includes one or more arcs configured to be placed over the forearm of the user, such that the forearm of the user passes through an opening formed by the one or more arcs and a top surface of a platform of the forearm brace. It should be appreciated, that various other securing mechanisms for attaching the forearm brace to the forearm may be employed (e.g., the forearm brace may include a flexible sleeve configured to receive the forearm of the user, such that the forearm passes through the opening formed by the flexible sleeve).

In various embodiments, the arm clamping member plates $1a1$, $2a1$, $1b1$, and $2b1$ engage the forearm based on a first user input and disengage the forearm based on the second input. As described before, the first user input and the second user input may be communicated to an interface of the quick-release mechanism, such as the quick-release mechanism $1213$, as shown in FIG. $12$.

As further shown in FIGS. $13A$-$13B$, the arm clamping element $1315a$ includes clamping support members $1a4$ and $2a4$ for supporting respective arm clamping member plates $1a1$ and $2a1$. Further, the arm clamping element $1315b$ includes clamping support members $1b4$ and $2b4$ for supporting respective arm clamping member plates $1b1$ and $2b1$. FIG. $13B$ also shows that the arm clamping member plate $1a1$ includes an extension element $1a2$ coupled to the clamping support member $1a4$ via a coupling element $1a3$ which may be a bolt, a rivet, a clamp, and the like. The coupling element $1a3$ may be configured to be loosened or tightened. For instance, when the coupling element $1a3$ is a bolt, it may be placed through an opening channel formed by holes of the extension element $1a2$ and the support member $1a4$ and secured by a nut. In some cases, when one or more holes of the extension element $1a2$ and/or the support member $1a4$ are threaded, the bolt may be coupled to these threaded holes. The loosening of the coupling element $1a3$ allows for a motion and positional adjustment of the extension element $1a2$, and by extension, the clamping member plate $1b1$. Similarly, other clamping member plates $2a1$, $1b1$, and $2b1$, include respective extension elements $2a2$, $1b2$, and $2b2$ coupled to the respective clamping support members $2a4$, $1b4$, and $2b4$, via respective coupling elements $2a3$, $1b3$, and $2b3$. The coupling elements $2a3$, $1b3$, and $2b3$ can also be configured to be loosened (or tightened), thereby allowing for a positional adjustment of the clamping member plates $2a1$, $1b1$, and $2b1$. In various embodiments, the support members $1a4$-$2b4$ are configured to move within respective sockets $1a5$-$2b5$, as shown in FIG. $13B$, to engage and disengage the forearm of the user. Note, that socket $1a5$ is obscured in FIG. $13B$, and its location is indicated by an arrow $1a5$.

FIG. $13C$ shows a cross-sectional cut in a plane D (the plane D is indicated in FIG. $13B$ and passes through sockets $1b5$ and $2b5$). The clamping support members $1b4$ and $2b4$ pass through respective sockets $1b5$ and $2b5$ and are connected to respective axial members $x1$ and $x2$. In the example embodiment shown in FIG. $13C$, the clamping support members $1b4$ and $2b4$ are configured to move by rotating about the respective axial members $x1$ and $x2$ as indicated by respective arrows $1b7$ and $2b7$. Similarly, other support members 1a4 and 2a4 pass through respective sockets 1a5 and 2a5 and are connected to the same respective axial members x1 and x2. The clamping support members 1a4 and 2a4 are configured to move in a similar way as clamping support members 1b4 and 2b4, i.e., by rotating about the respective axial members x1 and x2, as indicated by arrows in FIG. 13C. When engaging a forearm of the user, the clamping support members 1a4 and 1b4 are configured to rotate about respective axial member x1 clockwise, while the clamping support members 2a4 and 2b4 are configured to rotate about respective axial member x2 counterclockwise. The rotations are reversed for these clamping support members when disengaging the forearm of the user.

The motion of the clamping support members 1a4-2b4 may be activated via a variety of approaches. For instance, one of the approaches involves a surface 1311t of the arm supporting section 1311a (as shown in FIGS. 13A-13C) that can be pressed onto by the forearm of the user, thereby activating mechanisms (further discussed in connection with FIG. 13D) to activate the motion of the clamping support members 1a4-2b4.

Figure 13C:
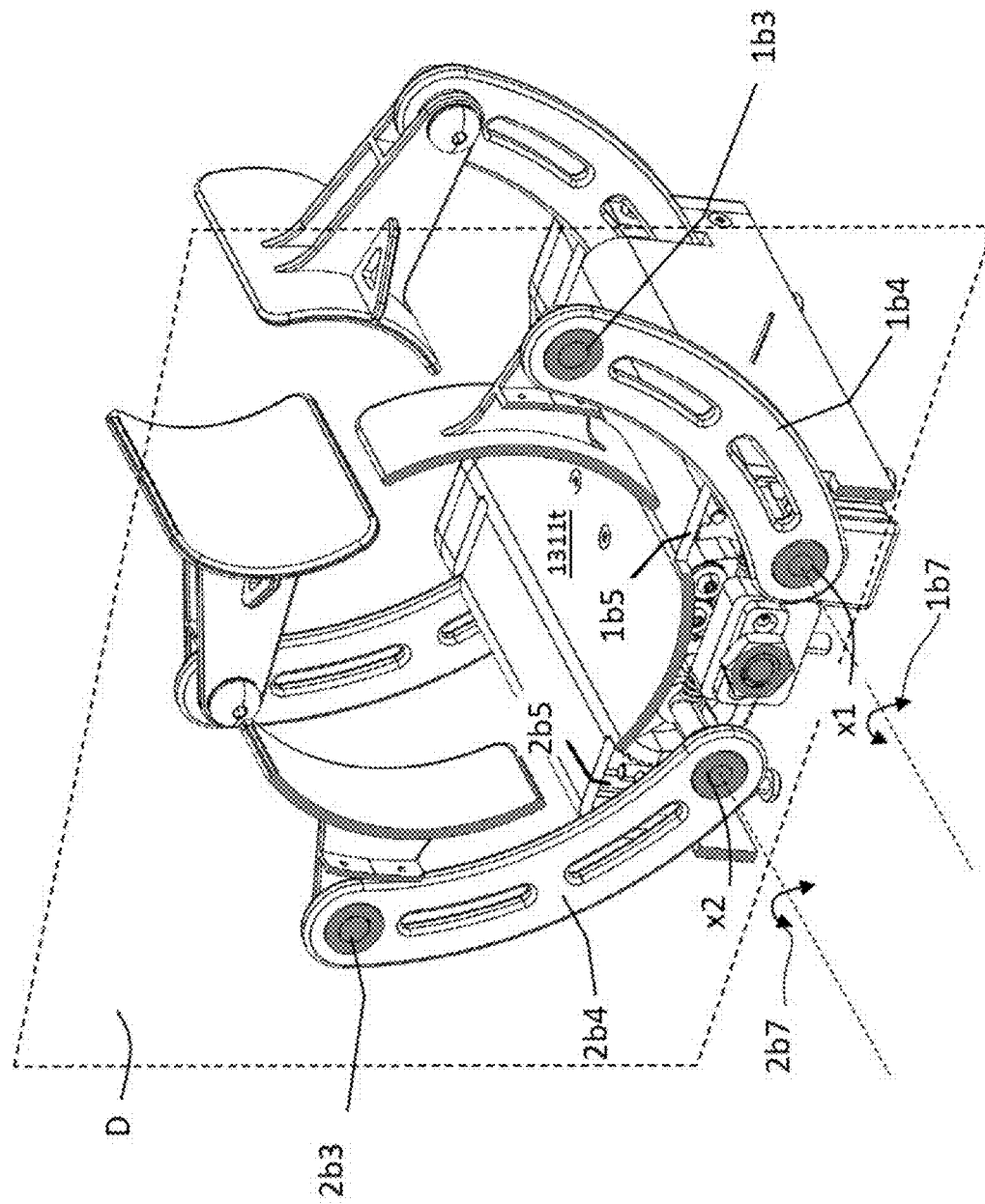
FIG. 13C shows a cross-sectional view of a forearm brace according to an embodiment.

In the example embodiment, as shown in FIGS. 13A-13C, the platform 1311 includes a first side having the arm supporting section 1311 and a second side opposite to the first side, the second side having a frame member 1311b, as shown in FIG. 13A, supporting a coupling mechanism 1317 that is coupled to the frame member 1311b. In the example implementation, the frame member 1311b extends past the arm supporting section 1311a towards the controller 1300. Further, the frame member 1311b includes a bottom portion having a bottom surface that is also the bottom surface of the platform 1311 In some implementations, the bottom surface of the base 1304 of the controller 1300 and the bottom surface of the platform are aligned horizontally.

In the example embodiment, the arm supporting section 1311a is configured to be movable relative to platform 1311 in a direction normal to the arm supporting surface 1311t (e.g., towards the frame member 1311b) of the arm supporting section 1311a, while the arm supporting surface 1311t remains in contact with the forearm. The user may apply a pressure onto a portion (e.g., an element) of the arm supporting surface 1311t, thereby transmitting a first user input to a mechanism for activating the motion of the clamping support members 1a4-2b4. As a result, the securing mechanism 1315 is engaged, as the arm supporting section 1311a is moving towards an opposite side of the platform 1311 (e.g., in a direction indicated by arrow M in FIG. 13A). In one particular example, the user may press the forearm into the portion of the arm supporting surface 1311t, thereby providing the first user input and engaging the securing mechanism 1315. Additionally, or alternatively the first user input may be a tactile input (e.g., tactile input includes pressing buttons and/or touching particular portions of the forearm brace 1310).

In some implementations, a height H, as shown in FIG. 13A, of the arm supporting section 1311a may be adjustable to allow a wrist of the user to grab a first control member of the controller 1300 at a right location. In some cases, the height H may be adjustable to prevent substantial bending of the user's wrist. In an example embodiment, the arm supporting section 1311a may be raised or lowered relative to the frame member 1311b of the platform 1311 via any suitable height adjusting mechanisms (e.g., bolts, system of vertical rails along which the arm supporting section 1311a may be moved and secured, and the like).

In various implementations, upon the motion of the arm supporting section 1311a towards the frame member 1311b, the motion of the arm supporting section 1311a activates one or more gears (not shown in FIGS. 13A-13C) configured to couple the motion of the arm supporting section 1311a to the motion of the clamping support members 1a4-2b4 for engaging the clamping support members 1a4-2b4 to the forearm. Further, the pressure of the forearm onto the arm supporting section 1311a is partially balanced by a set of springs, configured to compress during this motion.

Figure 13D:
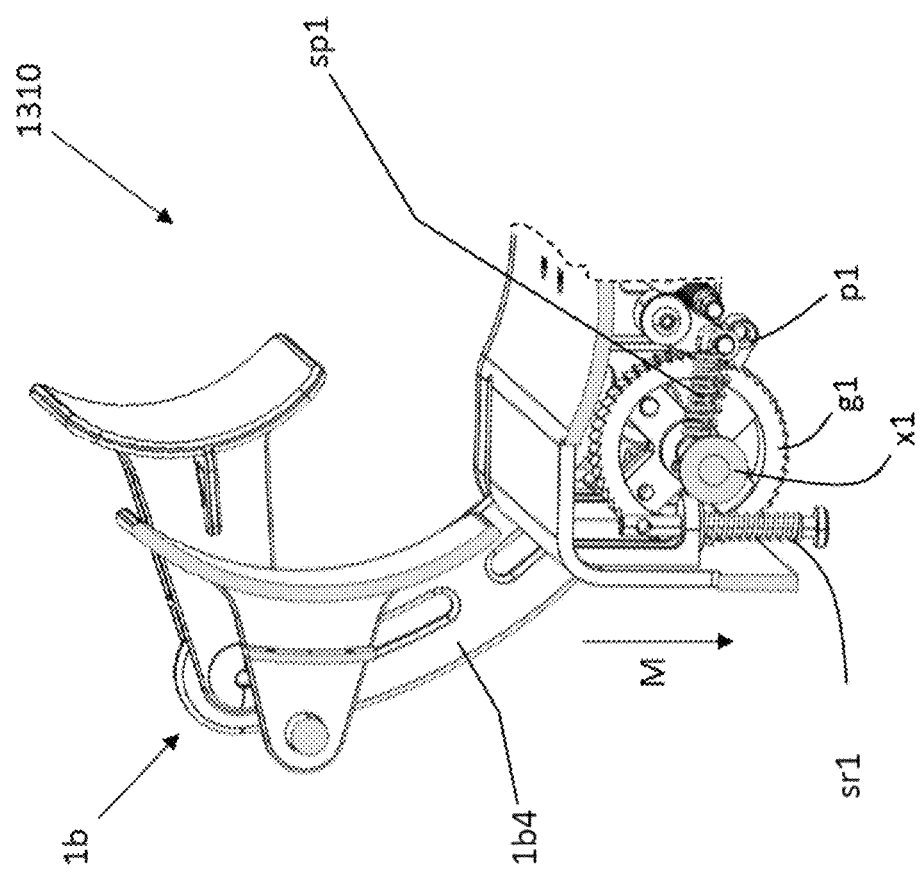
FIG. 13D is a view of mechanisms of a quick-release mechanism according to an embodiment.

FIG. 13D shows an example embodiment in which a right side of the platform 1311 is shown (the view is from the side of the forearm brace 1310 that is away from the controller, thus, the right side of the forearm brace 1310 appears on a left side of FIG. 13D), with understanding that the left side may be a mirror image of the right side and include all the components (e.g., gears, gear paws, and the like) that are used as the components for the right side. The right side of the platform 1311 includes at least one gear g1 coupled to the right supporting members 1a4 and 1b4 (the right arm supporting member 1a4 is not shown for clarity as not to obscure elements associated with gear g1). The gear g1 is connected to the axial member x1, and the movement of the arm supporting section 1311a introduces a rotation to gear g1 via a crank associated with the axial member x1 (not shown). The direction of the rotation of the gear g is locked by a gear paw p1 configured to secure the gear g1 in place and ensure that the gear g1 is only configured to rotate in one direction (clockwise) while the gear paw p1 is engaged. Further, the rotation of gear g1 results in motion of the supporting members 1a4 and 1b4 for engaging cooperatively with the forearm and securing the platform 1311 to the forearm.

To disengage the platform from the forearm of the user, via the quick-release mechanism 1313, a suitable interface (e.g., a button) of the quick-release mechanism may be used. The action of pressing the button results in a motion of the pair of gear pawls (e.g., the right gear pawl p1, and a corresponding left gear pawl). For example, upon pressing the button associated with the quick-release mechanism 1313, the button is configured to disengage the pair of gear pawls from the pair of the associated gears, thereby allowing a rotation of each gear to move the right and the left arm clamping members away from the forearm.

Further, the forearm brace 1310 includes a spring sp1 for connecting a shaft of the gear g1 (from the pair of gears) and the gear pawl p1 (from the pair of gear pawls). The spring sp1 is configured to push the gear pawl p1 towards the gear g1 to secure the gear g1 in place (e.g., to prevent the gear g1 to rotate counterclockwise, thereby releasing right clamping members 1b and 1a). The pressing of the button of the quick-release mechanism may be configured to temporarily extend the spring sp1, thereby disengaging the gear pawl p1 from the gear g1.

FIG. 13D further shows that the arm supporting section 1311a is coupled to a spring sr1 that is configured to compress when the arm supporting section 1311a moves in a direction as indicated by arrow M (e.g., towards the frame member 1311b). Upon activation of the quick-release mechanism 1313, the spring sr1 is configured to expand and move the arm supporting section 1311a in a position corresponding to the securing mechanism 1315 being disengaged from the user.

It should be noted that the engaging mechanisms and quick-release mechanisms discussed above are only some of the possible approaches of activating the motion of the clamping elements 1315a and 1315b. Alternatively, in some embodiments, other approaches may be used. For example, clamping elements of a forearm brace may be activated via suitable motors (e.g., electrical motors such as servo motors) that are activated based on data from suitable sensors. The motors may use electrical power (e.g., a battery, which may part of the forearm brace) associated with a forearm brace. The sensors may sense the presence of the forearm. For instance, the sensors may determine that the forearm is adjacent to a surface of the arm supporting section, or that a user is requesting for the forearm brace to engage with his/her forearm (the user's request may include the user pressing a button, touching a touch panel controller, or using any other suitable interface for interacting with a controller of a platform of the forearm brace) and send a signal to a suitable controller configured to activate a motion of the clamping elements, which may include engaging or disengaging the clamping elements from the forearm of the user.

Returning to FIG. 13A, the forearm brace 1310 includes a coupling mechanism 1317 for coupling the forearm brace 1310 to the controller 1300. In the example embodiment, the coupling mechanism includes a coupling extension member 1317a configured to couple at a first end to the frame member 1311b of the platform 1311, a coupling bracket 1317b configured to couple to the controller 1300 and secured to the controller 1300 by use of clamps 1317c (further shown in FIG. 13E). Further, the frame member 1311b includes a socket in which an end of the coupling extension member 1317a is inserted and secured via a clamp 1311b3 (the clamp 1311b3 is attached to the frame member 1311b).

Figure 13E:
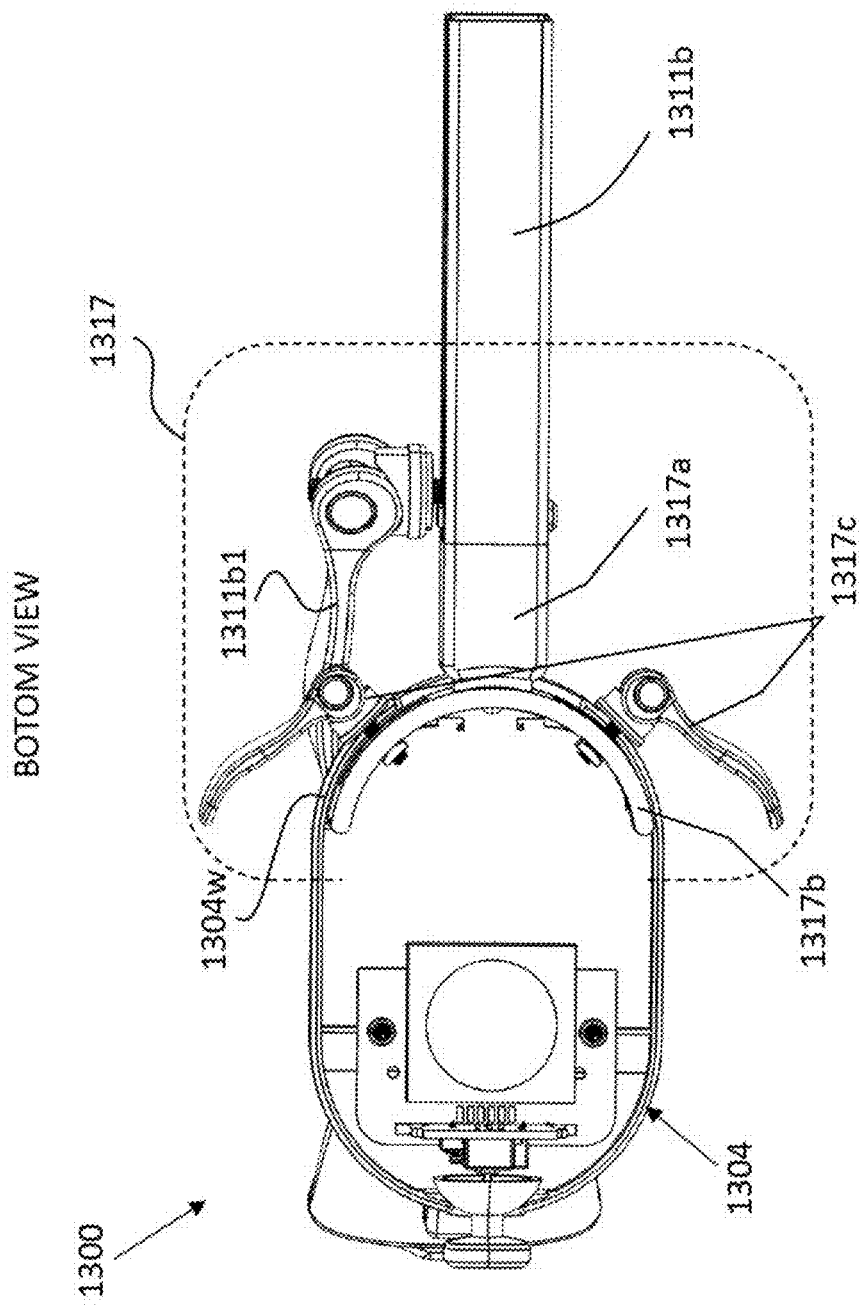
FIG. 13E is a bottom view of a coupling mechanism of a forearm brace coupled to a base of a controller according to an embodiment.

Further details of the coupling mechanism 1317 are shown in FIG. 13E, including coupling extension member 1317a coupled to the frame member 1311b, and secured to the frame member 1311b via the clamp 1311b3. FIG. 13E shows that the coupling bracket 1317b is attached to the base 1304 of the controller 1300. In particular, in the example implementation, the coupling bracket 1317b is placed on an inside side of the wall 1304w and the clamps 1317c secure the coupling bracket 1317b to the wall 1304w.

In some other implementations (not shown in FIG. 13E), a coupling mechanism (e.g., a coupling extension member) may include a socket configured to couple to an extension element of the controller. The extension element of the controller is configured to be inserted into the socket and secured in the socket via suitable securing mechanisms (e.g., via a clamp, a bolt, and the like). In some cases, securing includes securing the extension element by a first clamp located on a first side of the coupling mechanism and a second clamp located on a second side of the coupling mechanism.

Alternatively, the extension element of the controller may be capable of rotation and includes a first threaded portion configured to be secured within the socket of the coupling mechanism having a second threaded portion.

Figure 13I:
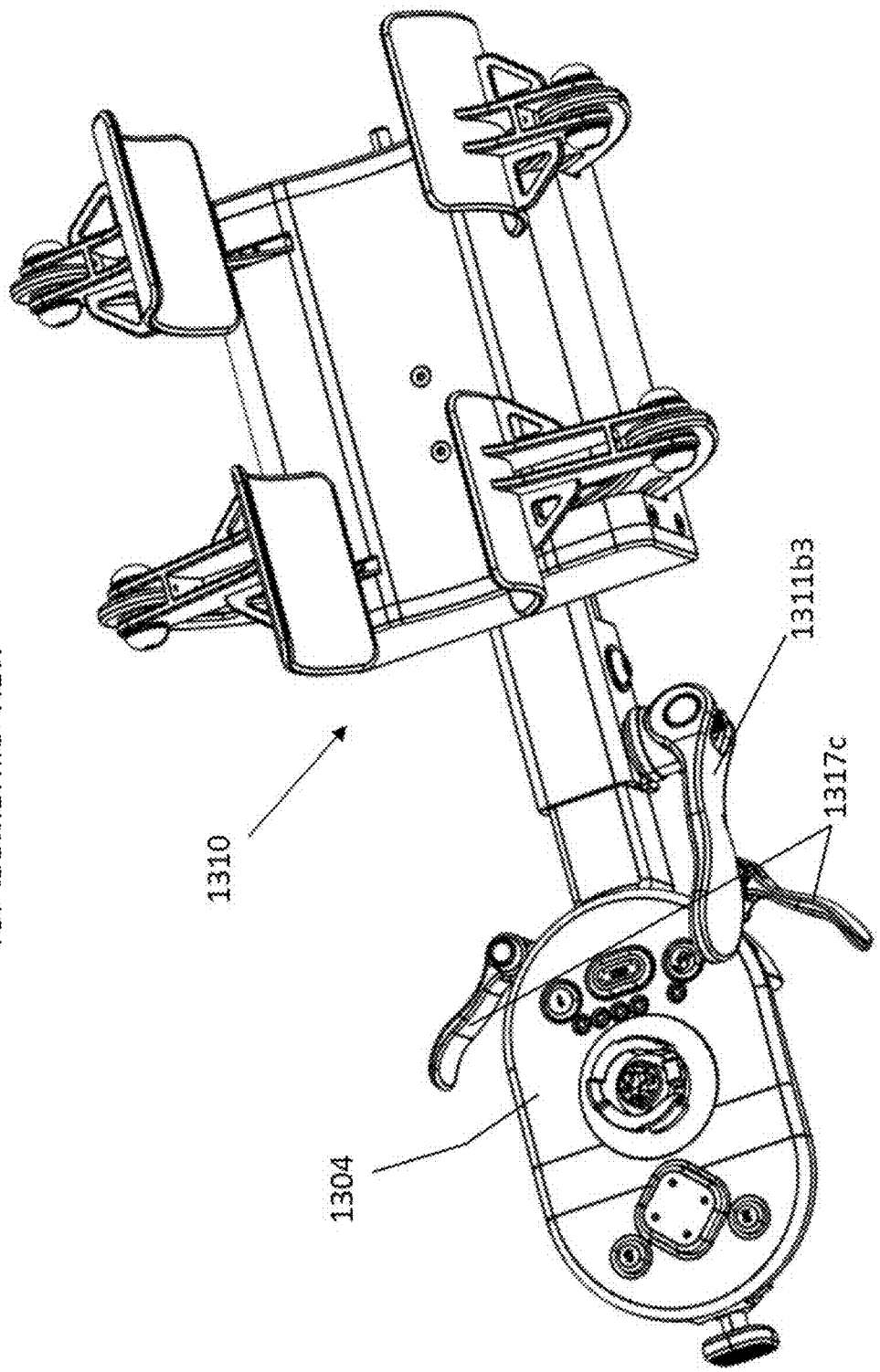
FIG. 13I is a top isometric view of a base of a controller coupled to a forearm brace according to an embodiment.
Figure 13J:
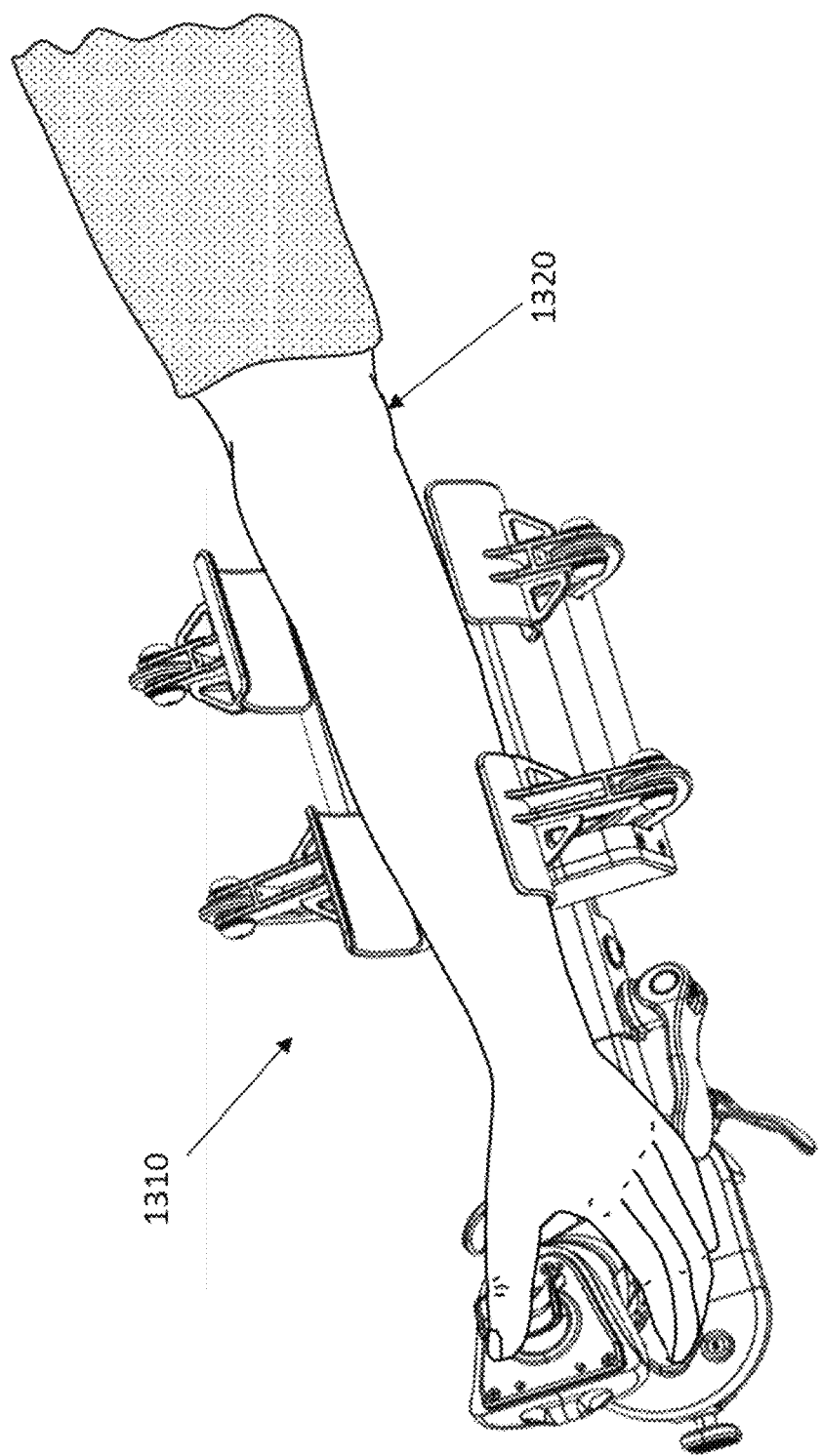
FIG. 13J shows another view of a forearm of a user and a forearm brace according to an embodiment.

FIGS. 13F-13H show that the base 1304 may change orientation relative to the coupling mechanism 1317 to better fit a right-handed or a left-handed user. For example, FIG. 13F shows that an axis AX2 of the base 1304 is aligned with an axis AX1 of the coupling mechanism 1317 (as indicated by an angle $\theta_1$ being substantially the same as 180 degrees). FIG. 13G shows that the axis AX2 and axis AX1 form an angle $\theta_2$ which may be a suitable positive angle (e.g., angle $\theta_2$ may be about 100 to 175 degrees). FIG. 13H shows that axis AX2 and axis AX1 form an angle $\theta_3$ which may be a suitable negative angle (e.g., angle $\theta_3$ may be about −100 to −175 degrees). To allow for the base 1304 to move relative to the coupling mechanism 1317, clamps 1317c may be released, the base 1304 position may be adjusted as shown in FIGS. 13F-13G, and the clamps 1317c are then moved to secure the coupling bracket 1317b to the base 1304. FIG. 13I shows a top isometric view of the base 1304 of the controller 1300 coupled to the forearm brace 1310 while FIG. 13J shows a view of the forearm brace 1310 coupled to the controller 1300, as well as a forearm of the user and a hand of the user manipulating the controller 1300. Note that the forearm brace 1310 is configured to couple to the forearm of the user, such that an elbow 1320 is located beyond the forearm brace 1310, as shown in FIG. 13J.

FIGS. 14A and 14B show an embodiment of a forearm brace 1410 coupled to a controller 1400. The forearm brace 1410 may be structurally and functionally similar to the forearm brace 1311 as shown in FIG. 13A. The clamping support members 14_1a4 and 14_2a4 are configured to be coupled to a front side 1411f (as shown in FIG. 14B) of the arm support section 1411a, while the clamping support members 14_1b4 and 14_2b4 are configured to be coupled to a back (rear) side 1411r (as shown in FIG. 14A) of the arm support section 1411b. Noted that the clamping support members 14_1a4 and 14_2a4 are similar to corresponding clamping support members 1a4 and 2a4, as shown in FIG. 13B, for example, with label 14 indicating that these clamp support members are related to the embodiment in FIGS. 14A-14F. Similar notation is used for other component of the forearm brace 1410 (e.g., axial members 14_x1 and 14_x2 are similar to the respective axial members x1 and x2 of FIG. 13C).

Similar to the embodiment shown in FIG. 13C, the clamping support members 14_1a4 and 14_2a4 are configured to execute a rotational motion about respective axial members 14_x1 and 14_x2, while clamping support members 14_1b4 and 14_2b4 are configured to rotate about the same respective axial members 14_x1 and 14_x2. In some cases (not shown in FIG. 14A-14B), a first set of axial members may be used for the clamping support members 14_1a4 and 14_2a4 and a second set of axial members may be used for clamping support members 14_1b4 and 14_2b4 (e.g., the axial members from the first set may not be connected to the axial members from the second set).

FIGS. 14C-14F show various side views and cross-sectional views of the controller 1400 coupled to the forearm brace 1410. For example, FIG. 14D shows a top view of the controller coupled to the forearm brace, FIG. 14E shows a side view of the controller coupled to the forearm brace, and FIG. 14F shows a back view of the forearm brace coupled to the controller. Further, FIG. 14C shows a cross-sectional view of the controller coupled to the forearm brace taken in the cross-sectional plane B, as shown in FIG. 14D.

Figure 15:
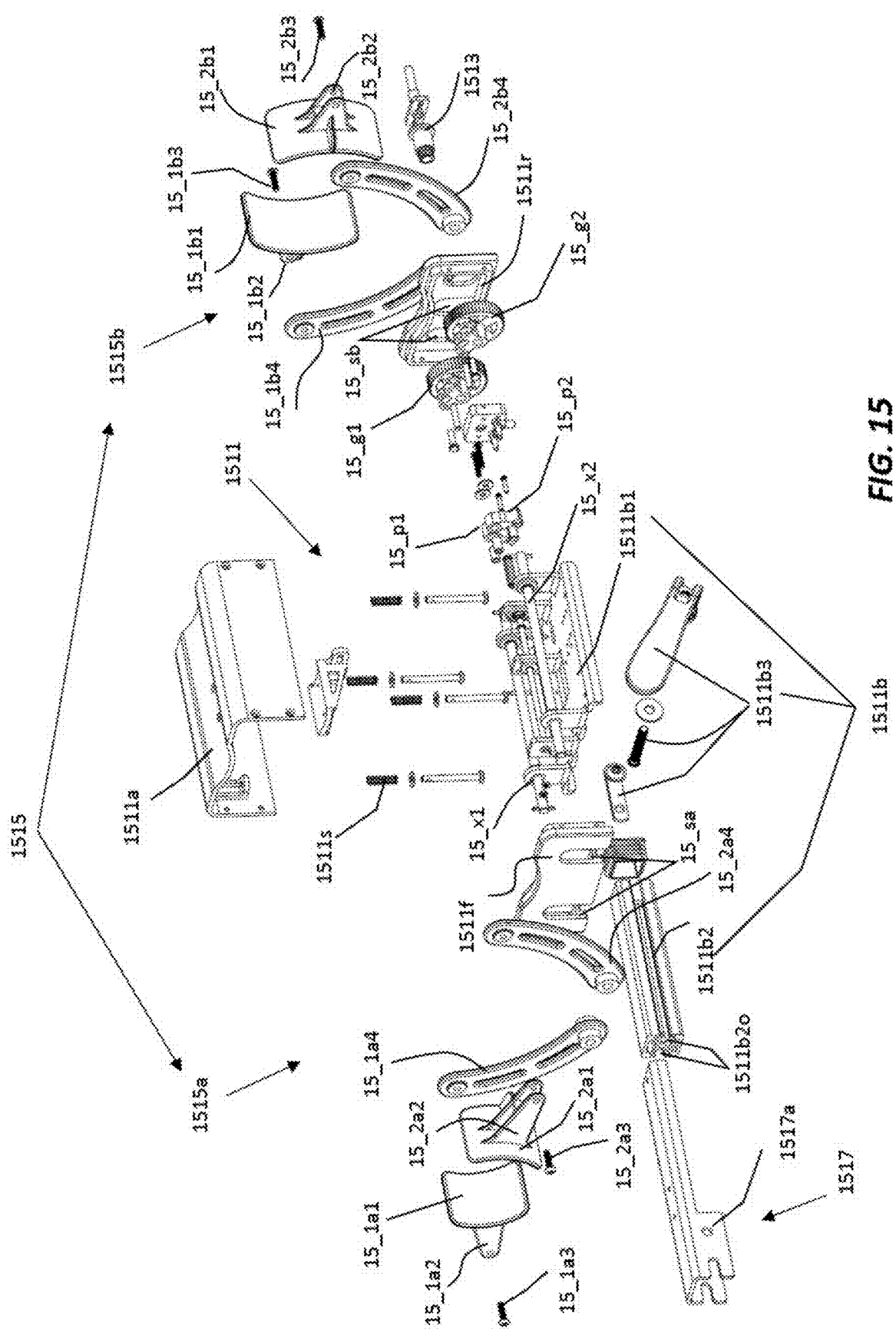
FIG. 15 is an exploded view of a forearm brace coupled to a controller according to an embodiment.

FIG. 15 shows an exploded view of the forearm brace 1500, which can be structurally and functionally the same as the embodiment of the forearm brace, as shown in FIGS. 14A-14F. The forearm brace 1500 includes securing mechanism 1515 that include a first clamping element 1515a and a second clamping element 1515b. The first clamping element 1515a includes a first (right) clamping side element 15_1a and a second (left) clamping side element 15_2a. The first clamping side element 15_1a includes a clamping member plate 15_1a1, an extension member 15_1a2, a coupling member 15_1a3, and a support member 15_1a4. Similarly, the second clamping side element 15_2a includes a clamping member plate 15_2a1, an extension member 15_2a2, a coupling member 15_2a3 and a support member 15_2a4. Further, the second clamping element 1515b includes a first (right) clamping side element 15_1b and a second (left) clamping side element 15_2b. The first clamping side element 15_1*b* includes a clamping member plate 15_1*b*1, an extension member 15_1*b*2, a coupling member 15_1*b*3 and a support member 15_1*b*4. Similarly, the second clamping side element 15_2*b* includes a clamping member plate 15_2*b*1, an extension member 15_2*b*2, a coupling member 15_2*b*3 and a support member 15_2*b*4. Various members of the first clamping element 1515*a* and second clamping element 1515*b* may be structurally and/or functionally the same as similar clamping member plates of first clamping element 1315*a* and second clamping element 1315*b*, as shown in FIGS. 13A-13C.

Further, the forearm brace 1510 includes a platform 1511 having a frame member 1511*b* and an arm supporting section 1511*a* configured to move towards and away from the frame member 1511*b*. In the example implementation the arm supporting section 1511*a* is supported by springs 1511*s* which may be structurally and functionally the same as spring sr1, as shown in FIG. 13D. The arm supporting section 1511*a* includes a top surface 1511*t* configured to be adjacent to a user's forearm. Further, the arm supporting section 1511*a* includes a front side 1511*f* and a rear side 1511*r*. The front side 1511*f* includes associated sockets 15_*sa* for allowing the arm supporting section 1511*b* to move relative to axial members 15_*x*1 and 15_*x*2, when the arm supporting section 1511*b* moves toward to or away from the frame member 1511*b* (axial members 15_*x*1 and 15_*x*2 are fixed in place and do not move). Similarly, the rear side 1511*r* includes sockets 15_*sb* that serve the same function as sockets 15_*sa*.

The frame member 1511*b* may include several parts 1511*b*1, 1511*b*2, and 1511*b*3. A first part 1511*b*1 of the frame member 1511*b* is configured to house the axial members 15_*x*1 and 15_*x*2 for coupling with associated support members. For example, the axial member 15_*x*1 is configured to couple with support members 15_1*a*4, and 15_1*b*4, while axial member 15_*x*2 is configured to couple with support members 15_2*a*4 and 15_2*b*4, thereby allowing these support members to rotate about the respective axial member. Further, the first part 1511*b*1 of the frame member 1511*b* houses gear pawls 15_*p*1 and 15_*p*2 and gears 15_*g*1 and 15_*g*2 (the gear pawls 15_*p*1 and 15_*p*2 and gears 15_*g*1 and 15_*g*2 may be structurally and/or functionally the same as respective gear pawl p1 and gear g1, as shown in FIG. 13D).

A second part 1511*b*2 of the frame member 1511*b*2 is an extension member configured to extend towards a controller 1500 and receive a coupling extension member 1517*a*. Similar to the previously described (in relation to FIG. 13A-13E) coupling extension member 1317*a*, coupling extension member 1517*a* of the coupling mechanism 1517 is configured to be coupled (e.g., inserted) from a front side of the second part 1511*b*2 (the front side of the second part 1511*b*2 includes one or more opening 1511*b*2*o* in which the coupling extension member 1517*a* may be slid in) of the second part 1511*b*2 and secured via a clamp 1511*b*3 (the clamp 1511*b*3 is being a third part of the frame member 1511*b*).

In various embodiments discussed herein, a forearm brace may include multiple connected components and form a system. For example, the forearm brace may include a platform having an arm supporting section, the arm supporting section configured to be in contact with a forearm of a user, a securing mechanism for securing the platform to the forearm, and a quick-release mechanism coupled to the securing mechanism and configured to: (a) upon a first user input, engage the securing mechanism to secure the platform to the forearm; and (b) upon a second user input, release the platform from the forearm.

Further, the forearm brace may include a first coupling mechanism (the first coupling mechanism may be for example similar to a pair of clamps 1317*c*, as shown in FIGS. 13E and 13I) for coupling to the controller, and a second coupling mechanism (the second coupling mechanism may be for example similar to clamp 1311*b*3, as shown in FIG. 13A) for coupling to the platform. For example, the first coupling mechanism may be one or more clamps, bolts, and the like, and the second coupling mechanism may be also one or more clamps, bolts, and the like. In an example implementation the first coupling mechanism includes a clamping enclosure configured to receive a base of the controller and one or more clamps configured to engage the clamping enclosure with the base of the controller. Further, in some implementations, the first coupling mechanism includes an extension element.

In some embodiments, the second coupling mechanism, includes a socket configured to couple to the extension element; and the extension element is configured to be inserted into the socket and secured in the socket. The securing includes securing the extension element by any suitable securing mechanism such as a clamp or a bolt. Further, the securing may include securing the extension element by one or more clamps. In some cases, a first clamp located on a first side of the second coupling mechanism and a second clamp located on a second side of the second coupling mechanism are used for securing the extension element in the socket.

In various embodiments described herein, the controller and the forearm brace described herein can be used by a user in a variety of ways. The controller may be manipulated by a single hand of the user. For example, the controller may be mounted to a stationary object (e.g., the controller may be secured to a surface of a table, to a stationary tripod, or to any other suitable stationary object), and then can be manipulated by the user's single hand. For instance, when the controller is mounted on a surface, it might be used in an aircraft cockpit, with a laptop simulator, or at a ground control station. The controller may be mounted to the surface via any suitable mounting connections (e.g., bolts, clamps, fittings, such as dovetail fittings, and the like). Alternatively, as described herein, the controller may be coupled to the forearm brace, and may be manipulated by the user's single hand when the user wears the forearm brace. Furthermore, in some cases, the controller may be held by one of the user's hands, while the user is manipulating the controller with another hand.

While the forearm brace is described in relation to the controller, it should be noted that the forearm brace can be coupled to other devices so that a user can use the device singlehandedly. For example, the forearm brace may be used for any task that could be manually operated by a user's hand having the forearm brace as an extension of the user's body. For example, the forearm brace can be coupled to yard tools, surgical robotics, metal detectors, various agricultural devices and tools, various industrial and military systems, and the like.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "substantially," "approximately," and "about" used throughout this Specification and the claims generally mean plus or minus 10% of the value stated, e.g., about 100 would include 90 to 110.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A forearm brace for attaching to a forearm of a user and a controller, the forearm brace comprising:
   a platform;
   an arm supporting section, the arm supporting section configured to be in contact with the forearm;
   an arm clamping mechanism for securing the platform to the forearm, the arm clamping mechanism including a left clamping member and a right clamping member, each one having (1) a first end rotatably coupled to the platform about an axis that is parallel to an axis extending longitudinally along the arm supporting section, and (2) a second end for engaging with the forearm;
   an engaging mechanism coupled to the arm clamping mechanism and configured to upon a first user input, rotate the left clamping member towards the forearm and rotate the right clamping member towards the forearm when the forearm is in contact with the arm supporting section;
   a releasing mechanism coupled to the arm clamping mechanism and configured to upon a second user input, rotate the left clamping member away from the forearm and rotate the right clamping member away from the forearm; and
   a coupling mechanism for coupling the platform to the controller.

2. The forearm brace of claim 1, wherein the left clamping member is configured to engage with a left side of the forearm, and the right clamping member is configured to engage with a right side of the forearm.

3. The forearm brace of claim 1, wherein:
   the engaging mechanism comprises a pair of gears coupled to the left and the right clamping members respectively; and
   upon the first user input, the pair of gears is configured to engage the left and the right clamping members cooperatively, thereby securing the platform to the forearm.

4. The forearm brace of claim 3, wherein:
   the releasing mechanism further comprises a button coupled to a pair of gear pawls that are configured to secure the pair of gears in place, and
   the button, upon being pressed, is configured to disengage the pair of gear pawls from the pair of gears, thereby allowing a rotation of each gear to move the right and the and the left clamping members away from the forearm.

5. The forearm brace of claim 4, wherein the engaging mechanism further comprising a spring connecting a shaft of a first gear in the pair of gears and a first gear pawl in the pair of gear pawls the spring configured to push the first gear pawl towards the first gear to secure the first gear in place.

6. The forearm brace of claim 1, wherein the first user input comprises the user pressing into an element of the arm supporting section.

7. The forearm brace of claim 1, wherein the arm supporting section is coupled to the engagement mechanism and is movable relative to the platform, and configured such that the first user input applied to the arm supporting section causes the engagement mechanism to rotate the left clamping member towards the forearm and rotate the right clamping member towards the forearm.

8. The forearm brace of claim 1, wherein the first user input is a tactile input.

9. The forearm brace of claim 1, wherein the arm supporting section comprises a shape configured to partially adhere to a portion of the forearm of the user.

10. The forearm brace of claim 1, wherein the platform includes a first side having the arm supporting section and a second side opposite to the first side, the second side having a frame member supporting the coupling mechanism.

11. The forearm brace of claim 10, wherein the frame member protrudes past the arm supporting section towards the controller.

12. The forearm brace of claim 1, wherein:
   the coupling mechanism includes a socket configured to couple to an extension element of the controller; and
   the extension element of the controller is configured to be inserted into the socket and secured in the socket.

13. The forearm brace of claim 12, wherein the coupling the platform to the controller includes securing the extension element by a clamp or a bolt.

14. The forearm brace of claim 12, wherein the coupling the platform to the controller includes securing the extension element by a first clamp located on a first side of the coupling mechanism and a second clamp located on a second side of the coupling mechanism.

15. The forearm brace of claim 12, wherein the extension element is capable of rotation and includes a first threaded portion configured to be secured within the socket having a second threaded portion.

16. The forearm brace of claim 1, wherein a bottom surface of a base of the controller and a bottom surface of the platform are aligned horizontally.

17. The forearm brace of claim 1, wherein upon engaging the forearm of the user, the forearm of the user is directly adjacent to the left clamping member at a first side of the forearm, to the right clamping member at a second side of the forearm, and to the arm supporting section at a third side of the forearm, wherein the first, the second, and the third sides are regions of the forearm separated from each other.

18. The forearm brace of claim 3, wherein:
   the release mechanism further comprises an interface for a user coupled to a pair of gear pawls that are configured to secure the pair of gears in place, and
   the interface, upon being interfaced by the user, is configured to disengage the pair of gear pawls from the pair of gears, thereby allowing a rotation of each gear to move the right and the left arm clamping members away from the forearm.

19. The forearm brace of claim 1, wherein one of the left clamping member or the right arm clamping member is configured to rotate while the other one the right clamping member or the left clamping member is configured to remain in place.

20. The forearm brace of claim 1, wherein each one of the left and right clamping members include a clamping element at their respective second ends.

21. The forearm brace of claim 1, wherein the arm clamping mechanism is a first arm clamping mechanism configured to be located distal to an elbow of the user, and wherein the forearm brace further includes a second arm clamping mechanism configured to be located proximal to the elbow and physically disjoint from the first arm clamping mechanism.

22. The forearm brace of claim 21 wherein positions of the first arm clamping mechanism and the second arm clamping mechanism are adjustable along an extension of the platform in a direction of the forearm of the user.

23. The forearm brace of claim 4, wherein the engaging mechanism further comprises a first spring and a second spring, the first spring is configured to connect to a first shaft of a first gear in the pair of gears and to a first gear pawl in the pair of gear pawls, the second spring is configured to connect to a second shaft of a second gear in the pair of gears and to a second gear pawl in the pair of gear pawls, the first spring is configured to push the first gear pawl towards the first gear to secure the first gear in place, and the second spring is configured to push the second gear pawl towards the second gear to secure the second gear in place.

24. The forearm brace of claim 7, further comprising:
 a first interface for the engaging mechanism including a surface of the arm supporting section, wherein the first user input includes pressing the forearm into the first interface; and
 a second interface for the releasing mechanism, wherein the second user input includes engagement of the second interface.

25. The forearm brace of claim 24, wherein the second interface is a button or a lever, wherein the second user input includes pressing on the button or moving the lever.

26. A system for supporting a controller, the system comprising:
 a platform;
 an arm supporting section, the arm supporting section configured to be in contact with a forearm of a user;
 an arm clamping mechanism for securing the platform to the forearm, the arm clamping mechanism including a left clamping member positioned at a left side of the platform and a right clamping member positioned at the right side of the platform and opposite the left clamping member, each one of the left and the right clamping members including a corresponding:
  clamping support element having a first end rotatably coupled to the platform and a second end; and
  clamping element configured to contact the forearm of the user and being coupled to and rotatable about the second end of the clamping support element;
 a coupling mechanism for removably coupling the platform to the controller.

27. The system of claim 26, wherein the coupling mechanism includes a clamping enclosure configured to receive a base of the controller and a clamp configured to engage the clamping enclosure with the base of the controller.

28. The system of claim 27, wherein the coupling mechanism includes a first coupling mechanism and a second coupling mechanism, and wherein:
 the first coupling mechanism includes an extension element;
 a second coupling mechanism includes a socket configured to couple to the extension element; and
 the extension element is configured to be inserted into the socket and secured in the socket.

29. The system of claim 28, wherein the coupling the platform to the controller includes securing the extension element by a clamp or a bolt.

30. The system of claim 26, wherein the clamping element for the left clamping member includes a left curved surface, and the clamping member element for the right clamping member include a right curved surface, the left and the right curved surfaces are configured to at least partially conform to left and right sides of the forearm respectively.

31. The forearm brace of claim 26 wherein a distance between the clamping element of the left clamping member and the clamping element of the right clamping member is configured to be adjustable.

32. The forearm brace of claim 26, wherein a position of the clamping element with respect to the clamping support element is adjustable by rotating the clamping element about an axis (1) extending parallel to the platform and (2) passing through the second end of the clamping support element, and wherein the clamping element is configured to be coupled to the clamping support element via a coupling element.

\* \* \* \* \*